(12) United States Patent
Gray et al.

(10) Patent No.: US 9,011,067 B1
(45) Date of Patent: Apr. 21, 2015

(54) SYSTEM AND METHOD FOR VEHICLE DEPLOYMENT, EXTRACTION, AND STOWAGE

(71) Applicants: Jeremy P. Gray, Southfield, MI (US); James R. Mason, Livonia, MI (US); Michael S. Patterson, Macomb, MI (US); Matthew W. Skalny, Shelby Township, MI (US)

(72) Inventors: Jeremy P. Gray, Southfield, MI (US); James R. Mason, Livonia, MI (US); Michael S. Patterson, Macomb, MI (US); Matthew W. Skalny, Shelby Township, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 255 days.

(21) Appl. No.: 13/737,693

(22) Filed: Jan. 9, 2013

(51) Int. Cl.
*E04H 6/06* (2006.01)
*E04H 6/12* (2006.01)

(52) U.S. Cl.
CPC . *E04H 6/12* (2013.01); *E04H 6/065* (2013.01)

(58) Field of Classification Search
CPC .................................. E04H 6/12; E04H 6/065
USPC .................................................. 414/228, 229
See application file for complete search history.

(56) References Cited

U.S. PATENT DOCUMENTS

| | | |
|---|---|---|
| 2,979,214 A | 4/1961 | Selzer |
| 3,207,396 A | 9/1965 | Mundell et al. |
| 3,474,921 A | 10/1969 | Rossoni |
| 3,903,825 A | 9/1975 | Hamy |
| 4,252,228 A | 2/1981 | White |
| 4,268,209 A | 5/1981 | Westerman |
| 4,291,909 A | 9/1981 | Coatantiec |
| 4,427,117 A * | 1/1984 | Matthewson et al. ......... 211/13.1 |
| 4,493,421 A * | 1/1985 | Matthewson et al. ......... 211/13.1 |
| 4,863,335 A | 9/1989 | Herigstad et al. |
| 4,939,358 A | 7/1990 | Herman et al. |
| 4,950,118 A | 8/1990 | Mueller et al. |
| 5,024,571 A | 6/1991 | Shahar et al. |
| 5,351,916 A | 10/1994 | McGonigle et al. |
| 5,391,046 A | 2/1995 | Colamussi |
| 5,511,924 A * | 4/1996 | Liang ............................ 414/229 |
| 5,551,831 A | 9/1996 | Corbett |
| 5,829,673 A | 11/1998 | Harr, Jr. |
| 6,010,285 A * | 1/2000 | Cox et al. ......................... 410/26 |
| 6,102,646 A | 8/2000 | Bass et al. |
| 6,149,528 A | 11/2000 | Volz et al. |
| 6,369,689 B1 | 4/2002 | Osmer et al. |
| 6,814,529 B2 | 11/2004 | Junge |
| 7,160,075 B1 * | 1/2007 | Blackmore ................... 414/229 |

(Continued)

OTHER PUBLICATIONS

Chevy Vegas packed nose-down in railroad cars for shipping, Article found on the Internet, Apr. 7, 2011, 3 Pages, JESDA.

(Continued)

*Primary Examiner* — Saul Rodriguez
*Assistant Examiner* — Ashley Romano
(74) *Attorney, Agent, or Firm* — Luis Miguel Acosta; Thomas W. Saur

(57) ABSTRACT

A system and method for deploying, extracting, and storing vehicles. The system and method provide for implementation of at least one primary storage module, and optionally, one or more secondary storage modules. Each module includes a clamp dog and tiltable tray which has a pair of clamping arms. The system and method provide for clamp down and vertical stowage of vehicles. When more than one module is implemented, the modules are serially connected together to provide for vertical stowage of multiple vehicles, with one or no vehicle in each module.

12 Claims, 27 Drawing Sheets

(56) References Cited

U.S. PATENT DOCUMENTS

| | | |
|---|---|---|
| 7,257,463 B2 | 8/2007 | Taguchi et al. |
| 7,472,517 B2 * | 1/2009 | Blume .......................... 52/79.1 |
| 7,762,417 B2 | 7/2010 | Arnold |
| 7,861,828 B1 | 1/2011 | Shepard |
| 7,896,113 B1 | 3/2011 | Ramirez |
| 7,957,850 B2 | 6/2011 | Anderson |
| 7,998,409 B2 | 8/2011 | Veiner et al. |
| 8,132,514 B2 | 3/2012 | Lubman et al. |
| 8,573,363 B2 | 11/2013 | Healy et al. |
| 8,868,238 B1 * | 10/2014 | Gray et al. ................... 700/258 |
| 2008/0027590 A1 * | 1/2008 | Phillips et al. ................... 701/2 |
| 2011/0106339 A1 * | 5/2011 | Phillips et al. ................... 701/2 |

OTHER PUBLICATIONS

Vertical rail transport, Article found on the Internet, 1 Page, Chevrolet Vega—Wikipedia.

* cited by examiner

CLAMPED,
STOWED

CLAMPED,
DEPLOYING

CLAMPED,
DEPLOYED

UNCLAMPING,
DEPLOYED

UNCLAMPED,
DEPLOYED

CLAMPED,
STOWED

CLAMPED,
DEPLOYING

CLAMPED,
DEPLOYED

UNCLAMPING,
DEPLOYED

UNCLAMPED,
DEPLOYED

SYSTEM AND METHOD FOR VEHICLE DEPLOYMENT, EXTRACTION, AND STOWAGE

GOVERNMENT INTEREST

The invention described here may be manufactured, used and licensed by or for the U.S. Government for Governmental purposes without payment of any royalties thereon.

BACKGROUND OF THE INVENTION

1. Field of the Invention

The present invention generally relates to a system and method for vehicle deployment, extraction, and stowage.

2. Background Art

Conventional vehicle deployment, extraction, and stowage systems and methods include the General Motors Vert-A-Pac railroad cars for stowage of vertically oriented vehicles; elevator lift systems that have stowage for horizontally oriented vehicles; the modular reusable shipping crate of U.S. Pat. No. 7,762,417, issued Jul. 27, 2010; and the vehicle storage lift of U.S. Pat. No. 7,861,828, issued Jan. 4, 2011.

Such conventional systems and methods may have deficiencies such as they are generally specialized for particular vehicles, require extensive human interaction, have limited storage capacity, and/or fail to provide efficient space utilization. As such, conventional vehicle deployment, extraction, and stowage systems and methods may be unsuitable for unmanned ground vehicles.

Thus, there exists a need and an opportunity for an improved system and method of unmanned ground vehicle deployment, extraction, and stowage. Such an improved system and method may overcome one or more of the deficiencies of the conventional approaches.

SUMMARY OF THE INVENTION

The present invention is directed to a system and method of unmanned ground vehicle deployment, extraction, and stowage. The system is a modular handling and stowage system for the vehicles. The system comprises at least one primary, full-function module and may include one or more secondary, limited-function modules. The primary module and all of the secondary modules that may be implemented together as a system are generally electrically and mechanically coupled. Each of the secondary modules may be added or removed to grow the system to provide multiple unmanned ground vehicle deployment, extraction, and stowage. In the preferred embodiment, based on the interface chosen for module to module communication, and voltage drops limitations through, for example, Ethernet and Universal Serial Bus (USB) total networks, the maximum size recommended is twenty modules. However, other embodiments may provide more additional module implementation beyond twenty.

Each modular unit of the system is marsupial; that is, each module provides containerized stowage of the desired conventional small, tracked unmanned ground vehicle (e.g., UGV, robot, or the like) as well as electro-mechanical elements to provide loading, unloading, and tilting of the robot. That is, each unit contains a UGV and enables remote extraction and deployment. In one embodiment, the modules may be mounted to a host. When multiple modules are implemented, one or more of the modules may contain a vehicle, or, alternatively, remain empty. When implemented, the host can be a manned or unmanned vehicle, container, wagon, trailer, cargo hold, air craft, water craft, or the like, which may provide air, water, or ground deliverability to a desired location (e.g., field of action).

The system comprises one master (e.g., primary, load/unload/store, end, full-function, etc.) module (e.g., unit, container, box, etc.); and may further include any number of slave (e.g., secondary, limited-function, etc.) modules. Each of the primary module and the secondary modules generally provides storage for a UGV as each module comprises stowage mechanics, a motor controller, embedded software, a UGV alignment sub-system, robotic positioning sensors, status indicators (e.g., light emitting diodes (LEDs)), an electro-mechanical UGV power on/off mechanism (implemented to conserve UGV battery charge) that is generally remotely activated, a mechanical grasp mechanism to hold and clench and rotate the robot in place and position, and a linear actuator.

Each of the primary and secondary modules includes the capability to position, rotate, and stow the respective robot in a substantially vertical orientation thereby generally reducing or minimizing the horizontal storage space (otherwise known as the footprint) that is implemented to stow the robot(s), and potentially maximizing the number of robots that can be carried via the host, or otherwise stowed.

Each adjacent module of the modular system interlinks via mechanical coupling and electrical coupling. The robot(s) exit and enter the system from a common point, that is, the master (primary) module.

The mechanical coupling between adjacent modules may be implemented as draw latches that use a compressive force interlocking system. Each module is generally interconnected to the adjacent modules by using bullet/hole alignment devices in combination with the draw latches.

The system comprises a master module, and zero or more slave modules. The master module includes a UGV robot master support tray and lift (articulation) actuator that generally provides a primary ingress and egress ramp for all of the robots that are serially stored in the master and the slave modules. That is, the system provides a last in, first out (LIFO) stowage of the robots. Each slave module contains a UGV robot limited-function support tray, which when lowered, provides overlap into the adjacent module for interconnecting the continuous ingress and egress path for the robots to traverse upon throughout the system of interconnected (coupled) modules.

The UGV stowage system comprises a single system master controller (e.g., a supervisory modules controller), which communicates to (i) a host interface system when the host is implemented, (ii) the master module controller, and (iii) slave module controllers. Each of the individual master and slave modules includes an individual motor controller which is configured, when in slave mode, to the system master controller. The slave controller in the master module and each of the slave modules are linked (electrically coupled) to the system master controller through a serial communications link. The master module and each slave module also comprise a clamping linear drive actuator and location sensors. The slave controller in the master module and in each of the slave modules is connected (coupled) to provide control of the respective clamping linear drive actuator. The clamping linear drive actuators are generally connected mechanically to the main drive shaft via a linkage (described in detail below) such that the clamping linear drive actuator rotates a main drive shaft.

The system master controller generally: (i) interfaces (typically via a wireless link) with (a) a user (e.g., operator, Soldier, etc.), and (b) the host interface system, when implemented; (ii) monitors and controls the status of the individual master and slave modules; (iii) provides hierarchy control over the master and slave modules; (iv) provides data for the graphical user interface; and (v) distributes the power and serial communication to each of the slave modules and master module motor controller. The system master controller monitor and control of the status of the individual master and slave modules includes executing extraction or deployment commands or operation; and also may include real time information such as the presence of a robot within each module, and whether each module is in the operation of robot extraction or deployment.

The system master controller may also provide an interlock (e.g., lockout, failsafe, and the like) feature to each module when the user does not provide the correct information to execute a command. For example, a slave module located three modules away from the master module will not be allowed to execute a robot deploy command when the prior two modules are not in the deployed position, or when a robot is present in the one or both of the modules located one or two modules away from the master module has not yet deployed the respective robot or when the robot contained within the module commanded to deploy has not established a communication link.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Definitions and Terminology

Figure 1:
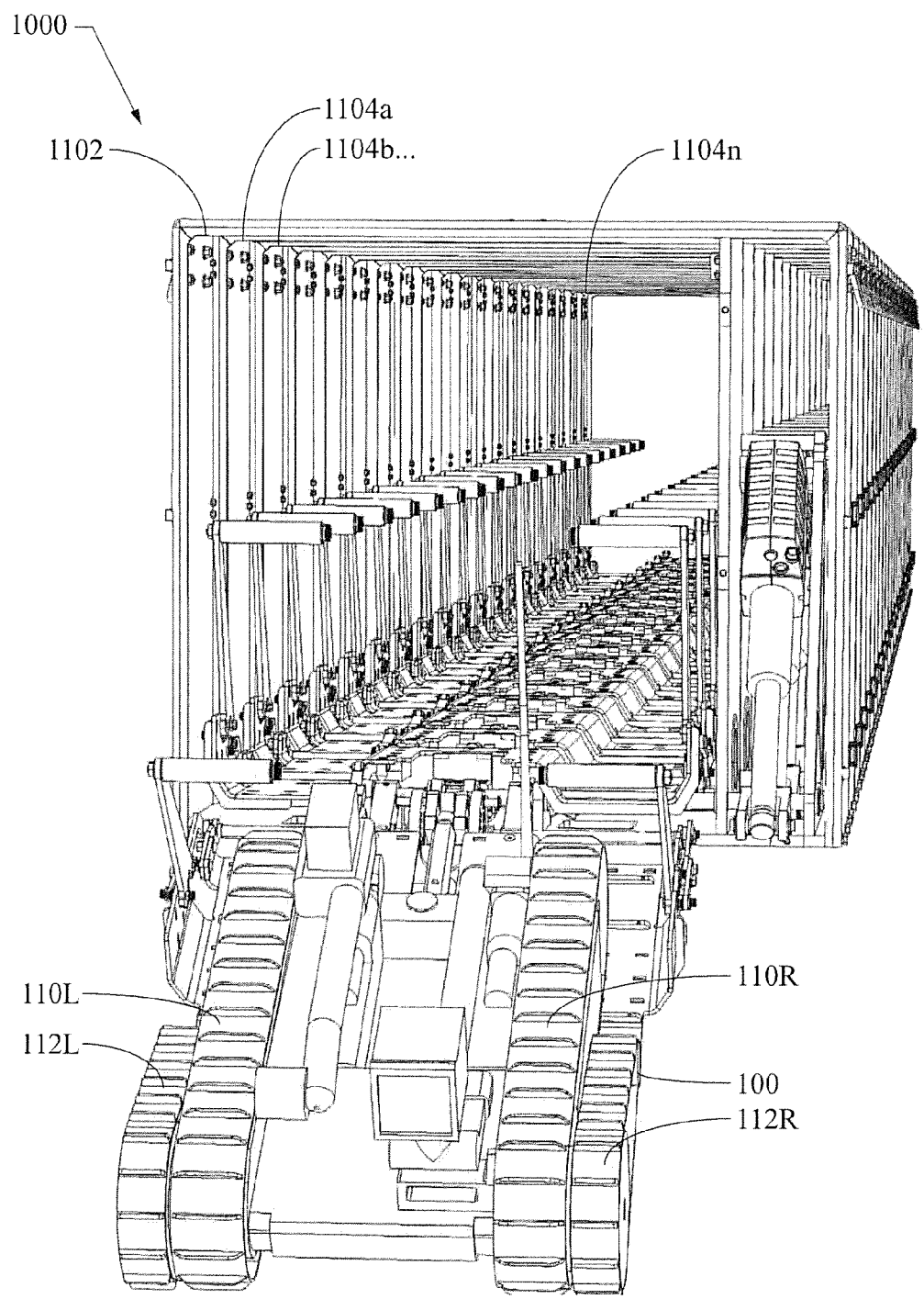
FIG. 1 is an isometric, perspective view of an embodiment of connected modules in the modular handling and stowage system of the present invention.

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial(ly)" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

As used herein, elements having numbers more than 100 and less than 1000 generally refer to conventional elements known by one having ordinary skill in the art, while elements number 1000 and above refer to the present invention, or elements, components, and the like thereof. Like numbered elements generally refer to the same element; however, the like numbered elements may include a suffix "L" to designate the left side element and a suffix "R" to designate the right side element when left and right elements are mirrors (i.e., physical embodiment of mirror images) of each other. Similarly, a center (i.e., substantially centrally positioned) element may be designated with the suffix "C". The suffix "x" refers to a generic member of the particular element group (e.g., an element from a group having a number of similar elements "a-n"); hence, the suffix "(x+1)" refers to a serially, immediately higher element, and the suffix "(x−1)" refers to a serially, immediately lower element. When it is understood by one of skill in the art from the context of use, suffix designation may be omitted herein.

For clarity of Figures and explanation, conventional direct ("hard") electrical wiring and related connectors are not illustrated. One of ordinary skill in the art would understand the layout, positioning, and operational characteristics of such conventional elements. One of ordinary skill in the art would also understand that such direct electrical wiring generally may provide multi-message, bi-directional communications as well as multi-level (e.g., different levels of voltage and/or current) electrical power.

Conventional elements further generally include: (i) those elements associated with an unmanned ground vehicle (e.g., tracked robot, and the like) that is an exemplar of the vehicle to be deployed, extracted (i.e., retrieved), and stowed (i.e., transported, stored, held, etc.) in accordance with the present invention; (ii) those elements associated with a host vehicle, sub-system, vessel, receptacle, warehouse, or the like where the present invention may be installed (i.e., implemented, disposed, etc.); and/or (iii) programmable controller and computer hardware and memory, but not including the particular computer programming that is implemented in accordance with the present invention.

With reference to the Figures, the preferred embodiments of the present invention will now be described in detail. Generally, the present invention provides an improved system (e.g., a modular handling and stowage system 1000) and an improved method (e.g., a process 3000) for unmanned ground vehicle deployment, extraction, and stowage. However; as understood by one of skill in the art, the present invention is generally scalable such that other vehicles and apparatuses may be deployed, extracted, and stowed in accordance with the present invention.

Figure 2:
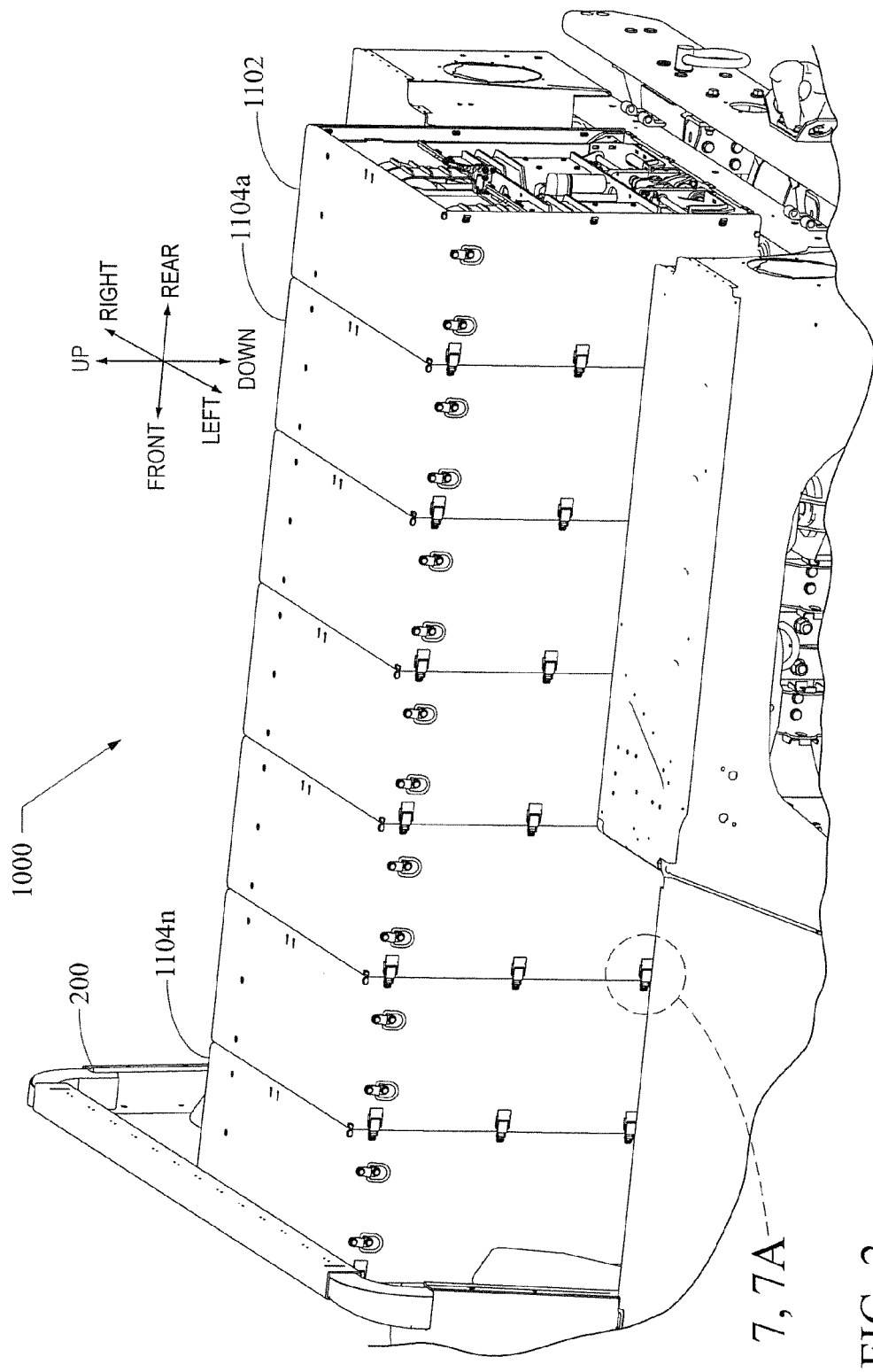
FIG. 2 is an isometric view of the system of FIG. 1 from the upper, left is shown as installed on a host vehicle.
Figure 3:
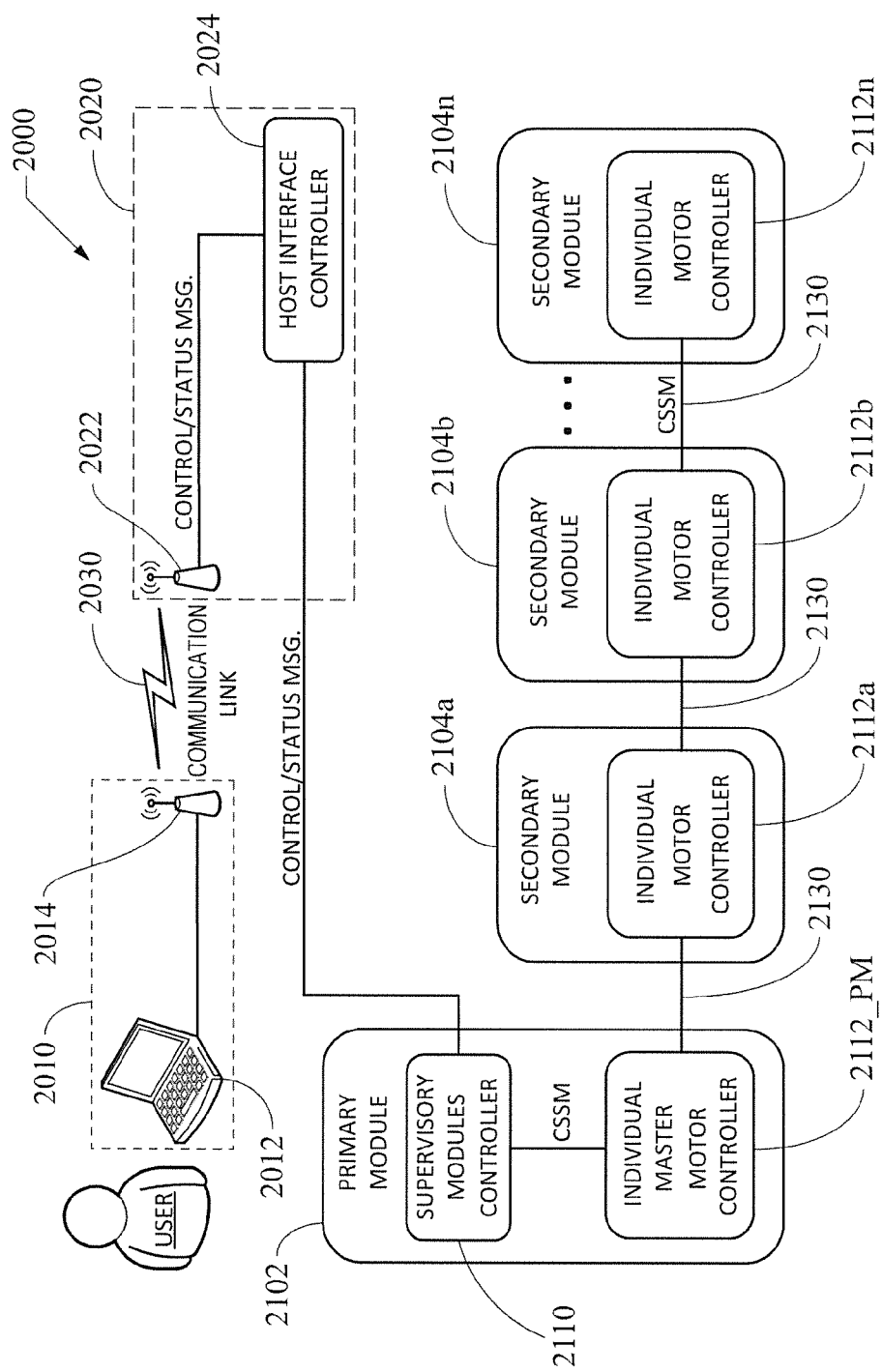
FIG. 3 is a block, electrical schematic diagram of a system control apparatus that is implemented in connection with the system of FIG. 1.

Referring to FIGS. 1-3, on FIG. 1 an isometric, perspective view of the system 1000 from the right, rear is shown; on FIG. 2, an isometric view of the modular handling and stowage system 1000 from the upper, left is shown as installed on a host (e.g., a vehicle, or another host such as a building, airplane, ship, trailer, etc.) 200 of which a partial, broken image is shown; and on FIG. 3, a block, electrical schematic diagram of a system control apparatus 2000 that is implemented in connection with the system 1000 is shown. The system modular handling and stowage 1000 generally comprises a master (e.g., primary, load/unload/store, end, full-function, etc.) module (e.g., container, unit, box, etc.) 1102, and the system control apparatus 2000.

In a preferred embodiment, the system further comprises at least one slave (e.g., secondary, limited-function, etc.) module 1104 (e.g., secondary modules 1104a-1104n). When the system 1000 is configured having the primary module 1102 implemented in connection with one or more of the secondary modules 1102, the modules 1102 and 1104 are positioned adjacently, and are generally serially and electrically coupled and mechanically coupled together.

Like named and numbered components and elements are generally implemented similarly whether implemented in connection with a primary box 1102 or a secondary box 1104. Further, as understood by one of ordinary skill in the art, similar naming and numbering of elements within the Detailed Description and Figures generally does not distinguish between primary module and secondary module implementations as the context will make clear the usage. In contrast, the Claims generally do include "primary" and "secondary" designations such that the usage is distinct and unambiguous to one of ordinary skill in the art.

The system 1000 is generally implemented in connection with at least one conventional small, tracked unmanned ground vehicle (e.g., UGV, robot, or the like) 100 as illustrated on FIG. 1 in a partially deployed mode. In one example, as illustrated on FIG. 1, the UGV 100 may be implemented having inner tracks 110 (e.g., left inner track 110L and right inner track 110R) and outer tracks 112 (e.g., left outer track 112L and right outer track 112R).

As described in more detail below, the modules 1102 and 1104 each stow one of the UGVs 100 in a substantially vertical orientation. The UGVs 100 are serially deployed and extracted (retrieved) to and from the system 1000 via (in and out of) the primary module 1102 via the system control apparatus 2000 under the direction (e.g., operation, supervision, management, etc.) of a User (e.g., operator, technician, Soldier, etc.). However, other vehicles (e.g., manned vehicles), devices, apparatus, and the like 100 may be advantageously deployed, extracted, and stored via the modular handling and stowage system 1000.

For purposes of description of directions, orthogonal coordinate referencing is generally assumed. Longitudinal (front/back, fore/aft, forward/backward, etc.) and lateral (left/right, side to side, etc.) directions relative to the system 1000 are generally as illustrated on FIG. 2, and are generally perpendicular to each other. As such, vertical (i.e., up/down, upward/downward, upper/lower, top/bottom, lift/lower, etc.) directions are generally perpendicular to the longitudinal/lateral (i.e., horizontal) plane (e.g., an earth or water body plane). Similarly, clockwise (CW) and counter-clockwise (CCW) rotational (angular) motions are referenced as viewed from the right towards the left about a right-left axis.

In the preferred embodiment, based on the electrical interface implemented for module 1102 to module 1104$a$-1104$n$ communications, and voltage drops limitations through the Ethernet and Universal Serial Bus (USB) networks, the maximum size recommended is twenty modules. However, other embodiments (e.g., wireless communications implementations) may provide more additional module implementation beyond twenty.

Referring to FIG. 2, an isometric view from the upper, left side of the system 1000 installed (e.g., mounted, fastened, positioned, placed, implemented, etc.) on the host 200 (partially illustrated via a broken image) is shown. The system 1000 may be implemented in connection with any appropriate host 200. For example, the host 200 may be implemented as a manned or unmanned vehicle, container, wagon, trailer, cargo hold, aircraft, water craft, or the like.

Each of the boxes 1102 and 1104 generally provides containerized stowage of the desired conventional small, tracked unmanned ground vehicle (e.g., UGV, robot, or the like) 100 as well as electro-mechanical elements (e.g., sub-systems, devices, apparatuses, and the like) to provide loading, unloading, and tilting of the robot 100. That is, each unit 1102 and/or 1104 may contain a UGV 100 and enables remote extraction (e.g., removal of the UGV 100 from an operation environment for stowage in the system 1000 on the host 200) and deployment (e.g., unloading the UGV 100 from the system 1000) on the host 200. There is generally a plurality of the robots 100 implemented in connection with the system 1000. However, one or more of any of the units 1102 and/or 1104 may be left empty (e.g., a "No UGV" state).

The system 1000 may minimize the horizontal stowage space that is implemented in connection with the host 200 for each small UGV 100. Each of the modules 1102 and/or 1104 generally implements the capability to position and stow the robot 100 in a substantially vertical orientation which may maximize the number of robots 100 carried via the host 200.

The modular handling and stowage system 1000 generally implements a common ingress/egress point/path for the UGVs 100 (e.g., in/out of the primary module 1102 as illustrated, for example, on FIG. 2 as via the rear of the host vehicle 200). Each module 1102 and/or 1104 of the modular handling and stowage system 1000 interlinks electrically and mechanically to the other units 1102 and/or 1104; and the robot(s) 100 exit and enter the system 1000 from a common point, i.e., the rear of the master module 1102.

Referring to FIG. 3, a block electrical schematic diagram illustrating the system control (management, operation, etc.) apparatus (e.g., system controller) 2000 is shown. The system control apparatus (e.g., assembly, group, etc.) 2000 generally monitors and controls the operation (e.g., process, steps, method, etc.) of the system 1000 as directed by the User. In one embodiment, the system control apparatus 2000 comprises an operation control sub-system 2010, a host interface system 2020, a wireless communication link 2030, and a primary module control sub-system 2102. Within (e.g., throughout) the system 1000 the system control apparatus 2000 generally manages via a plurality of signals (e.g., messages, transmissions, communications, and the like) (e.g., signals Control/Status Msg or, alternatively in some uses herein, abbreviated, CSSM, to designate the same signals) that control, command, indicate status, provide sensor output, actuator input, warning, power and/or power transmission, and the like. The specific role of a given signal CSSM will be understood by one of ordinary skill in the art.

In another embodiment, e.g., when the system 1000 is implemented without the host 2000, the host interface system 2020 may be omitted.

The operation control sub-system 2010 generally includes an operator control unit (OCU) 2012 by which the User monitors and controls the modular handling and stowage system 1000 (e.g., via screen images, graphical user interfaces, keyboard and/or touch-screen entry, joystick manipulation, etc.), and a first communications link transceiver 2014 that is electrically coupled (interlinked, linked, etc.) to the OCU 2012. The host interface system 2020 is generally implemented in connection with (e.g., installed on, mounted to, etc.) the host 200, and comprises a second transceiver 2022 and a host interface controller 2024 that is electrically coupled to the second transceiver 2022. The host interface controller 2024 is generally electrically coupled to the primary module control sub-system 2102. When the modular handling and stowage system 1000 is implemented without the host interface system 2020, the host interface controller 2024 is generally not included.

The primary module control sub-system 2102 comprises a supervisory modules controller 2110, and an individual motor controller 2112 (e.g., a motor controller 2112_PM). The supervisory modules controller 2110 may be directly electrically coupled to the host interface controller 2024. The supervisory modules controller 2110 is generally electrically coupled to the primary motor controller 2112_PM.

The communication link 2030 generally provides a wireless, bi-directional communication path between the operation control sub-system 2010 and the host interface system 2020, and thereby, between the User and the system 1000 which is mounted on the host 200.

When the modular handling and stowage system 1000 includes one or more of the secondary storage modules 1104, each secondary storage module 1104 comprises a secondary sub-system controller 2104 (e.g., secondary sub-system controllers 2104-2104$n$) that is generally operated in a so-called slave mode. The secondary sub-system controller 2104 includes an individual motor controller 2112 (e.g., motor controllers 2112$a$-2112$n$). All of the motor controllers 2112 are generally serially electrically coupled (e.g., via a serial communication link 2130) such that the supervisory modules controller 2110, which is generally operated in a so-called master mode, provides communication (e.g., monitor and control of operations via signals, Control/Status Msg or CSSM) to all of the modules 1102 and/or 1104. As such, monitor and control operations of the system 1000 are provided to and from the User via the control sub-system 2000.

Figure 4A:
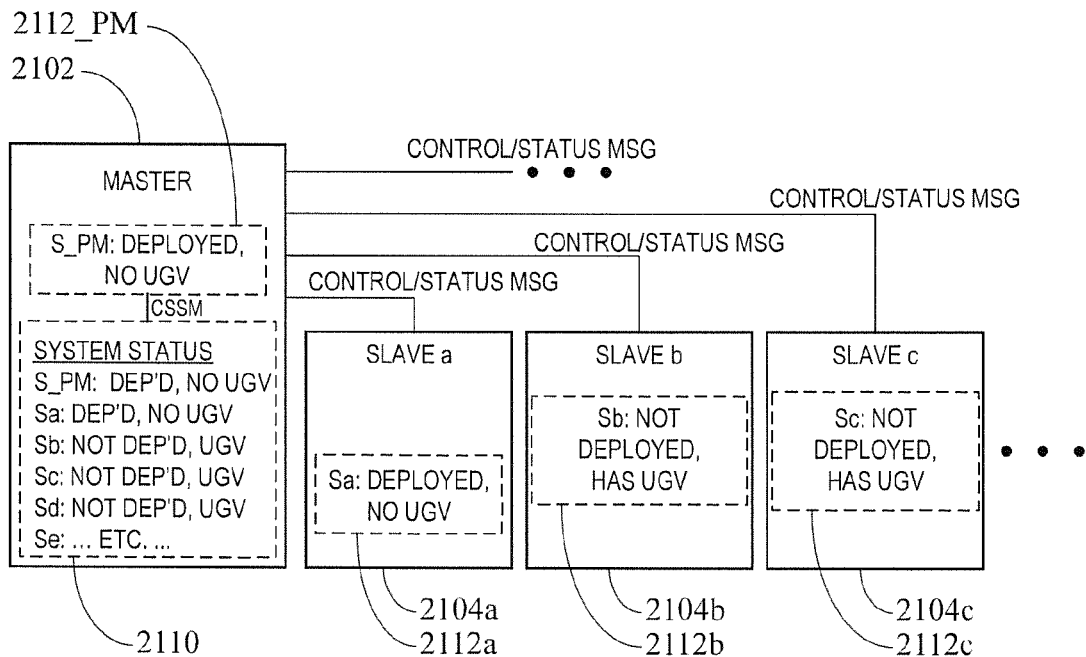
FIGS. 4(A-B) are block diagrams illustrating examples of a variety of information that may be observed, controlled, communicated, and monitored in the system of FIG. 1 via the system control apparatus of FIG. 2.
Figure 4B:
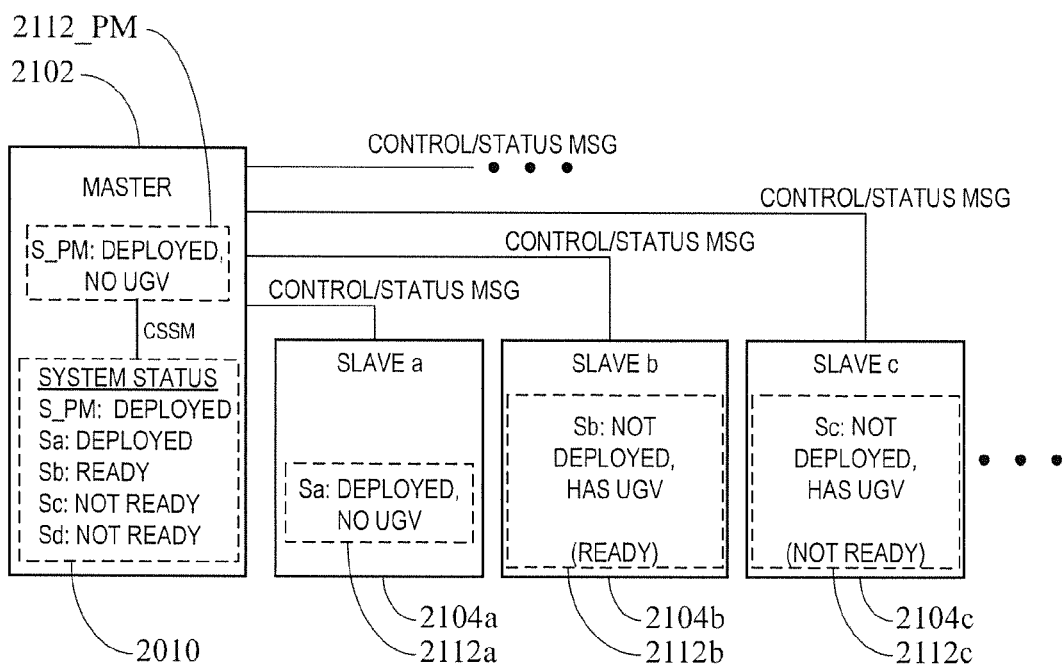

Referring to FIGS. 4(A-B), block diagrams illustrating two examples of a variety of information (e.g., data, commands, statuses, states, poses, and the like) that may be observed, controlled, communicated, and monitored in the modular handling and stowage system 1000 via the system control apparatus 2000 are shown. The primary module control sub-system 2102 generally includes the real time status (e.g., Sx, where x indicates a particular module 1102 or 1104) for the primary module 1102, and the secondary modules 1104 in the supervisory modules controller 2110. The information that is presented via a status message signal (e.g., the signal Control/Status Msg or CSSM) from the individual motor controllers 2112 to the supervisory modules controller 2110 may be in terms of executing an extraction or deployment command or operation, and may also include real time information with regards to the presence of the robot 100 within each module 1102 and/or 1104, and whether each module 1102 and/or 1104 is an extraction or deployment mode of operation of the robot 100, and the like.

In one example (illustrated on FIG. 4A), the individual motor controller 2112_PM presents a status (e.g., state) message signal (e.g., S_PM) "Deployed, No UGV" to the supervisory modules controller 2110; the individual motor controller 2112a presents a status signal (e.g., Sa) "Deployed, No UGV" to the supervisory modules controller 2110; the individual motor controller 2112b presents a status signal (e.g., Sb) "Not Deployed, Has UGV" to the supervisory modules controller 2110; and the individual motor controller 2112c presents a status signal (e.g., Sc) "Deployed, Has UGV" to the supervisory modules controller 2110.

In another example (illustrated on FIG. 4B), the individual motor controller 2112_PM presents the status signal, S_PM, "Deployed, No UGV" to the supervisory modules controller 2110; the individual motor controller 2112a presents the status signal, Sa, "Deployed, No UGV" to the supervisory modules controller 2110; the individual motor controller 2112b presents the status signal, Sb, "Not Deployed, Has UGV, (Ready)" to the supervisory modules controller 2110; and the individual motor controller 2112c presents the status signal, Sc, "Deployed, Has UGV, (Not Ready)" to the supervisory modules controller 2110.

The system control apparatus (controller) 2000 generally limits deployment of the UGVs 100 from the modules 1102 and 1104 to the UGVs 100 that are in a condition for deployment (e.g., a "Ready" state or mode). The supervisory modules controller 2110 also generally provides extraction/storage/deployment operation, and interlock lockout failsafe to each module 1102 and 1104 to eliminate deployment errors. In particular, as well as status signals, the system control apparatus 2000 generally communicates signals with the system 1000 that may be related to command and control operations (e.g., lift, lower, actuate, extend/retract, deploy, extract, power on/off, rotate, feedback, etc.), and monitoring (e.g., alert) (e.g., safe/not safe, clear/blocked, in/out of position/alignment, etc.). More details of the operation of the modular handling and stowage system 1000 via the system control apparatus 2000 are provided below.

Figure 5A:
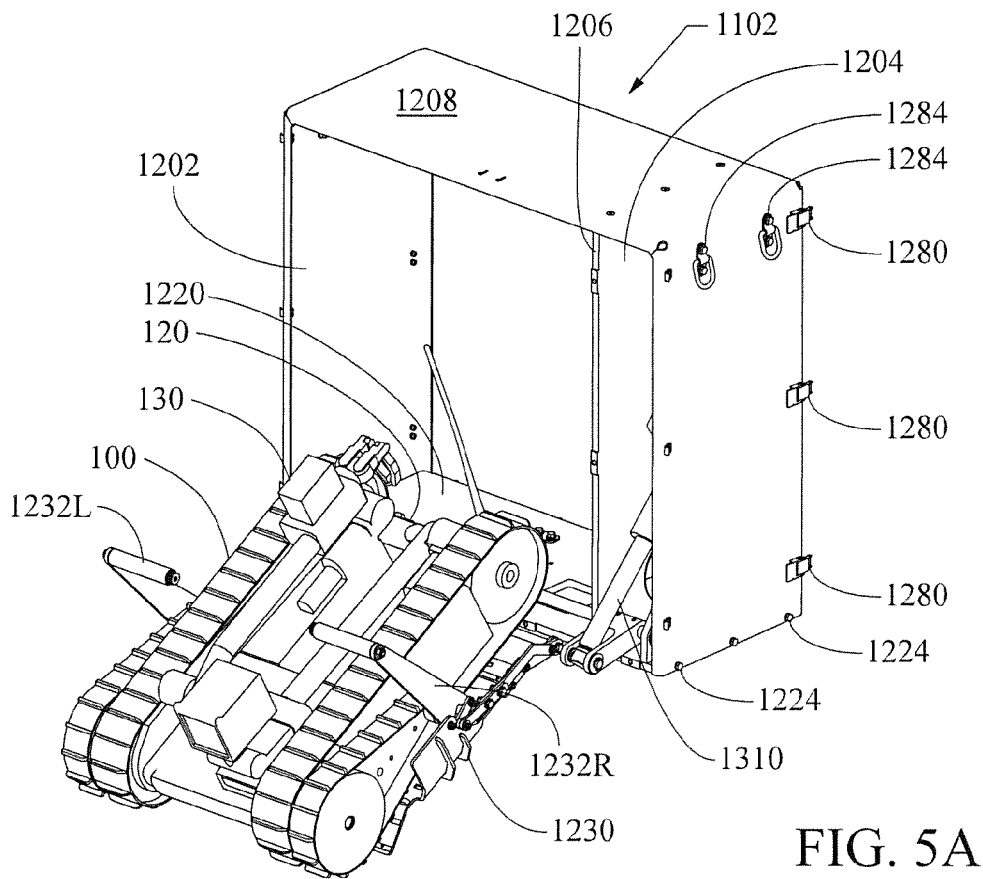
FIGS. 5(A-B) are isometric views from the upper, right, rear of a primary container of the system of FIG. 1, and a vehicle that may be implemented in connection with the system of FIG. 1.
Figure 5B:
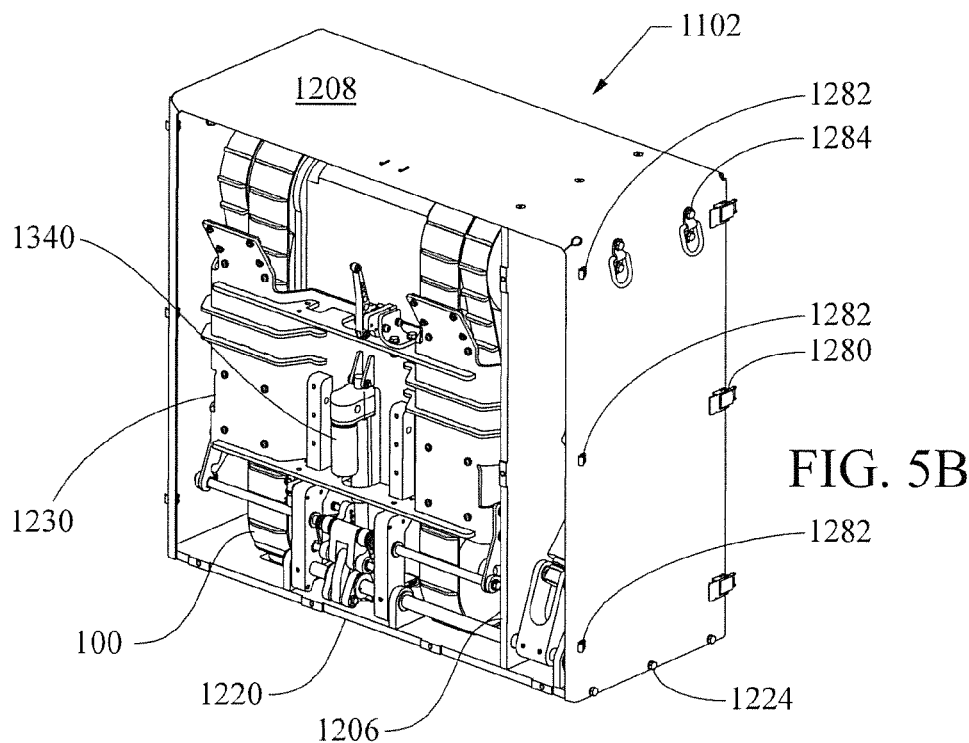

Referring to FIGS. 5(A-B), isometric views from the upper, right, rear of the primary container 1102 and the UGV 100 in a deploying/loading/unloading state (FIG. 5A), and a clamped and stowed state (FIG. 5B) are illustrated. The UGV 100 further comprises a nose 120 and a camera 130 (e.g., a manipulator camera 130). The manipulator camera 130 generally faces forward and provides the User a forward view images as one or more of the monitor signals. However, in alternative embodiments, the camera 130 may have alternative orientation to meet the design criteria of the particular implementation.

The unit 1102 generally comprises a storage compartment (i.e., region, zone, space, area, etc.) 1202; an operation mechanism compartment 1204; a wall (e.g., bulkhead, divider, partition, plate, separator, etc.) 1206; a shell (i.e., cover, enclosure, housing, jacket, shroud, casing, etc.) 1208; a base (e.g., bottom, main support, and the like) 1220; and a tray assembly (e.g., pan, platform, platter, carriage, and the like) 1230 which includes track clamp arms 1232 (e.g., left and right track clamp arms 1232L and 1232R, respectively).

The storage space 1102 is generally sized to receive and stow one vehicle 100 in a substantially vertical orientation (that is, laterally tilted 90 degrees from a normal mode of operation). The operation mechanism compartment 1204 is generally sized to hold and protect a portion of the system 1000 control and operation devices as described in further detail below. The wall 1206 generally vertically and longitudinally defines the separation between the storage zone 1202 and the operation mechanism compartment 1204, and provides a mounting surface for elements (e.g., components, sub-assemblies, etc.) as described in detail below.

The cover 1208 is generally shaped as an inverted U and comprises three of the four sides to a rectangle with the base 1220 comprising the fourth side of the rectangle when viewed from the front or rear. The cover 1208 is generally mechanically coupled to the base 1220 via a plurality of bolts or screws 1224. The cover 1208 generally further comprises cooperatively mating draw latch clasp 1280 and hook 1282 assemblies, and lift D-rings 1284.

The module base 1220 further generally provides a mounting surface for elements (e.g., components, assemblies, sub-systems, and the like) as described in detail below.

The master module tray 1230 generally provides (i) a ramp for deployment and extraction (i.e., ingress/egress) of the vehicle 100, (ii) a constraining surface for storage of the vehicle 100, and (iii) a mounting surface for elements (components) as described in detail below. The track clamp arms 1232 are generally implemented as L-shaped members having the short leg of the L directed inward. In response to a control signal, the track clamp arms 1232 are generally rotated such that the short leg of the L presses against the tracks 110 to hold the vehicle 100 firmly in place in the tray 1230.

Figure 6A:
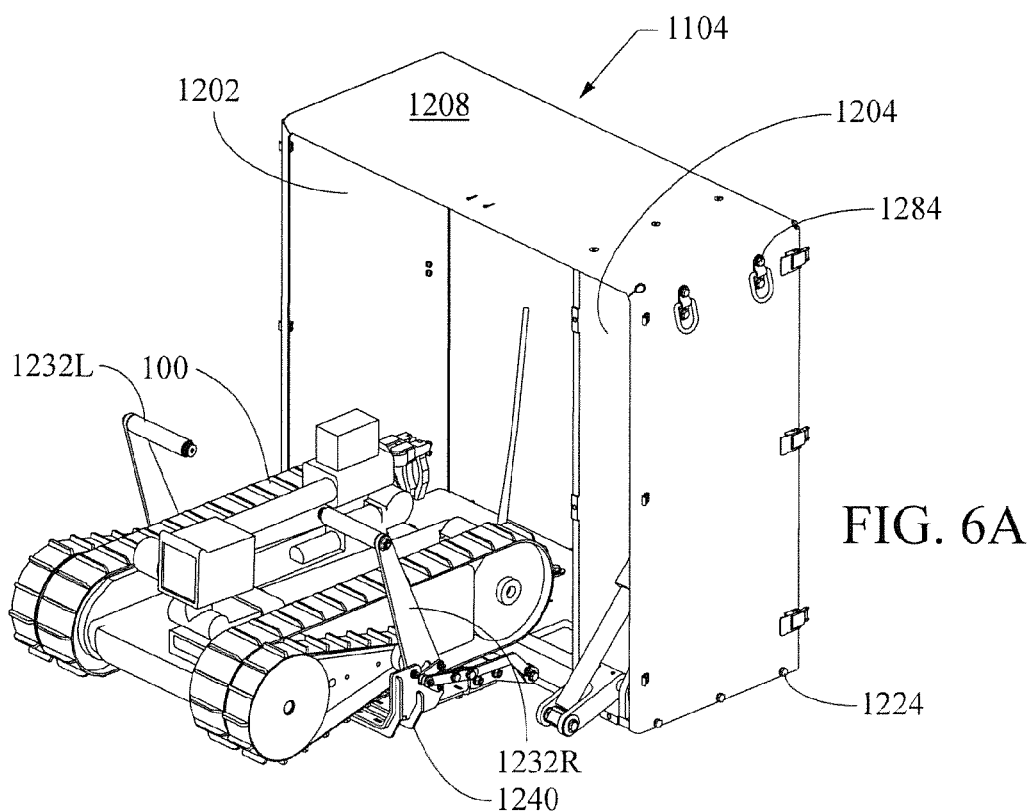
FIGS. 6(A-B) are isometric views from the upper, right, rear of a secondary container of the system of FIG. 1, and the vehicle that may be implemented in connection with the system of FIG. 1.
Figure 6B:
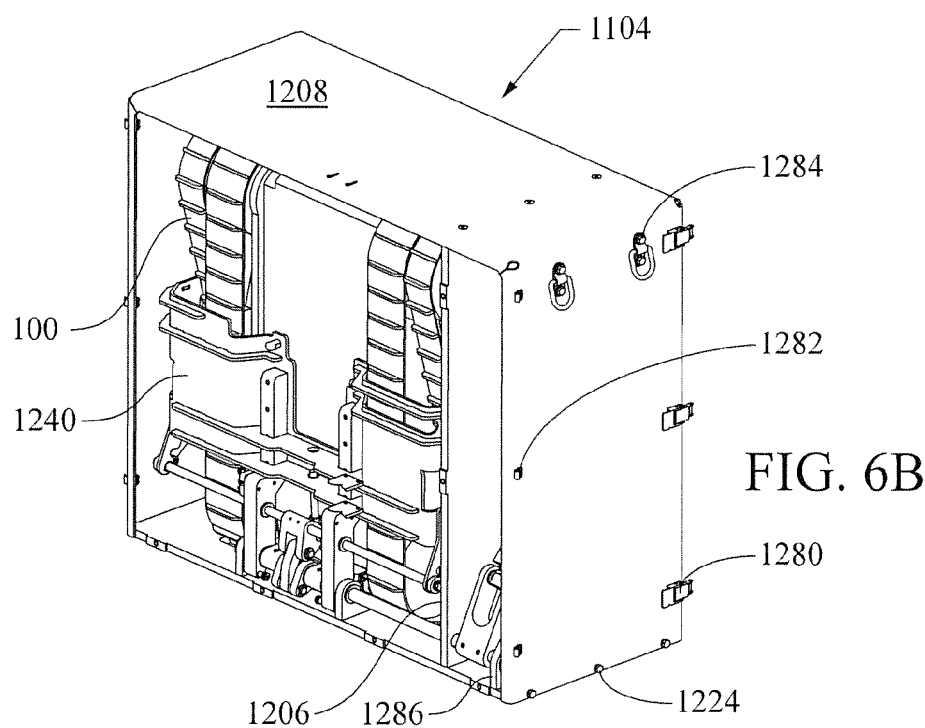

Referring to FIGS. 6(A-B), isometric views from the upper, right, rear of the secondary container 1104 and the UGV 100 in a deploying/loading/unloading state (FIG. 6A), and a clamped and stowed state (FIG. 6B) are illustrated. The secondary container 1104 is generally implemented similarly to the primary container 1102; however, in lieu of the tray 1230, the secondary container 1104 includes a secondary tray assembly 1240. Likewise, as is made clear in the description below, some of the control and operation components and processes that are described in detail below may be implemented differently as between the primary container 1102 and the secondary container 1104.

Figure 7:
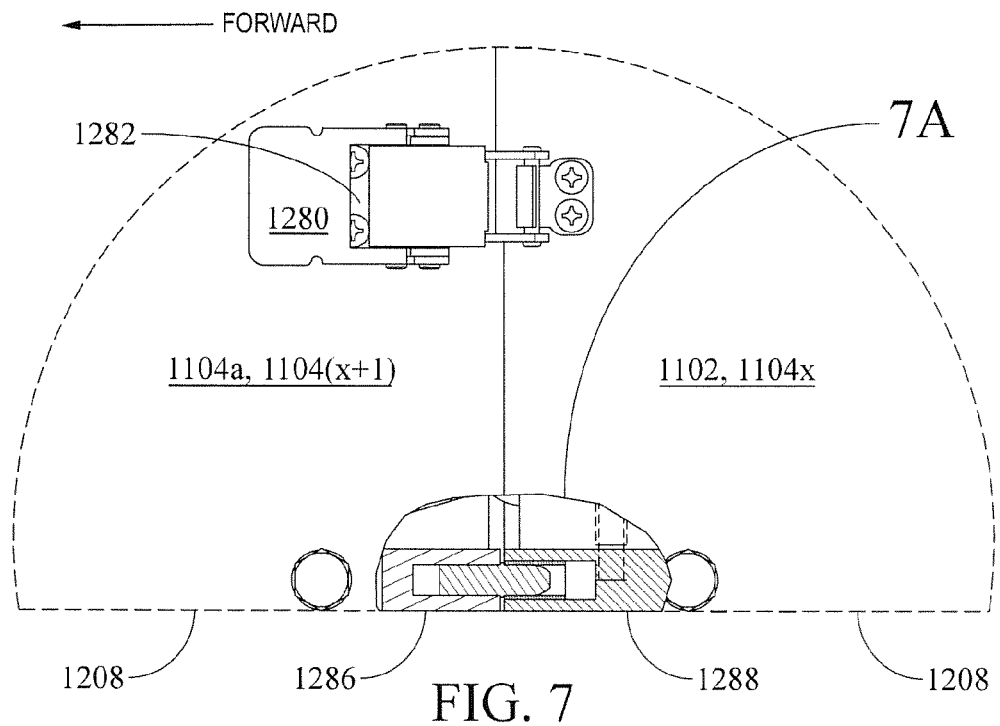
FIG. 7 with inset 7A are exemplary broken sections from FIGS. 2, 5B, and 6B of a side elevation sectional view illustrating details of the mechanical coupling of adjacent modules of the system of FIG. 1.

Referring to FIG. 7, and referring back to FIGS. 2, 5(A-B) and 6(A-B), exemplary broken sections with inset 7A from FIGS. 2, 5B, and 6B of a side elevation sectional view illustrating details of the mechanical coupling of adjacent modules 1102 and 1104 (e.g., the primary module 1102 and the secondary module 1104a, or the module 1104x and the module 1104(x+1)) are shown. The mating draw latch clasp 1280 and hook 1282 assemblies generally mechanically couple (interconnect) adjacent containers 1102 and 1104 or 1104 to 1104 via a compressive force interlocking system. Alignment of adjacent modules 1102 and 1104 or 1104 to 1104 is generally achieved via pin/hole alignment devices (e.g., a bullet shaped pin (e.g., male) device 1286 and a mating hole (e.g., female) device 1288) in combination with the draw latch clasp 1280 and hook 1282 assemblies.

Figure 8:
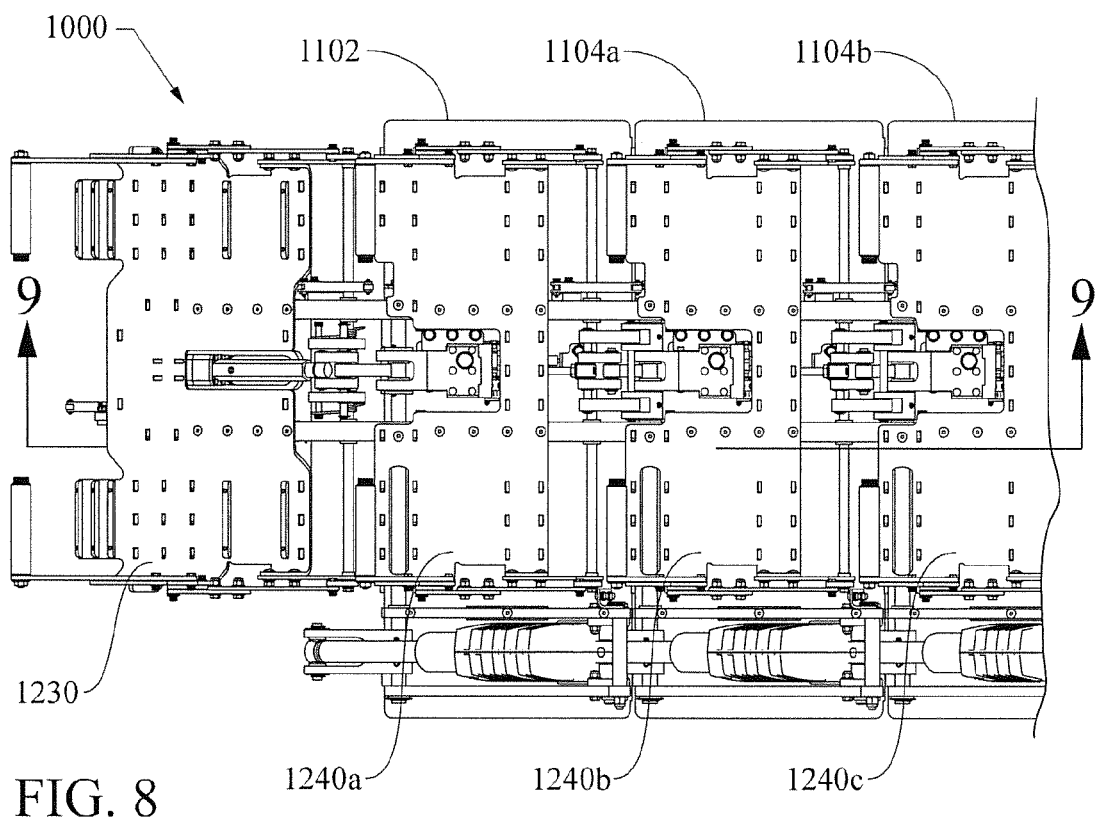
FIG. 8 is a top (plan) view of the rear portion of the system of FIG. 1 with module covers removed from the interconnected modules.

Referring to FIG. 8, a top (plan) view of the rear portion of the modular handling and stowage system 1000 with the covers 1208 removed from the interconnected boxes 1102, 1104a and 1104b and without a UGV 100 aboard for clarity is shown. Each of the slave modules 1104 (e.g., the slave modules 1104a-1104c) comprises a UGV (robot) 100 the support tray 1240 (e.g., the platforms 1240a-1240c), which when lowered, provides overlap into the rearwardly adjacent module 1102 and/or 1104 for interconnecting the continuous ingress and egress path for the robots 100 to traverse upon throughout the system 1000.

Figure 9:
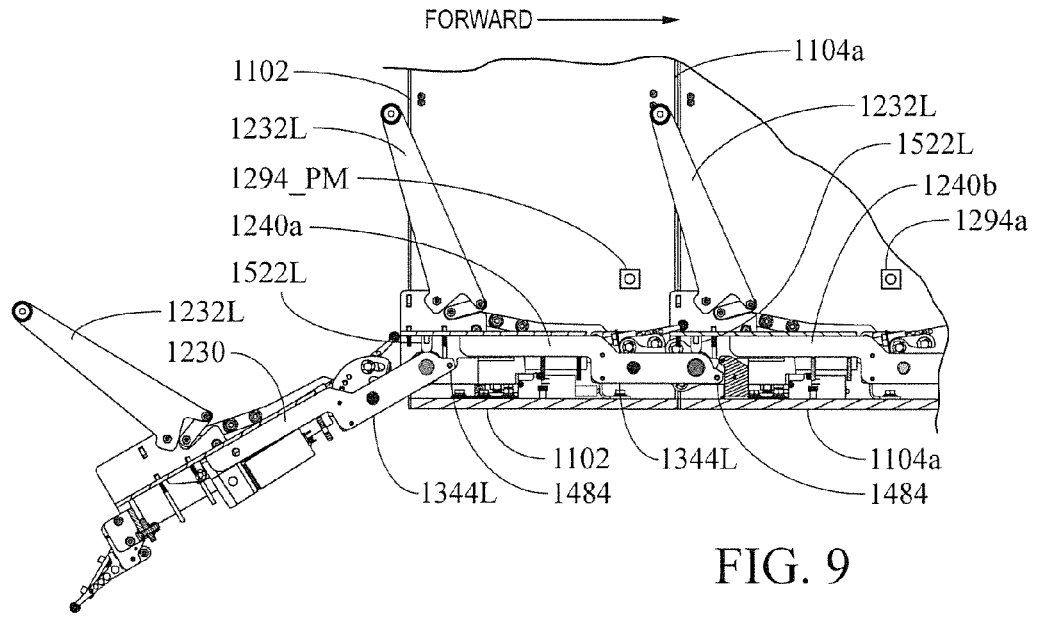
FIG. 9 is a side sectional view taken at line 9-9 on FIG. 8.

Referring to FIG. 9, a side sectional view taken at line 9-9 on FIG. 8 is shown. FIG. 9 also illustrates the support tray 1240 (e.g., the platforms 1240a-1240c), which when lowered, provides overlap into the rearwardly adjacent module 1102 and/or 1104 for interconnecting the continuous ingress and egress path for the robots 100 to traverse upon throughout the system 1000.

Figure 10:
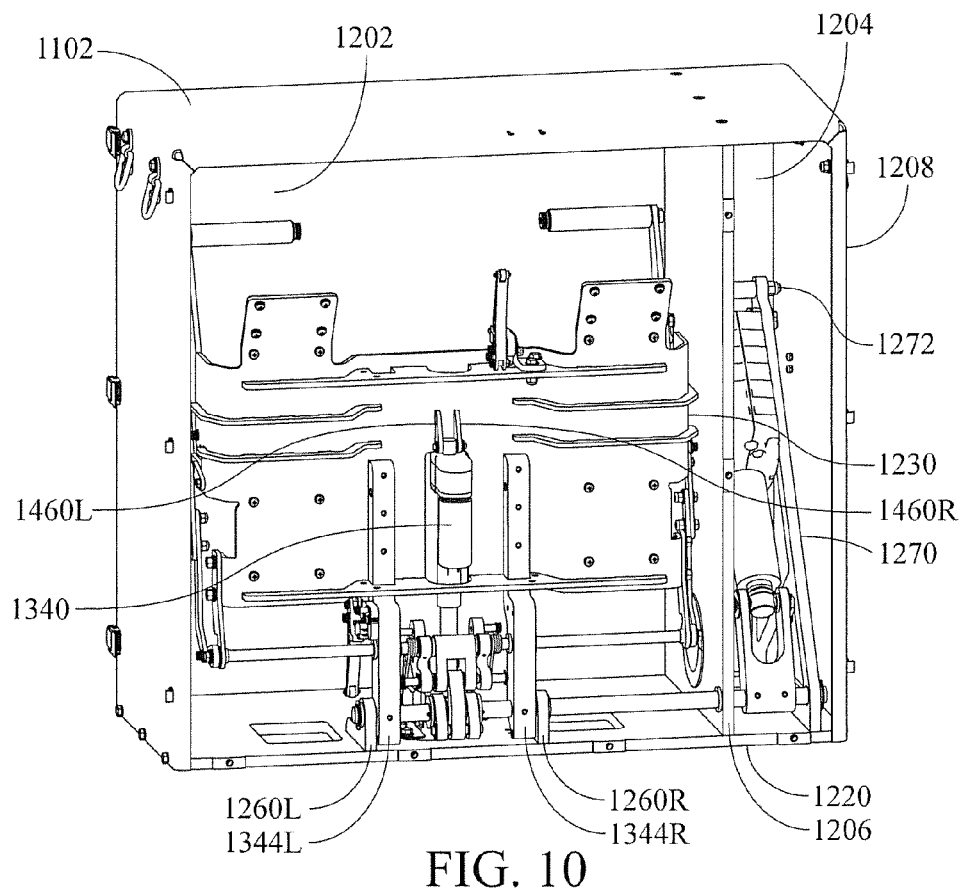
FIG. 10 is an isometric view from the lower, left, rear of the primary module of the system of FIG. 1.

Referring to FIG. 10, an isometric view from the lower, left, rear of the primary module 1102 without the vehicle 100 is shown. Some elements are omitted for clarity. The module 1102 may be an example embodiment of the UGV deployment and extraction master module that is implemented in accordance with the present invention. The primary, full-function module 1102 generally comprises the wall plate 1206, the shroud cover 1208, the base plate 1220, and the UGV support tray assembly 1230.

The primary module 1102 further comprise bearing support plates (e.g., brackets, flanges, etc.) 1260 (e.g., left and right bearing support flanges 1260L and 1260R, respectively) that are mounted vertically on the base 1220 into the storage compartment 1202, and an actuator mounting plate (e.g., bracket, flange, truss, or the like) 1270 that is mounted vertically on the base 1220 into the operation mechanism compartment 1204 and is retained at the top via a truss mounting bolt 1272 that is mechanically coupled into the partition 1206.

The primary module support tray 1230 is generally sized and configured, in connection with additional elements as described in detail below, to grasp and rotate a selected UGV 100 from a variable deployed position (horizontal to negative 30 degree depression angle) to a substantially vertical position for stowage in response to an appropriate "store" control signal (e.g., command), and the reverse process for deployment in response to a "deploy" control signal.

A typical primary module 1102 in accordance with this invention for the selected UGV 100 may have an overall size envelope of 29" tall by 32" wide by 13" deep. However, master module 1102 is generally sized to accommodate any desired UGV 100, to meet a given design criteria of a particular implementation.

Figure 11:
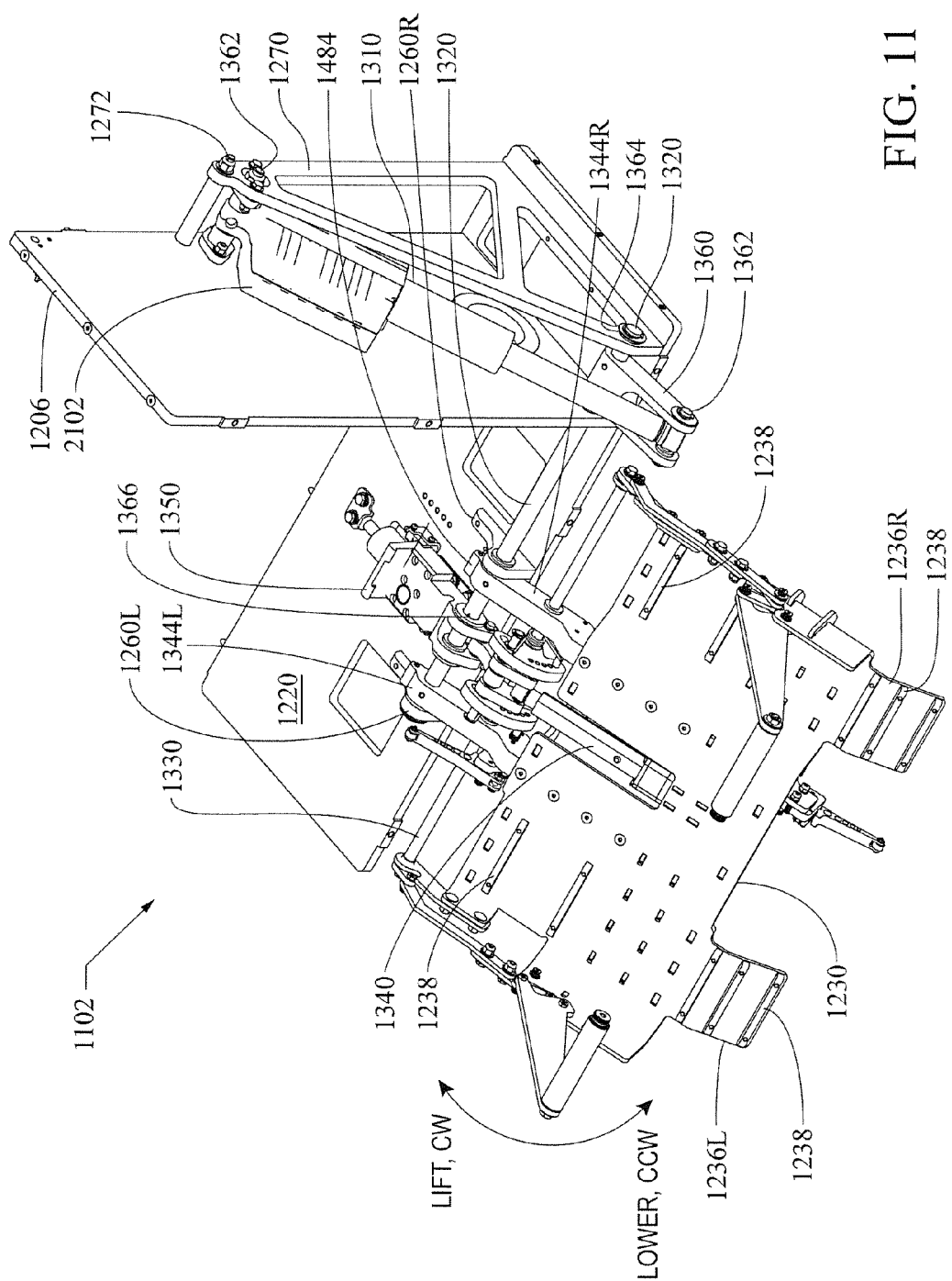
FIG. 11 is an isometric view from the rear, upper right of the primary module of the system of FIG. 1.

Referring to FIG. 11, an isometric view from the rear, upper right of the full-function unit 1102 with the cover 1208 removed for clarity is illustrated. The master module 1102 further comprises a lifting (lift) linear actuator 1310, a main drive shaft 1320, an intermediate shaft 1330, a clamping (clamp) linear actuator 1340, module tray support arms 1344 (e.g., left and right tray support arms 1344L and 1344R, respectively, that are secured to the bottom of the tray 1230), a clamp dog 1350 that is generally centrally laterally mounted in the storage compartment 1202 on the base 1220, a lift arm 1360, and cylindrical pins 1362.

In addition, the master module support tray 1230 further comprises ramp extensions (e.g., feet, sections, etc.) 1236 (e.g., left and right ramp extensions 1236L and 1236 R, respectively), and a plurality of laterally positioned tread lugs (e.g., cleats) 1238. The module tray support arms 1344 further comprise rearward oriented extension legs 1484 (e.g., left and right extension legs 1484L and 1484R, respectively). (Refer, also, back to FIG. 9).

The lift linear actuator 1310 and the clamping linear actuator 1340 are generally implemented as bidirectional electrical linear actuators that extend and retract in response to control signals (e.g., the signals, Control/Status Msg (CSSM)) via the primary module control sub-system 2102 (generally mounted on the lift linear actuator 1310), the supervisory modules controller 2110, and/or the individual motor controller 2112_PM. The lift linear actuator 1310 and the clamping linear actuator 1340 may also provide positional feedback signals (e.g., indication of the position of the actuator shaft) to the primary module control sub-system 2102. The clamp dog 1350, in connection with the track clamp arms 1232, is generally implemented to hold the vehicle 100 in the stowed position.

The lifting and lowering (where lift is designated as clockwise (CW) motion (rotation) and lower is designated counterclockwise (CCW) motion) of the UGV support primary module tray 1230 is generally provided via the linear lift actuator 1310 in connection with the main drive shaft 1320, the tray support arms 1344, and the lift arm 1360. The lift/lower angular range of motion provided to the support tray 1230 is generally from at least 30 degrees below the horizontal to 90 degrees (i.e., vertical (refer back, for example, to FIGS. 5A-5B)).

The linear lift actuator 1310 is generally rotationally pinned via a first of the pins 1362 through the actuator plate 1270 and the wall 1206 at a first end, and rotationally pinned via a second of the pins 1362 through legs of the lift arm 1360 at the second end. The lift arm 1360 is securely mechanically coupled (i.e., fastened) to the main drive shaft 1320, thereby translating linear extension/retraction motion of the lift actuator 1310 into rotation of the main drive shaft 1320, thus providing the lift/lower motion of the tray 1230. The main drive shaft 1320 is generally supported along its length by bearings in the actuator plate 1270, wall plate 1206, and the bearing support plates 1260. Retaining rings (e.g., c-clips, e-clips, and the like) 1364 at the ends of the main shaft 1320 may axially constrain the main drive shaft 1320, thereby permitting only one degree of freedom, that is, rotation of the main shaft 1320.

The main drive shaft 1320 generally runs laterally through holes in the support arms 1344 of the UGV support tray 1230 and is securely, non-pivotally attached (fixed) to the support arms 1344 of the tray 1230. The main drive shaft 1320 generally runs through bearings in the clamping dog 1350, thereby providing free rotation of the clamping dog 1350 relative to the main drive shaft 1320. The lateral motion of the clamp dog 1350 is generally constrained by pins 1366 that are installed through the main drive shaft 1320 on both sides of the clamp dog 1350 (see also, FIG. 12).

Figure 12:
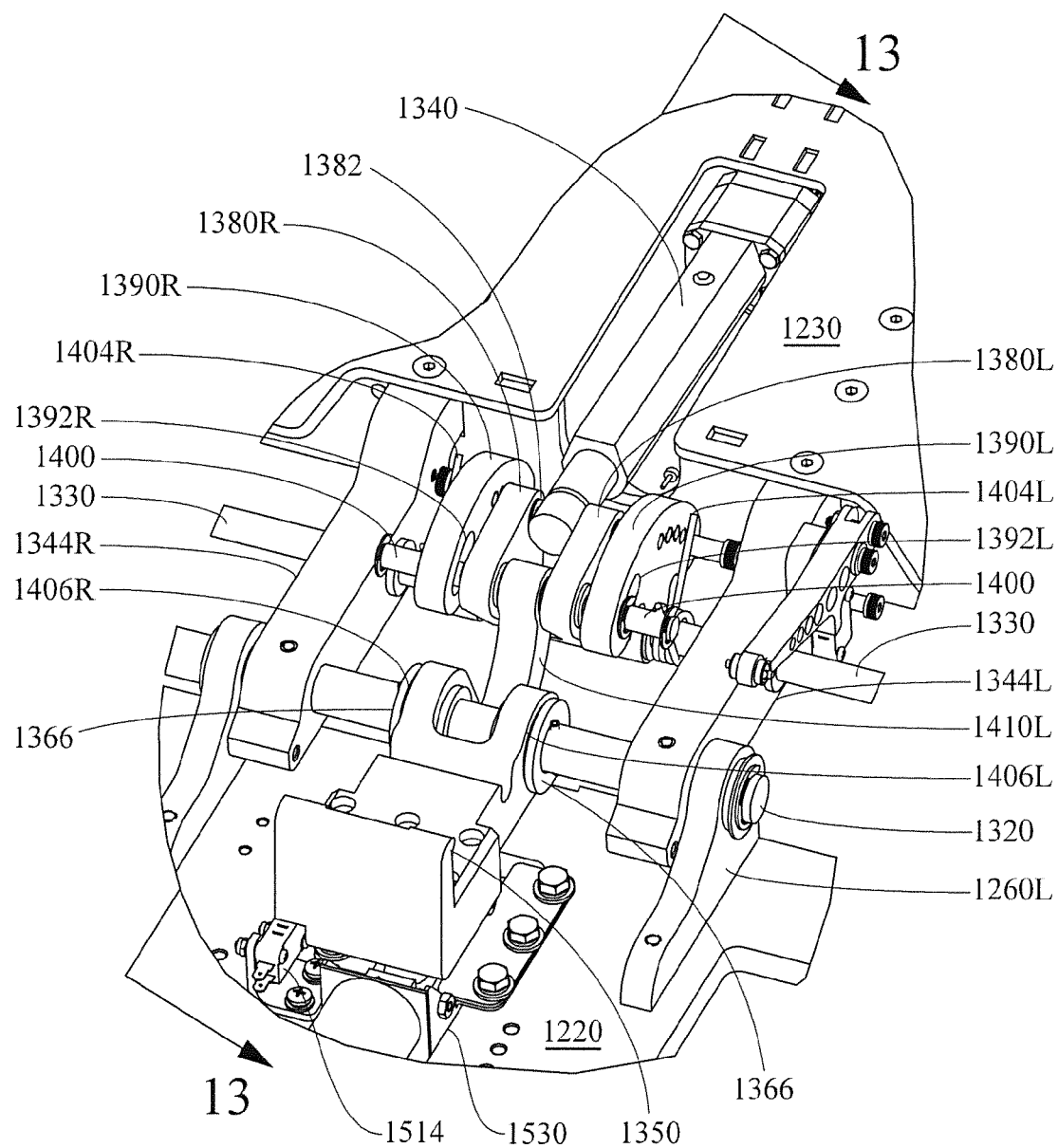
FIG. 12 is, an isometric view from the left, upper, front of a broken out portion from FIG. 11 of the primary module of the system of FIG. 1.
Figure 13A:
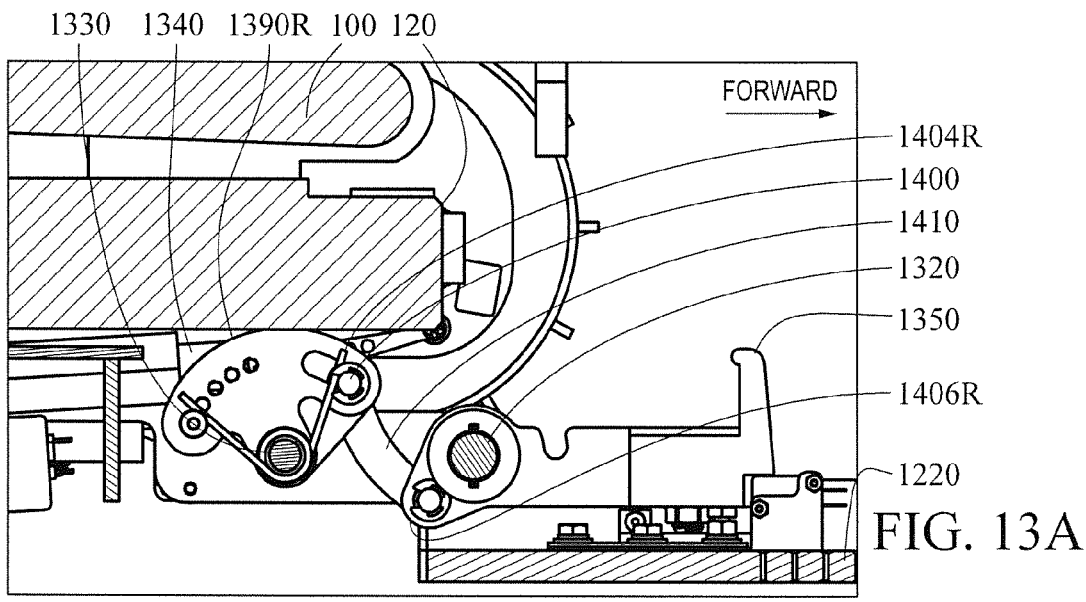
FIGS. 13(A-C) are sectional side views of the primary module of the system of FIG. 1 taken at line 13-13 of FIG. 12 with a vehicle included on the primary module.
Figure 13B:
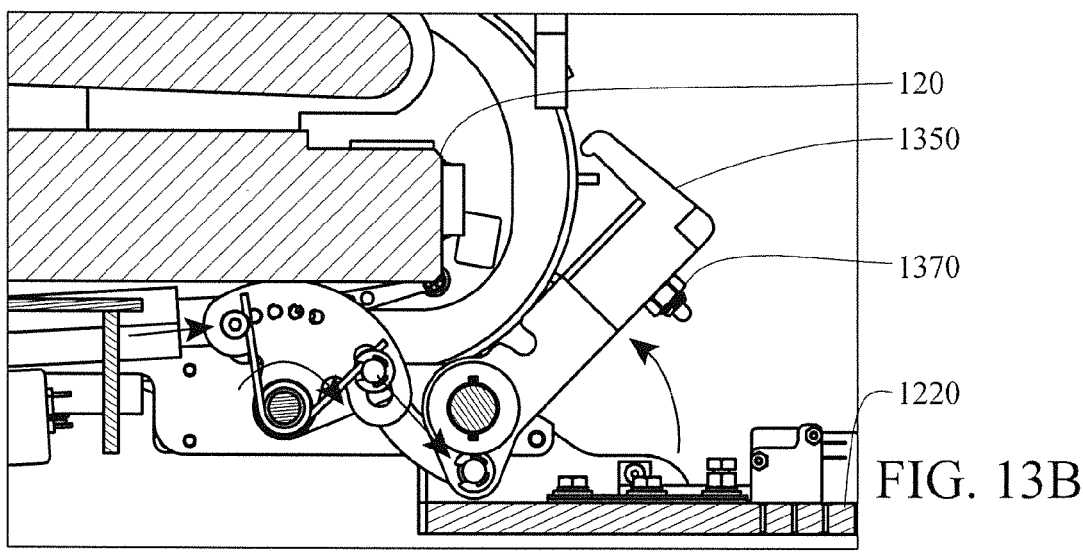
Figure 13C:
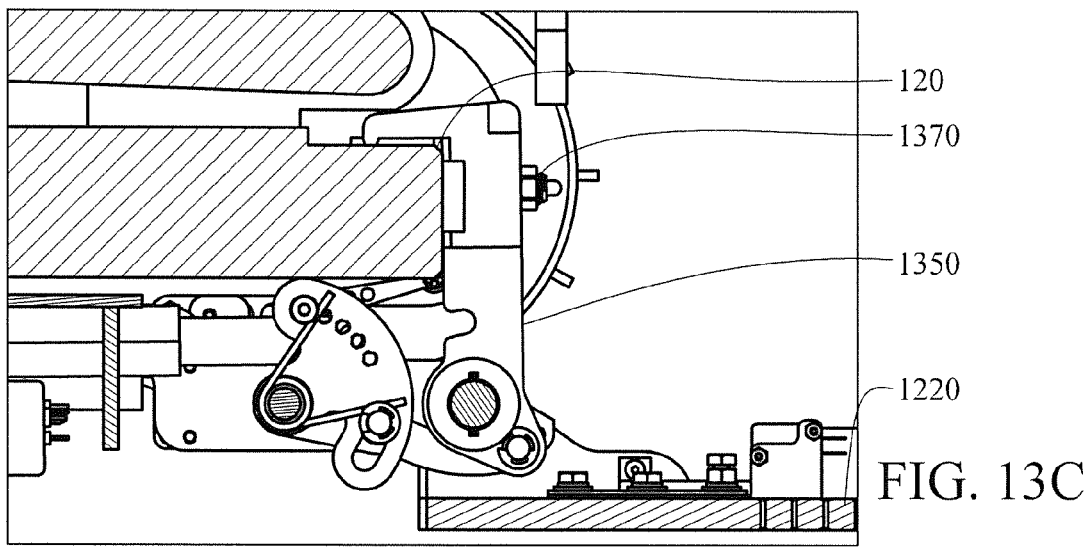

Referring to FIG. 12, an isometric view from the left, upper, front of a broken out portion of the primary module 1102 illustrated on FIG. 11 is shown; and also referring to FIGS. 13(A-C), whereon sectional side views of the primary module 1102 taken at line 13-13 of FIG. 12 with a vehicle 100 included on the primary module support tray 1230 with the primary module support tray 1230 is at a substantially horizontal position are shown. FIGS. 13(A-C) illustrate operation of the clamp dog 1350 and associated elements during a closing/opening (i.e., clamping/unclamping) operation on the front of the vehicle 100 (i.e., the nose 120) in response to an appropriate control signal. In particular, FIG. 13A illustrates the clamp dog 1350 in a fully open (i.e., raised, up, etc.) position; FIG. 13B illustrates the clamp dog 1350 in a partially open/partially closed (i.e., intermediate) position; and FIG. 13C illustrates the clamp dog 1350 in a fully closed/clamped position (i.e., the clamp dog 1350 clamped on the UGV nose 120). As also illustrated on FIGS. 13(A-C), the clamp dog 1350 further comprises a switch plunger assembly 1370 which is described in detail below, for example, in connection with FIGS. 24 and 25.

The UGV support tray assembly 1230 comprises the intermediate shaft 1330 which runs through bearings in the UGV tray support arms 1344, thereby providing free rotation of the intermediate shaft 1330 relative to the UGV support tray 1230. The support tray assembly 1230 further comprises a rocker device having cantilever rockers 1380 (e.g., left and right rockers 1380L and 1380R, respectively), a primary cantilever rocker pin 1382, sector shaped slider plates 1390 (e.g., left and right slider plates 1390L and 1390R, respectively), a rocker cross pin 1400, rocker torsion springs 1404, dog clamp lugs (e.g., legs, flanges, projections, etc.) 1406 (e.g., left and right dog clamp lugs 1406L and 1406R, respectively) that extend off the clamp dog 1350, and an arc-shaped clamp linkage (e.g., curved bar) 1410.

The cantilever rockers 1380 are generally triangular shaped and include lateral holes at each of the three vertices. The cantilever rockers 1380 generally pivot (rotate) freely about the intermediate shaft 1330 at the first hole. The two slider plates 1390 are rigidly (i.e., non-rotatably, firmly, etc.) attached at the vertices to the intermediate shaft 1330 outboard of the cantilever rockers 1380. The rocker cross pin 1400 extends laterally through the second hole in the cantilever rockers 1380, through a hole in a first end of the clamp linkage 1410, and through curved (arcuate) slider slots 1392 (e.g., left and right slider slots 1392L and 1392R, respectively) in the slider plates 1390 at the periphery (i.e., distal to the intermediate shaft 1330).

The rocker torsion springs 1404 are mounted about (e.g., wrapped around) the intermediate shaft 1330. The torsion springs 1404 have a first end that is captured by the slider plates 1390 at the periphery, and a second end that generally rests against the rocker cross pin 1400, thereby providing angular (torsional) force between the periphery of the slider plates 1390 and the rocker cross pin 1400. The clamp linkage 1410 is generally rotatably held (i.e., pivotal) at a first end by the rocker cross pin 1400 between the cantilever rockers 1380, and is generally rotatably (pivotally) pinned through holes in the dog clamp legs 1406 on the clamping dog 1350 at the second end.

As illustrated on FIGS. 13B and 13C, when, in response to a clamping control signal (e.g., the signal CS SM), the clamping linear actuator 1340 extends, the forward linear motion of the clamping linear actuator 1340 is generally translated into rotational motion of the slider plate 1390, which is translated into substantially linear motion of the clamping linkage 1410 into the dog clamps lugs 1406, which is, in turn, translated into rotational, clamping motion of the clamp dog 1350 onto the front of the vehicle 100 (e.g., the vehicle nose 120).

Figure 14:
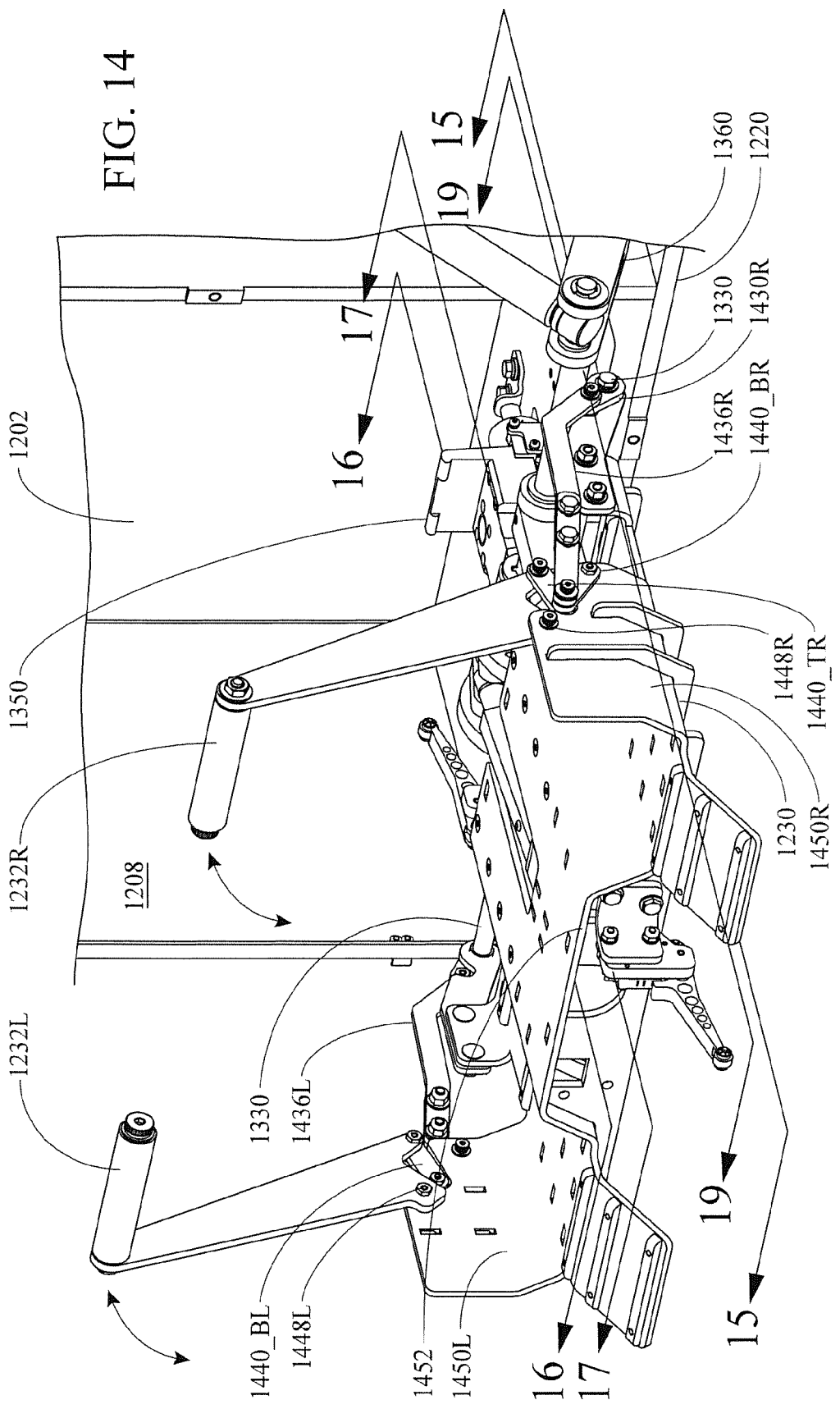
FIG. 14 is an isometric view from the upper, right, rear of a broken out portion of the primary module of the system of FIG. 1.

Referring to FIG. 14, an isometric view from the upper, right, rear of a broken out portion of the primary module 1102 with the primary module support tray assembly 1230 at a substantially horizontal orientation is shown. See also, for example, FIG. 8. FIG. 14 illustrates an embodiment of track clamping arm 1232 actuation mechanics (e.g., sub-assembly) implemented in connection with the primary module 1102.

The primary module support tray assembly 1230 further comprises clamp arm lug plates 1430 (e.g., left and right clamp arm lug plates 1430L and 1430R, respectively), clamp arm link bars 1436 (e.g., left and right clamp arm link bars 1436L and 1436R, respectively), clamp arm link plate (e.g., fingers, struts, etc.) pairs 1440_T and 1440_B (top and bottom, respectively) (e.g., top left clamp arm link finger 1440_TL (not visible on FIG. 14), bottom left clamp arm link finger 1440_BL, top right clamp arm link finger 1440_TR, and bottom right clamp arm link finger 1440_BR), clamp arm pivot pins 1448 (e.g., left and right clamp arm pivot pins 1448L and 1448R, respectively), support tray walls 1450 (e.g., left and right support tray walls 1450L and 1450R, respectively), and a support tray center hump (e.g., rise, crown, ridge, and the like) 1452. The support tray walls 1450 are generally substantially vertical.

The clamp arm lug plates 1430 are rigidly (i.e., non-rotatably, firmly, etc.) attached to the outboard ends of the intermediate shaft 1330. As such, rotary motion of the intermediate shaft 1330 also produces rotary (or angular) motion to the periphery of the clamp arm lug plates 1430. The clamp arms 1232 are pinned through the outboard vertical walls 1450 of the UGV support tray via the clamp arm pivot pins 1448, thereby providing free rotation (pivoting) of the clamp arms 1232 relative to the UGV support tray 1230.

A first end of the clamp arm link bar 1436 is pivotally pinned to the peripheral (outer) end of the clamp arm lug plate 1430. A first end of the top clamp arm link finger 1440_T is pivotally pinned to the clamp arm 1232. A first end of the bottom clamp arm link finger 1440_B is pivotally pinned to the support tray wall 1450. A second end of the clamp arm link bar 1436, a second end of the top clamp arm link finger 1440_T, and a second end of the bottom clamp arm link finger 1440_B are all pivotally pinned together to form a three-bar linkage.

Figure 15A:
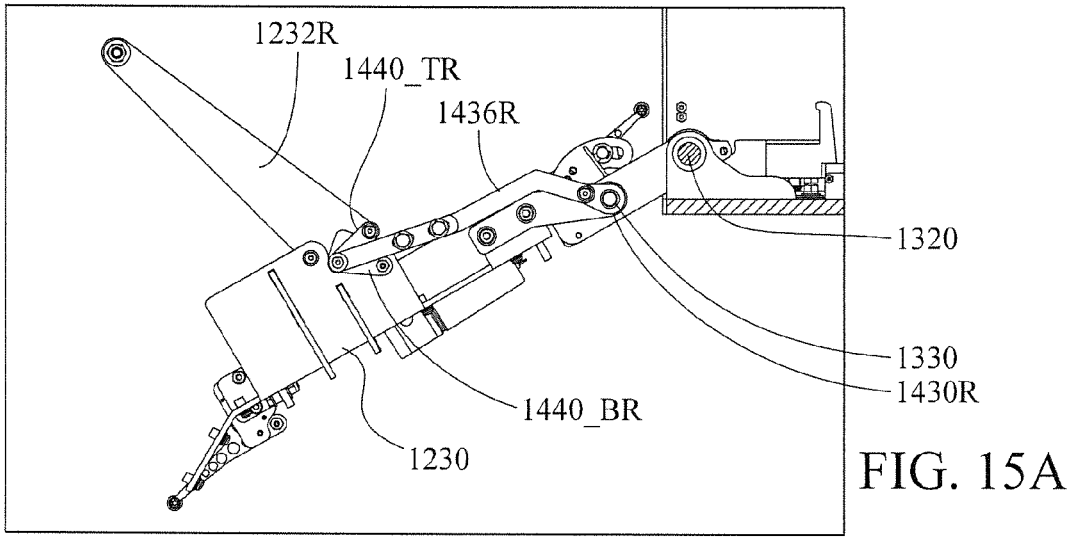
FIGS. 15(A-C) are sectional side views of the primary module of the system of FIG. 1 taken at line 15-15 of FIG. 14.
Figure 15B:
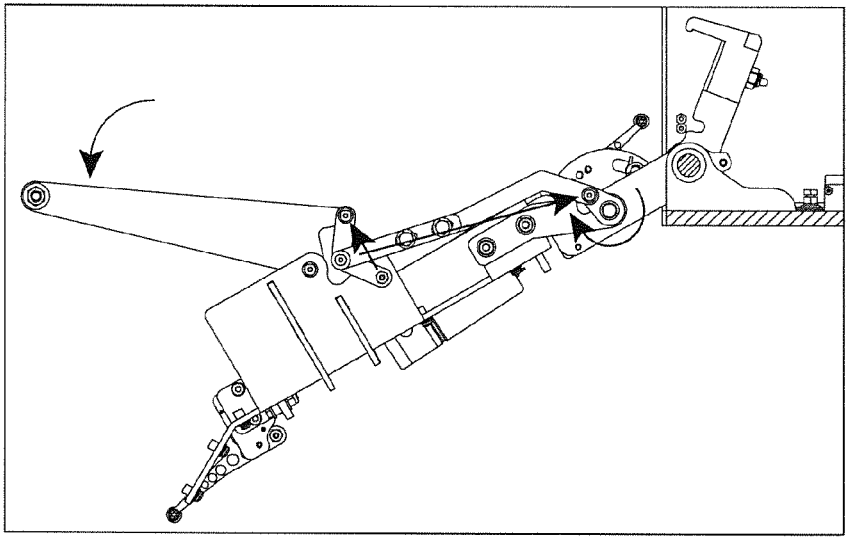
Figure 15C:
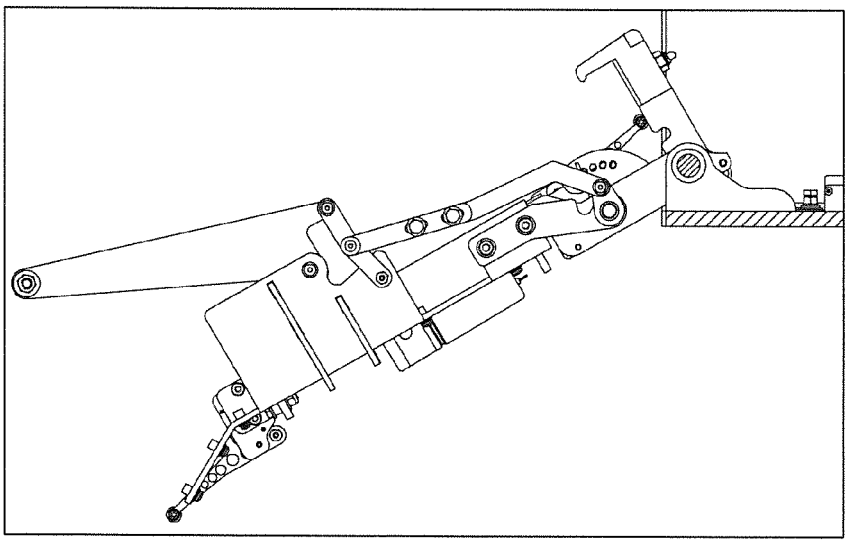

Referring to FIGS. 15(A-C), sectional side views of the primary module 1102 taken at line 15-15 of FIG. 14 are shown. FIGS. 15(A-C) illustrate operation of the clamp arm 1232 in connection with the intermediate shaft 1330. FIG. 15A illustrates the clamp arm 1232 in a fully up (open) position, FIG. 15B illustrates the clamp arm 1232 in an intermediate position, and FIG. 15C illustrates the clamp arm 1232 in a fully down (clamped) position.

The three-bar linkage formed by the combined clamp arm link bar 1436 and the clamp arm link plate pairs 1440 generally translates rotary motion of the intermediate shaft 1330 (and thus the clamp arm lug plate 1430) into rotary motion of the clamp arm 1232. When viewed from right to left along the axis of the intermediate shaft 1330, a clockwise rotation of the intermediate shaft 1330 produces counter-clockwise rotation of the clamp arm 1232 about the clamp arm pin 1448 pivot point. Similarly, counter-clockwise rotation of the intermediate shaft 1330 is converted to clockwise rotation of the clamp arm 1232 about the clamp arm pin 1448 pivot point.

Figure 16:
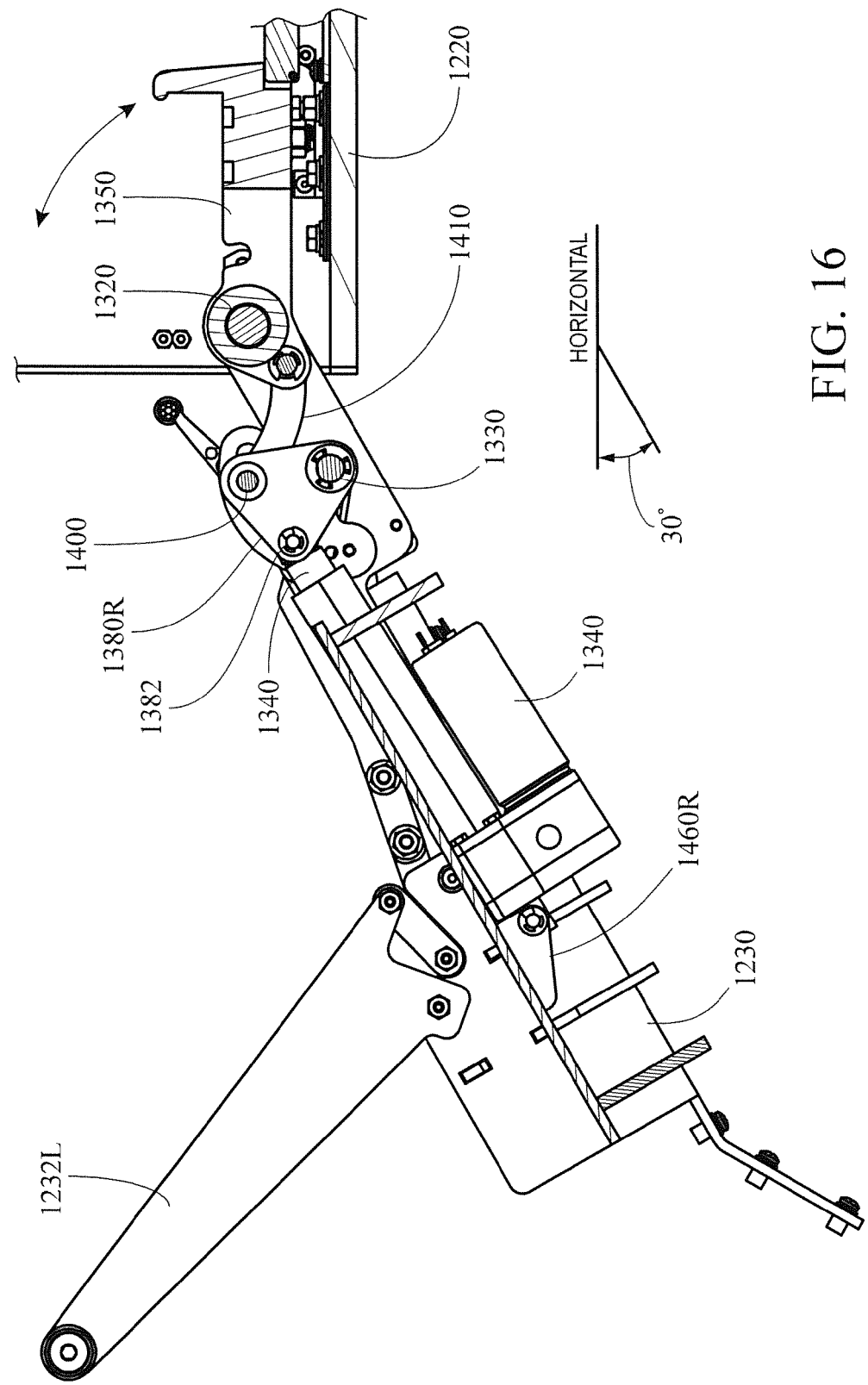
FIG. 16 is a side sectional view of the primary module of the system of FIG. 1 taken at line 16-16 of FIG. 14.

Referring to FIG. 16, a side sectional view of the primary module 1102 taken at line 16-16 of FIG. 14 is shown. The support platform 1230 further comprises tray actuator lugs (e.g., flanges, brackets, etc.) 1460 (e.g., left and right tray actuator brackets 1460L and 1460R, respectively). The clamping linear actuator 1340 is generally pivotally pinned at one end to the tray actuator lugs 1460 on the UGV support tray 1230, and is pivotally pinned to the cantilever rockers 1380 at the other end via the primary cantilever rocker pin 1382.

When the User presents one or more clamp/unclamp control signals to the primary module 1102 via the system control apparatus 2000, the clamping linear actuator 1340 extends/retracts accordingly. As shown on and described above in connection with FIGS. 12-16, the combined linkages, cantilever rocker 1380, intermediate shaft 1330, etc. are mechanically coupled and translate extension and retraction motion of the clamping linear actuator 1340 to rotary motion of the clamping dog 1350, such that when the clamping linear actuator 1340 extends, the clamp dog 1350 is rotated counter-clockwise (when viewed from right to left).

Similarly, retraction of the clamping linear actuator 1340 causes clockwise rotation of the clamping dog 1350 about the main drive shaft 1320. Thus, through the mechanical coupling described in connection with FIGS. 12-16, arcuate motion of the clamp arms 1232 and the clamping dog 1350 are directly controlled by extension and retraction of the clamping linear actuator 1340 in response to the one or more clamp/unclamp control signals, CSSM.

Figure 17A:
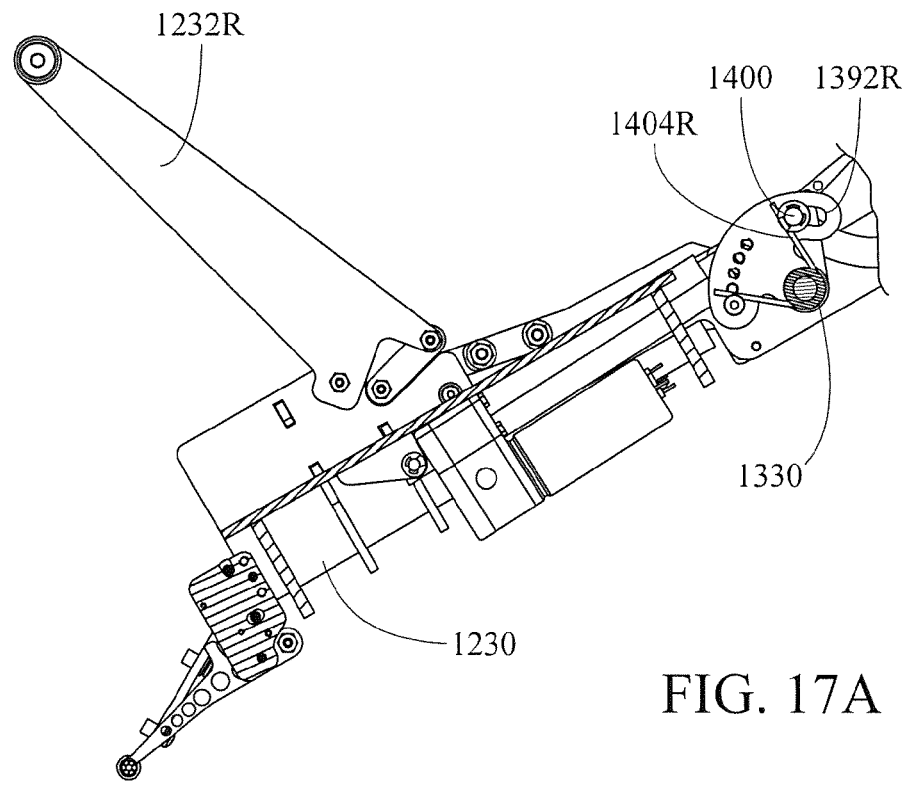
FIGS. 17(A-B) are side sectional views of the primary module of the system of FIG. 1 taken at the line 17-17 of FIG. 14.
Figure 17B:
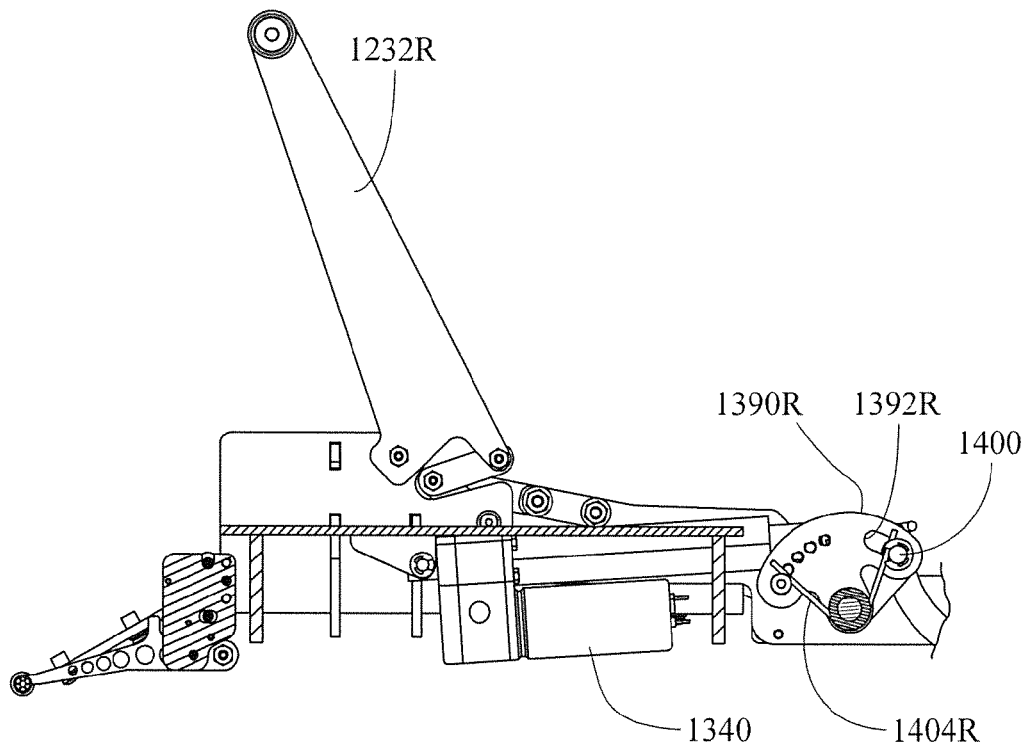

Referring to FIGS. 17(A-B), side sectional views of the primary module 1102 taken at the line 17-17 of FIG. 14 are shown. On FIG. 17A, the primary module tray 1230 is illustrated at a position that is about 30 degrees below the horizontal plane, and the torsion spring 1404 is in a compressed state. On FIG. 17B, the primary module tray 1230 is illustrated at a position that is substantially horizontal, and the torsion spring 104 is in a mostly (predominantly) relaxed state, that is, tension sufficient to hold the torsion spring 1404 captured in place by the slider plates 1390 is maintained.

The rocker cross pin 1400 lateral coupling through the curved slider plate slots 1392 in the slider plates 1390, and the torsion spring 1404 connections (e.g., the torsion spring 1404 interfacing against the slider plate 1390 and the rocker cross pin 1400) generally provide torsional bias that produces full unclamping of the clamp arms 1232 and the clamp dog 1350 at a User controlled variable depression angle (e.g., zero to negative 30 degrees); thereby, decoupling the relative motion of the clamp arms 1232 and the clamp dog 1350 (e.g., providing lost motion to the clamp arms 1232 via the slots 1392) when the clamp arms 1232 are fully open and the clamp dog 1350 has some distance yet to travel (e.g., a portion of angular unclamping motion of the clamp dog 1350 is incomplete). The arcuate length of the slider plate slots 1392 is generally sized to provide such decoupling.

Figure 18:
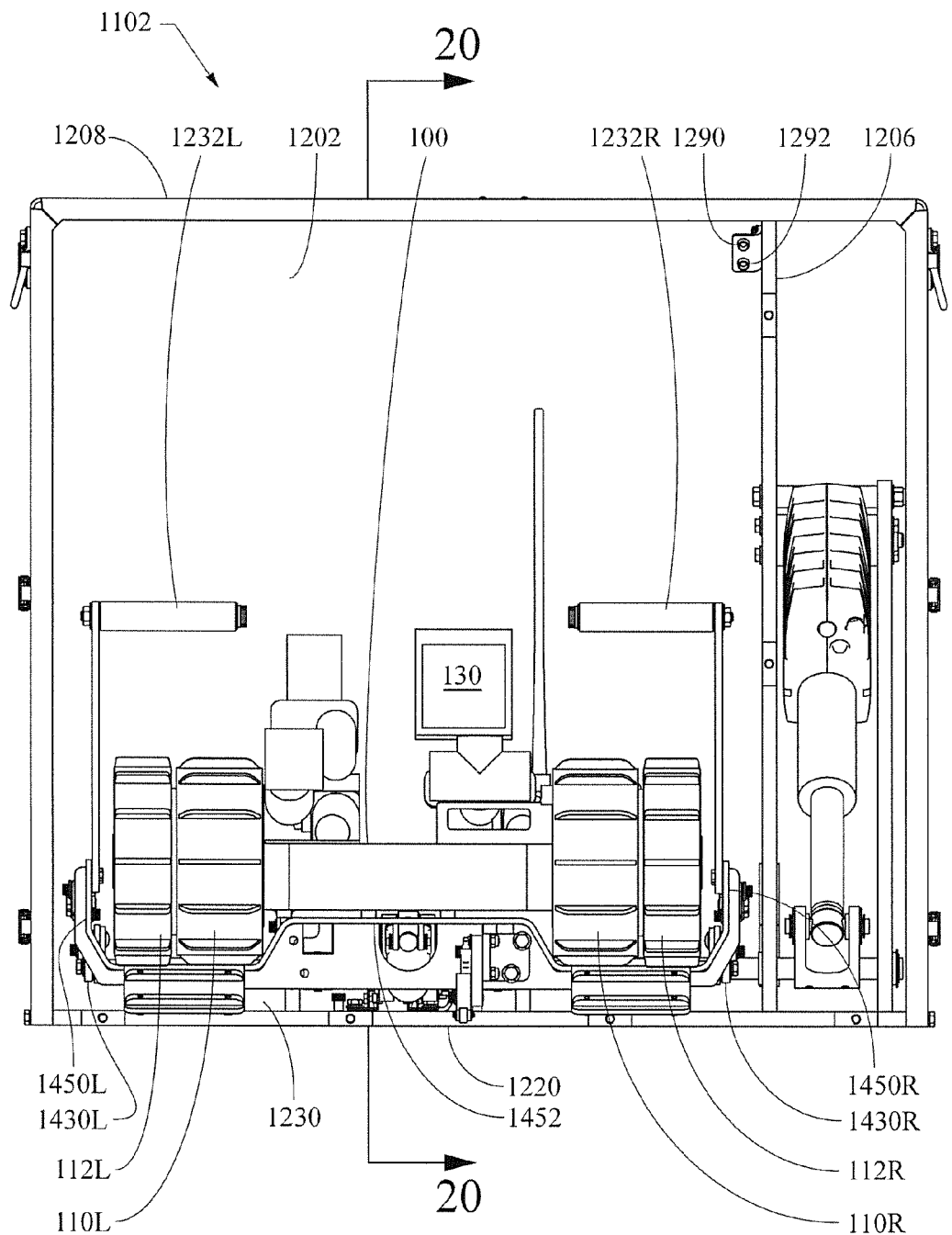
FIG. 18 is a side elevation view looking forward of the primary module of the primary module of the system of FIG. 1.

Referring to FIG. 18, a side elevation view looking forward of the primary module 1102 having the vehicle 100 resting in the primary module tray 1230, and the primary module tray 1230 oriented in a substantially horizontal position is shown. FIG. 18 generally illustrates end view geometry of the UGV 100 primary module support tray 1230. The UGV primary module support tray 1230 is generally of sufficient width (i.e., distance between the tray walls 1450L and 1450R) to allow a selected UGV 100 to freely drive (move longitudinally) along the length of the primary module tray 1230. The center hump 1452 has a rise that is low enough to clear the underbelly of the UGV 100, and generally has trapezoidal shape having a bottom width that provides walls sloped to urge (e.g., force, nudge, push, etc.) the UGV 100 to self-center along the length of the primary module tray 1230 while contacting inboard surfaces the UGV tracks 110.

As also illustrated on FIG. 18, the partition 1206 further comprises a first visual indicator 1290 and a second visual indicator 1292. The visual indicators 1290 and 1292 are generally implemented as light emitting diodes (LEDs). In particular, the LED 1290 is generally implemented as a red LED, and the LED 1292 is generally implemented as a green LED.

The LEDs 1290 and 1292 are generally mounted on the wall 1206 into the storage compartment region 1202 and are outwardly oriented to provide visibility of the emitted light signals (e.g., versions of the signals Control/Status Msg) to the User from the rear. The camera 130 may also be advantageously implemented by the User to view the output signals from the LEDs 1290 and 1292, especially when the User is driving the UGV 100 into the modular handling and stowage system 1000. See, also, the description below in connection with FIG. 20.

Figure 19:
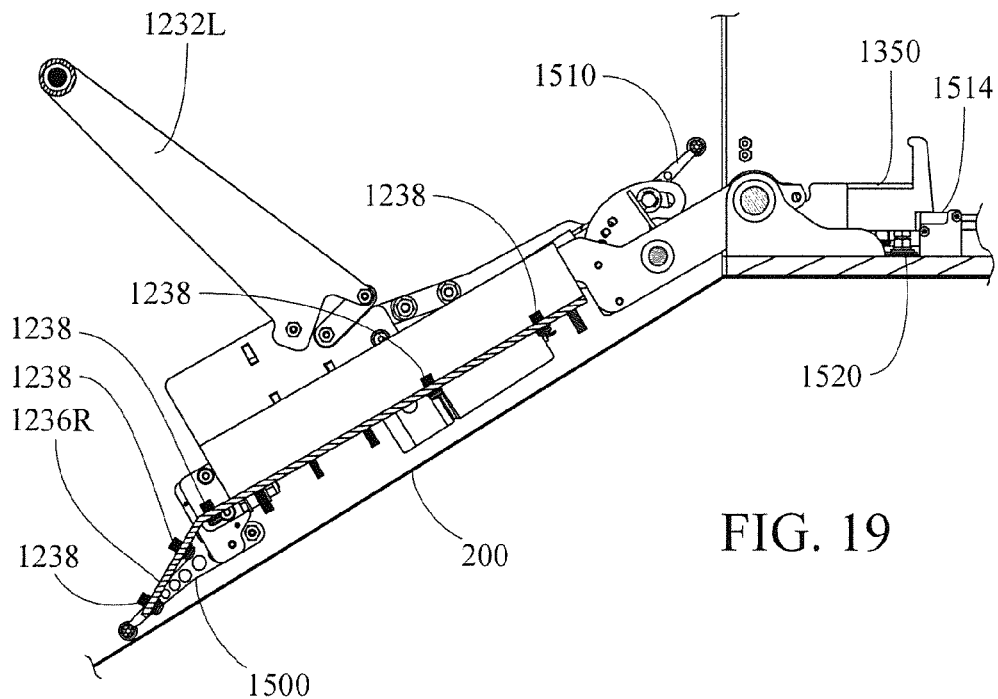
FIG. 19 is a side sectional view of the primary module of the system of FIG. 1 taken at the line 19-19 of FIG. 14.

Referring to FIG. 19, a side sectional view of a portion of the primary module 1102 taken at the line 19-19 of FIG. 14 is shown in connection with a loading/unloading ramp portion of the host 200 with the primary module tray 1230 lowered as illustrated, for example, on FIGS. 15(A-C) and 16. The support tray ramp sections 1236 generally protrude (extend) at a depression angle from the UGV support tray 1230 main surface and contact one of (i) the mating ramp on the host 200, (ii) the ground, and (iii) the surface onto which the system 1000 is mounted. The tread lugs 1238 are generally attached to the ramp extensions 1236 and the main surface of the UGV primary module support tray 1230 at intervals to provide a positive grip surface for the UGV 100 to climb, especially when the ramp on the host 200 is oriented at an extreme depression angle.

Further, the primary module support tray 1230 comprises two lever operated limit switches, e.g., a first lever operated limit switch 1500, a second lever operated limit switch 1510. The first lever operated limit switch 1500 is generally electrically connected (coupled) to the primary module control sub-system 2102 to provide a feedback signal (e.g., a version of the signal, CSSM) that may indicate the position of the primary module tray 1230. In particular, the first lever operated limit switch 1500 is generally mounted to the outer longitudinal edge of the UGV primary module support tray 1230 between the extension legs 1236. When the primary module support tray 1230 is sufficiently lowered (e.g., at the desired depression angle), the lever arm actuator portion of the first lever operated limit switch 1500 will contact one of (i) the mating ramp on the host 200, (ii) the ground, and (iii) the surface onto which the system 1000 is mounted, and the first lever operated limit switch 1500 will present the appropriate signal, CSSM, that indicates such contact to the primary module control sub-system 2102.

Figure 20:
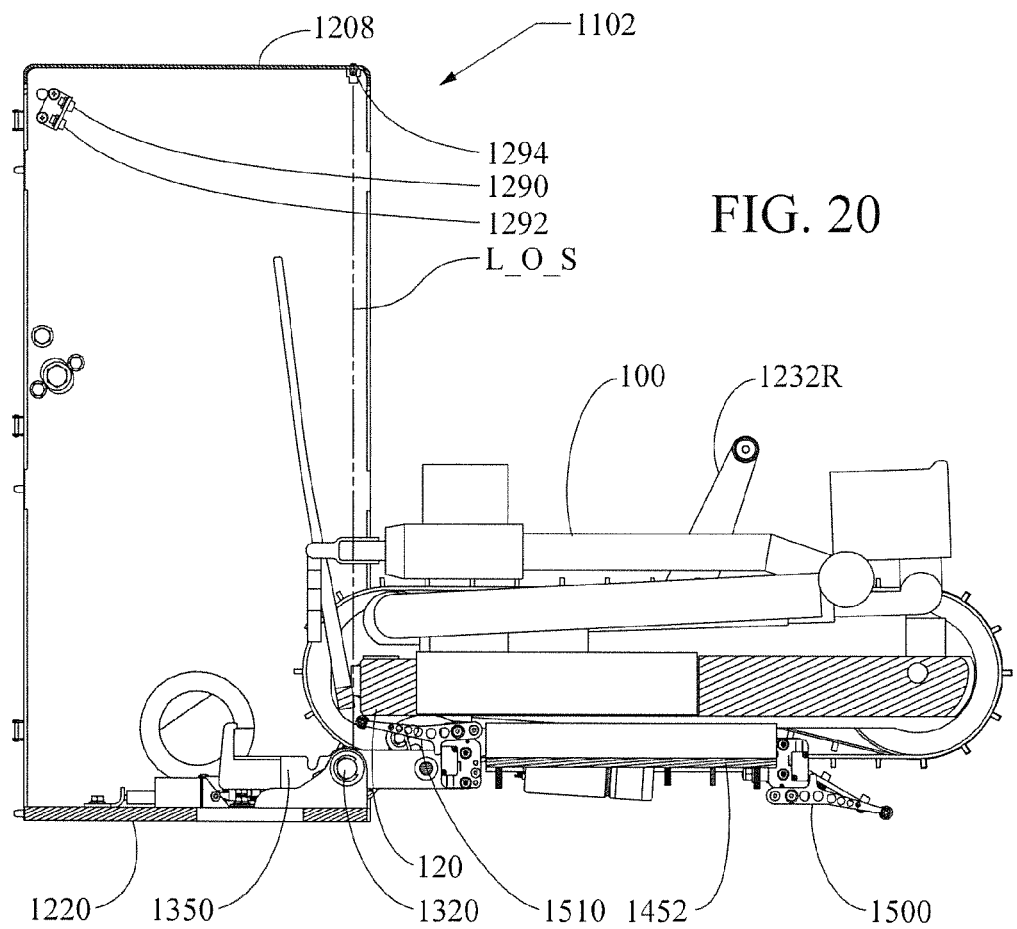
FIG. 20 is a side sectional view of a portion of the primary module of the system of FIG. 1 taken at line 20-20 of FIG. 18.

Referring to FIG. 20, a side sectional view of a portion of the primary module 1102 taken at line 20-20 of FIG. 18 is shown. (Also refer back to FIGS. 11, 12, 14 and, 19). The second lever operated limit switch 1510 is electrically connected (coupled) to the primary module control sub-system 2102 to provide the system control apparatus 2000 positional feedback (information) regarding the vehicle 100, and also to sense and indicate presence of the UGV 100. The second lever operated limit switch 1510 is generally mounted to the UGV support tray left lift arm 1344L such that when the UGV 100 is in the appropriate longitudinal position for clamping and stowage, the lever actuation arm is depressed by the UGV nose 120 and the appropriate signal, CSSM, is presented to the primary module control sub-system 2102.

Continuing to refer to FIG. 20 and also referring back to FIG. 9, the system control apparatus 2000 (and thus the modular handling and stowage system 1000) further comprises a non-contacting (in one example, an optical based) distance sensor 1294 (on FIG. 9, the sensors 1294_PM and 1294a). The distance sensor 1294 is generally implemented as an infrared (IR) sensor. The IR distance sensor 1294 is generally attached to the inside of the module cover 1208. The IR distance sensor 1294 is electrically coupled to the primary module control sub-system 2102 to provide a positional feedback signal (i.e., over-run position signal), CS SM, regarding the nose 120 position for the UGV 100.

In the embodiment illustrated on FIG. 20, the IR distance sensor 1294 is shown mounted and aimed to sense downward (see, line-of-sight, L_O_S). In the embodiment that is illustrated on FIG. 9, the optical nose position sensors 1294 (i.e., the non-contacting sensors 1294_PM and 1294a) are mounted on the inside of the left wall of the cover 1208 and aimed laterally across the interior 1202.

In any case, the IR distance sensor 1294 is generally positioned and aimed relative to the UGV 100 stowage position at a location such that the nose 120 may be detected when the UGV 100 is driven into the module 1102 by the User. The position and aiming, hence, L_O_S of the optical nose position sensor 1294 is generally implemented such that when the UGV 100 is driven too far into the module 1102 by the User, the IR distance (i.e., optical nose position) sensor 1294 generally detects an overrun condition (e.g., when the nose 120 extends inward such that the clamp dog 1350 is unable to properly engage the nose 120 during a clamping process) and presents an alert signal (e.g., the over-run position signal), CSSM, to the primary module control sub-system 2102 (and thus, to the system control apparatus 2000).

The selection of sensor type, location, orientation, and aiming of the non-contact (e.g., optical) nose position sensor 1294 may be determined through routine experimentation by one of ordinary skill in the art to meet the design criteria of a particular application. Likewise, non-optical (e.g., sonar, capacitive, and the like) generally non-contacting sensors may be implemented instead of optical sensors.

As described above in connection with FIG. 18, the red and green LEDs 1290 and 1292, respectively, are mounted to the side wall 1206 of the primary module 1102 to provide light beams that are visible through the UGV camera 130 and may be seen by the UGV operator when driving a UGV 100 into the primary module 1102.

In one mode of operation, when the second visual indicator 1292 emits a steady green light, the primary module 1102 is generally ready and waiting for a UGV 100 to be driven into position. When the second lever operated limit switch 1510 actuator is depressed, the second visual indicator 1292 generally turns off, and the first visual indicator 1290 generally steadily emits red light, indicating that the UGV 100 is properly longitudinally positioned.

When the overhead mounted IR distance sensor 1294 detects the presence of the vehicle 100, the first and second visual indicators 1290 and 1292 begin flashing alternately, thereby providing a visual alert to the operator, User, that an overrun condition has occurred. When the UGV operator reverses direction of the UGV 100 and thus clears the overhead mounted IR distance sensor 1294 (e.g., backs the UGV 100 rearward out of the L_O_S), the LED 1292 (e.g., green light) turns off and the LED 1290 (e.g., red light) illuminates steadily, thereby signaling the UGV operator to stop driving.

Referring to FIGS. 21(A-E), isometric views from the upper rear, left of the primary module 1102 in connection with the UGV 100 and having the cover 1208 removed for clarity are shown. FIGS. 21(A-E) illustrate the vehicle 100 at various stages of clamping and deployment/extraction on the primary module 1102. FIG. 21A illustrates the vehicle 100 clamped by the clamp arms 1232 and the clamp dog 1350 and stowed in an upright (i.e., substantially vertical) position in the primary module 1102.

Figure 21A:
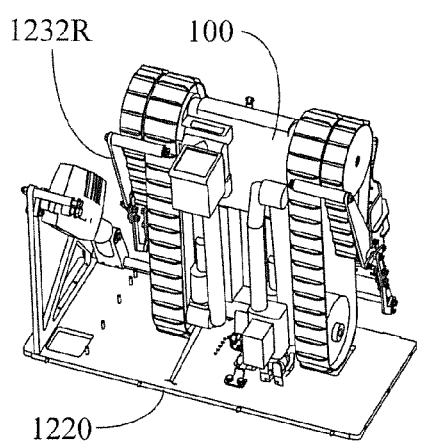
FIGS. 21(A-E) are isometric views from the upper rear, left of the primary module of the system of FIG. 1 in connection with the vehicle and having the cover removed for clarity.
Figure 21B:
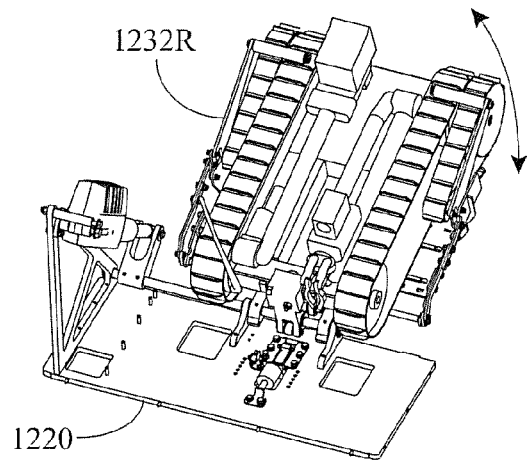
Figure 21C:
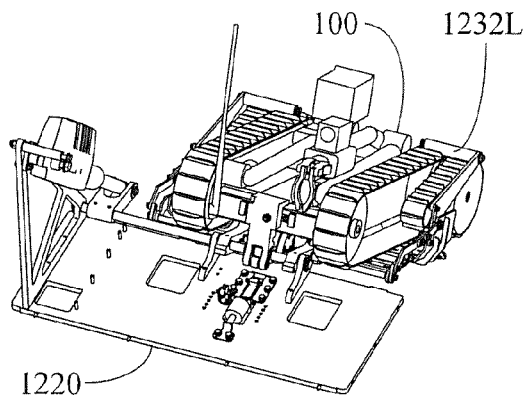

FIG. 21B illustrates the vehicle 100 clamped by the clamp arms 1232 and the clamp dog 1350. The primary module support tray 1230 is at an intermediate (i.e., a partially lower/raised) position. FIG. 21C illustrates the vehicle 100 clamped by the clamp arms 1232 and the clamp dog 1350. The primary module support tray 1230 is at a deployed position.

Figure 21D:
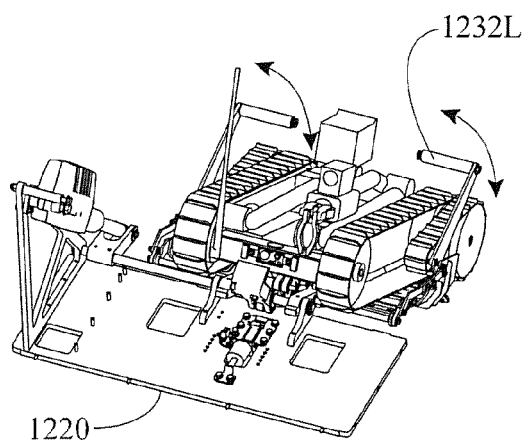
Figure 21E:
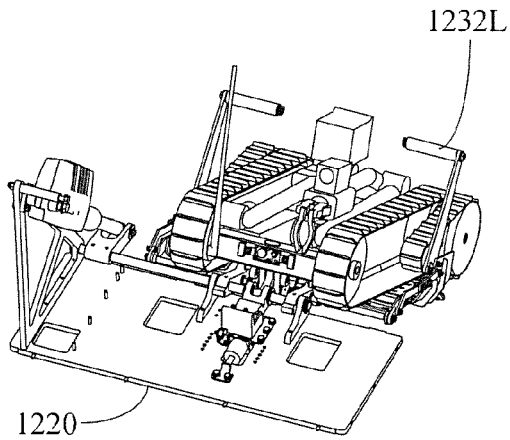

FIG. 21D illustrates the vehicle 100 an intermediate position of clamping/unclamping by the clamp arms 1232 and the clamp dog 1350. The primary module support tray 1230 is at a deployed position. FIG. 21E illustrates the vehicle 100 fully unclamped by the clamp arms 1232 and the clamp dog 1350. The primary module support tray 1230 is at a deployed position.

Figure 22:
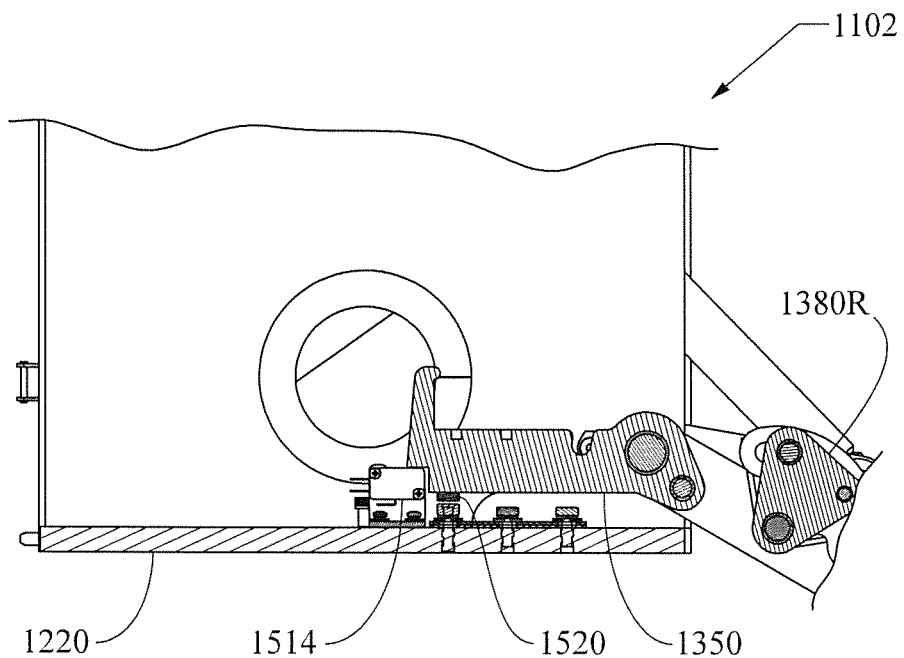
FIG. 22 is a broken out side sectional view of the primary module of the system of FIG. 1.

Referring to FIG. 22, a broken out side sectional view of the primary module 1102 is shown. See also, for example, FIGS. 12 and 19 for added context. The primary module 1102 further comprises a first push-button limit switch 1514 and a clamp dog net pad (e.g., stop, bumper, rest, check, and the like) 1520. The first push-button limit switch 1514 and the clamp dog stop 1520 are mounted inside the stowage compartment 1202 on the module base 1220.

The clamp dog stop 1520 is generally threadably attached to the primary module base plate 1220 and adjusted to a height such that when the clamp dog 1350 reaches a substantially horizontal position, the clamp dog stop 1520 will prevent further travel (e.g., "hard stop") of the clamp dog 1350.

The first push-button limit switch 1514 is generally electrically connected (coupled) to the primary module control sub-system 2102 to provide a feedback signal (e.g., a version of the signal, CSSM) that may indicate the position of the clamp dog 1350. In particular, the first push-button limit switch 1514 is mounted in a position such that the first push-button limit switch 1514 is actuated by the clamp dog 1350 when the clamp dog 1350 is in an essentially horizontal position and substantially simultaneously contacts the clamp dog stop 1520.

Figure 23:
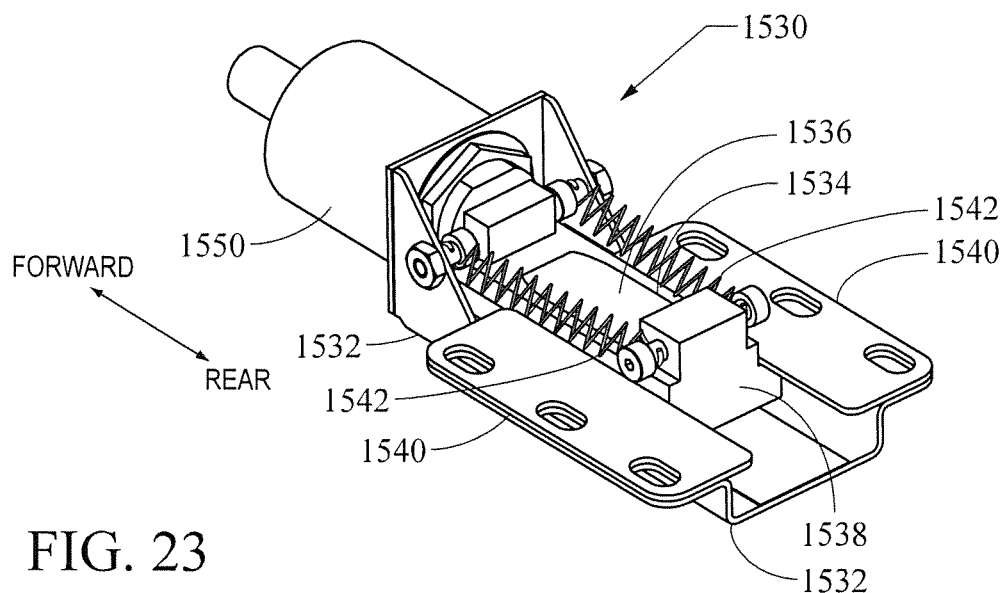
FIG. 23 is an isometric view from the upper, left rear of a shuttle assembly that is implemented in the system of FIG. 1.

Referring to FIG. 23, an isometric view from the upper, left rear of a shuttle assembly 1530 is shown. The shuttle assembly 1530 comprises a shuttle tray 1532, a shuttle ramp block 1534 having a ramp region 1536 and a push face 1538, a pair of block restraint covers 1540, a pair of shuttle solenoid extension springs 1542, and a push-solenoid 1550.

The shuttle ramp block 1534 is generally positioned within the shuttle tray 1532. The block restraint covers 1540 are mounted on either side of and atop the shuttle tray 1532 to constrain vertical and lateral movement of the shuttle ramp block 1534. The solenoid extension springs 1542 are connected between (i) the shuttle tray 1532 near the push-solenoid 1550 and (ii) the shuttle ramp block 1534 near the push face 1538. The push-solenoid 1550 is attached to a first (generally forward) end of the shuttle tray 1532 that is opposite the push face 1538.

The shuttle ramp block 1534 is generally able to freely slide longitudinally inside of shuttle tray 1532 in response to fore/aft forces generated by the push-solenoid 1550 and the shuttle solenoid extension springs 1542. The push-solenoid 1550 is generally electrically connected (coupled) to the primary module control sub-system 2102 and may receive one or more control signals, CSSM. In response to the appropriate command (control) signal, CSSM, the push-solenoid 1550 may push the shuttle ramp block 1534 in one direction (e.g., slide rearward); and, in response to cessation of the command signal, CSSM, the shuttle solenoid extension springs 1542 may return (e.g., slide forward) the shuttle ramp block 1534 to a default position near the push-solenoid 1550.

Figure 24:
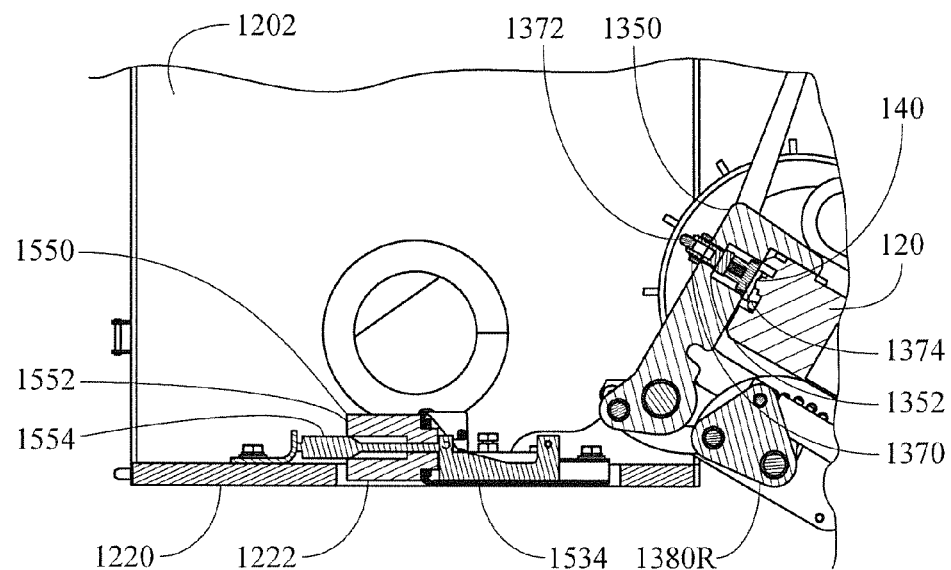
FIGS. 24 and 25 are broken out, side sectional views from left to right of the primary module of the system of FIG. 1.
Figure 25:
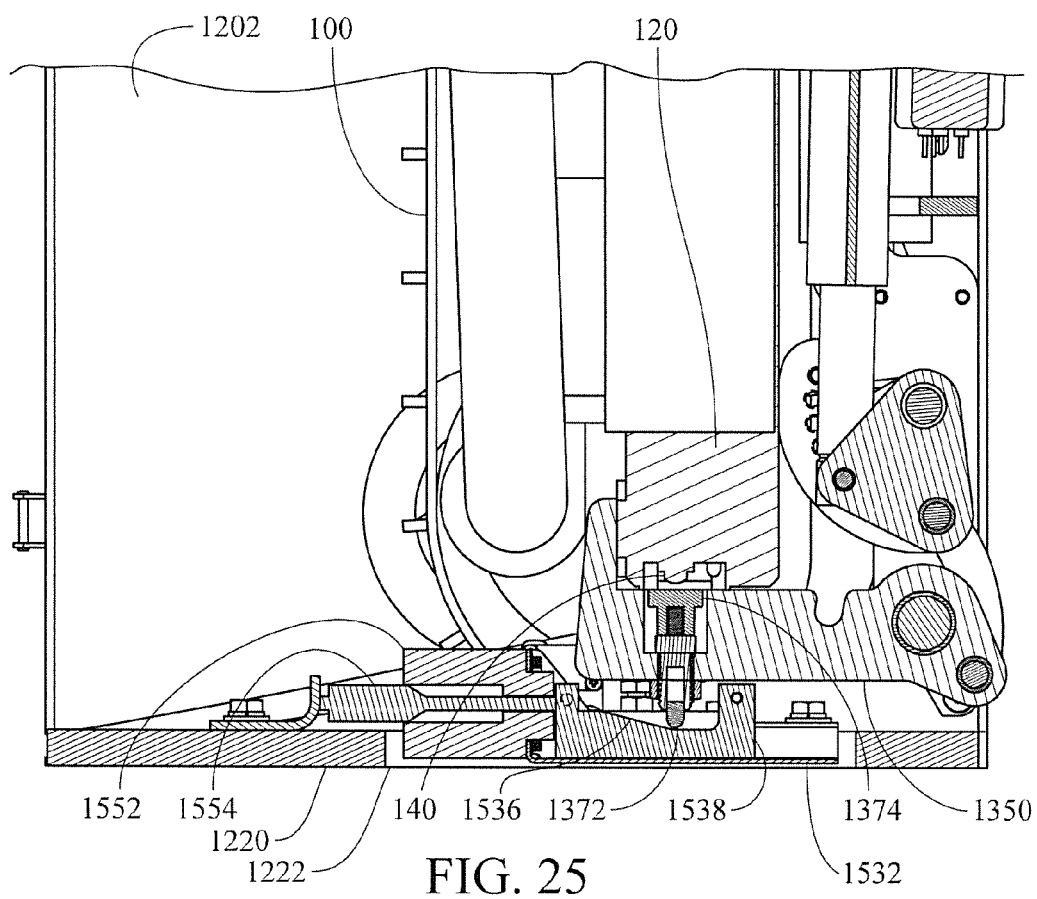

Referring to FIGS. 24 and 25, broken out side sectional views from left to right of the primary module 1102 are shown. For clarity, the shuttle solenoid extension springs 1542 are not shown. On FIG. 24, the vehicle 100 is in a clamped state within the primary module support tray 1230 which is in a partially lowered position. On FIG. 25, the vehicle 100 is in a clamped state within the primary module support tray 1230 which is in a substantially vertical position. See also, for example, FIGS. 12, 13(A-C), and 23 for added context.

The vehicle 100 further comprises a push-button power on/off switch 140. The push-button power on/off switch 140 generally cycles the battery power within the vehicle 100 such that when the push-button power on/off switch 140 is in the "off" position, minimal vehicle battery power is utilized.

The clamp dog 1350 further comprises a clamp dog through hole (e.g., lumen, passage, etc.) 1352 that contains the switch plunger assembly 1370. The switch plunger assembly 1370 comprises a plunger pin nose end 1372 and a plunger pin head end 1374.

The push-solenoid 1550 comprises a solenoid body 1552 and a solenoid actuation (push) rod (e.g., pin, pole, etc.) 1554. The solenoid body 1552 includes an inductive coil that responds to the signal, CSSM, and has a cylindrical center through hole (lumen) that holds the solenoid actuation rod 1554. The solenoid actuation rod 1554 generally pushes the shuttle ramp block 1534 longitudinally (e.g., rearward) in response to the command signal, CSSM.

The clamp dog through hole 1352 is positioned on the body of the clamp dog 1350 such that the switch plunger assembly 1370 has the plunger pin nose end 1372 extending outward, and downward from the body of the clamp dog 1350 when the clamp dog 1350 is in a completely open position, and has the plunger head 1374 is essentially flush or slightly recessed from the clamping surface of the clamp dog 1350.

The switch plunger assembly 1370 is mounted in the clamp dog through hole 1352 to align with the push-button power on/off switch 140 when the clamp dog 1350 is in a clamped position on the nose 120 of the vehicle 100. Such an alignment generally provides capability for the switch plunger assembly 1370 to contact the UGV power switch 140 when the UGV 100 is clamped and stowed vertically within the primary module 1102. Having the plunger pin nose end 1372 extend beyond the clamp dog 1350 generally provides for depression of the switch plunger assembly 1370 by an external mechanical device (e.g., the shuttle ramp 1536, as described below).

The shuttle assembly 1530 is generally is mounted within a pocket (e.g., cutout, hole, relief, etc.) 1222 in the primary module base plate 1220. The shuttle ramp 1536 is generally wedge-shaped so that, when the clamp dog 1350 is clamped on the nose 120 and the vehicle 100 is stowed in a vertical position, a longitudinal rearward motion of the solenoid actuation rod 1554 is translated to vertical motion of the switch plunger assembly 1370, in a cam-follower-like motion. The combined action from the shuttle assembly 1530, the switch plunger assembly 1370, and clamp dog 1350 act in concert to provide power management, that is, to depress the power switch 140 of the UGV 100 when the UGV 100 is clamped and stowed; thus, the power to the UGV may be toggled on and off, conserving battery power when the vehicle 100 is at an idle mode.

The primary module support tray 1230 and the clamp dog 1350 are generally shaped and sized to provide alignment of the UGV 100 (in particular, the vehicle nose 120) to the clamping dog 1350 laterally and longitudinally when the primary module support tray 1230 is tilted to the vertical position. The primary module support tray 1230 is generally shaped and sized (e.g., the distance between the walls 1450, the height of the walls 1450, the width and height of the center hump 1452, the height of the clamp dog stop 1520, etc. are selected) such that when the primary support module 1230 is in a substantially horizontal position (e.g., as illustrated on FIG. 25), the clamp dog 1350 rests below the plane of the UGV support tray center hump 1452, thereby providing a clear path for the UGV 100 to traverse.

The mechanical coupling of the UGV support tray 1230 to the lift linear actuator 1310, as well as coupling of the clamping linear actuator 1340 to the intermediate shaft 1330, subsequent coupling of the clamp arms 1232, and the clamping dog 1350 to the intermediate shaft 1330, and hard stops built into the system, generally provide the capability for the primary module 1102 to clamp, lift, stow, deploy, unclamp, and clear the UGV 100 for travel in and out of the modular handling and stowage system 1000.

Figure 26:
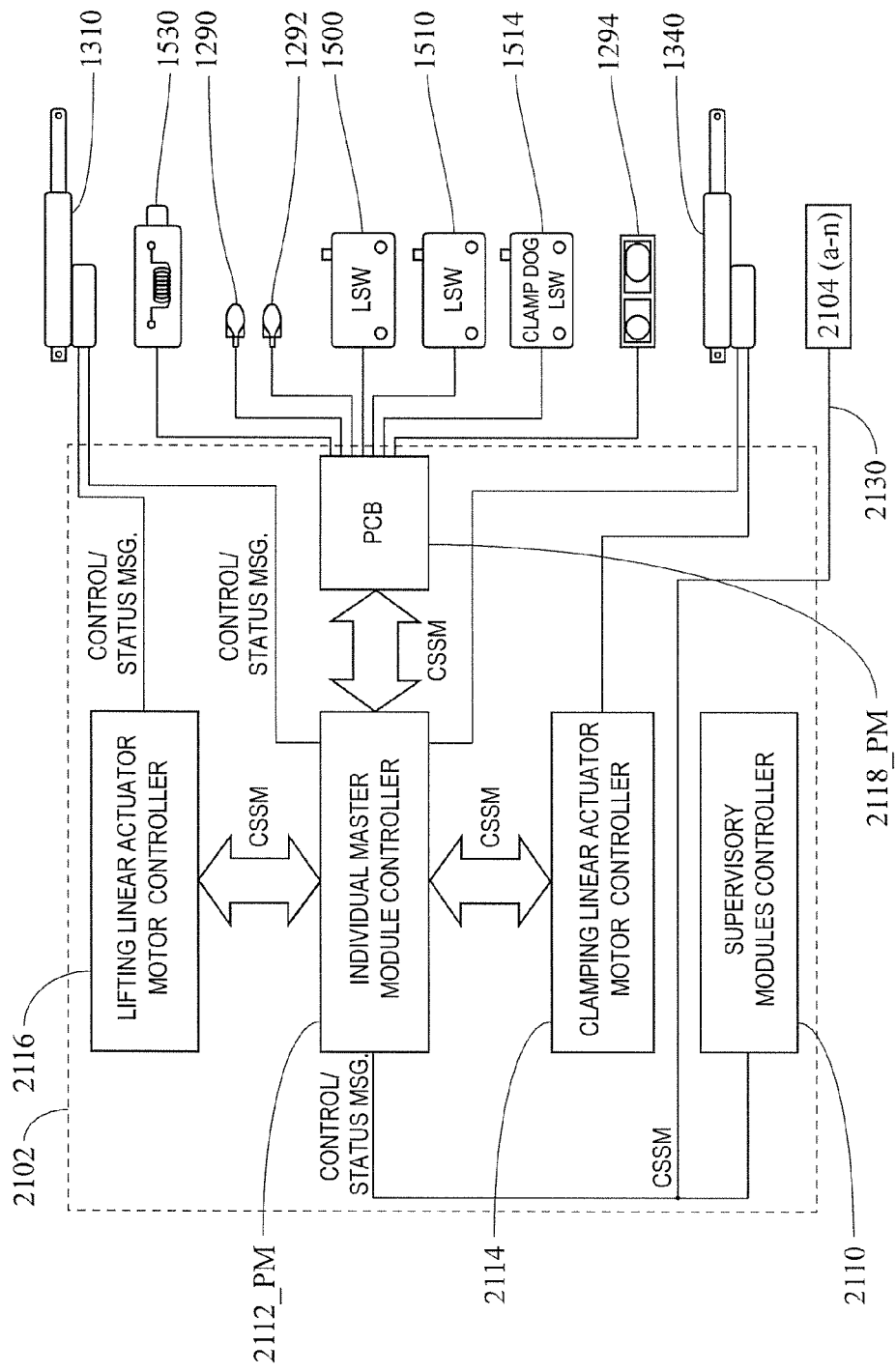
FIG. 26 is a block electrical schematic diagram of a primary module controller related to control of the primary module of the system of FIG. 1.

Referring to FIG. 26, a block electrical schematic diagram of the control circuitry (i.e., a section of the system control apparatus 2000) related to control of the master (primary, full-function) module 1102 is shown. The primary module control sub-system 2102 comprises the supervisory modules controller 2110, the individual master (primary) module controller 2112_PM, a clamping linear actuator motor controller 2114, a lifting linear actuator motor controller 2116, and a primary module controller printed circuit board (PCB) 2118_PM.

The individual primary module controller 2112_PM generally comprises unique programming (that is, software and/or firmware that may be different that the software that is implemented in connection with the secondary module individual controllers 2112($a$-$n$)). The individual primary module controller 2112_PM further comprises electrical coupling (e.g., connections, links, communication, etc.) to the lifting linear actuator 1310, the clamping linear actuator 1340, the supervisory modules controller 2110, the clamping linear actuator motor controller 2114, the lifting linear actuator motor controller 2116, and the primary module controller printed circuit board 2118.

The individual primary module controller 2112_PM is generally electrically coupled to the first visual indicator 1290, the second visual indicator 1292, the IR distance sensor 1294, the first lever operated limit switch 1500, the second lever operated limit switch 1510, the clamp dog position push-button limit switch (i.e., the first push-button limit switch 1514), and the push-solenoid assembly 1530 via the primary module controller printed circuit board 2118.

The primary individual motor controller 2112_PM may be linked to the co-located supervisory modules controller 2110 through the serial communications link 2130. When the system 1000 includes one or more of the secondary modules 1104, the primary individual motor controller 2112_PM may be linked to the secondary module control sub-systems 2104 via the serial communications link 2130.

A method 3000 (e.g., steps, processes, operations, blocks, tasks, and the like having designation numbers 3000 and higher), may be implemented for the user to perform extracting and storing, and deploying operations of at least one of the vehicle 100 in connection with the modular handling and stowage system 1000. Embodiments of the methodology are as follows.

3000: Method for UGV 100 Stowage within the Master Module 1102

Step 3002: The UGV 100 is driven into the primary module 1102. (This is typically done through remote control operation of the system control apparatus 2000 by the UGV operator, User.)

Step 3004: The UGV 100 activates the second lever operated limit switch 1510, signaling the operator, User, via the first visual indicator 1290 (e.g., red LED), when the over-run signal is absent, that the vehicle 100 is in position for stowage, and initiating the UGV 100 stowage operation.

Step 3006: The individual motor controller 2112_PM powers on the clamping linear actuator 1340.

Step 3008: The clamping linear actuator 1340 rotates the rocker cantilevers 1380 which are coupled to the intermediate shaft 1330 via the spring-loaded slider plates 1390, thereby rotating the intermediate shaft 1330 which substantially simultaneously moves the clamp arm link bars 1436 and clamp arm link fingers 1440, and essentially simultaneously rotates the first and second clamping arms 1232 to clamp the UGV tracks 110 into place against module tray assembly 1230 and essentially simultaneously positions the clamping dog 1350 into place against the UGV nose 120 until positional feedback (e.g., the signal CSSM) is presented by the clamping linear actuator 1340 indicating that the clamped position has been reached is received. The clamp dog position (first) push-button limit switch 1514 signals that the clamp dog 1350 has moved from the horizontal position.

Step 3010: The individual motor controller 2112_PM powers off the clamping linear actuator 1340, and powers on the lifting linear actuator 1310.

Step 3012: The lifting linear actuator 1310 retracts, thereby pulling the lift arm 1360 and rotating the main drive shaft 1320, thus causing the primary module support tray 1230 assembly and payload (e.g., the UGV support tray 1230, the clamp arms 1232, the clamp dog 1350, and the UGV 100) to rotate from a horizontal (or depressed below horizontal) position to a substantially vertical position around the main shaft 1320 axis, until the clamp dog push-button (first) limit switch 1514 is closed, and rotation stops. The primary tray position limit switch (i.e., the first lever operated limit switch 1500) signals that the primary module support tray 1230 has moved from the horizontal position.

Step 3014: When the clamp dog (first) push-button limit switch 1514 closes, the signal (e.g., an appropriate signal, CSSM) is communicated (presented) to the lifting linear actuator motor controller 2116, which (in response to the signal, CSSM) stops the lifting linear actuator 1310 from rotating the module main drive shaft 1320 and a signal, CSSM, is presented via the system control apparatus 2000 to the operator that UGV 100 is stowed.

3100: Method for UGV 100 Deployment from the Primary Module 1102

Step 3102: The supervisory modules controller 2110 receives the command signal, CSSM, to deploy the UGV 100 that is stowed within the primary module 1102 from the User via the system control apparatus 2000.

Step 3104: The module lifting linear actuator 1310 extends, thereby pushing the lift arm 1360 and rotating the main drive shaft 1320 which substantially simultaneously causes the entire primary module tray system 1230 including the UGV 100 which is stowed thereon, to rotate as a unit from a vertical to deployed position around the main shaft 1320.

Step 3106: The coupled rotational motion of the primary module tray assembly 1230, the first and second clamp arms 1232, the clamp dog 1350, and the UGV 100 loaded thereon, around the main shaft 1320, is generally maintained until the module tray assembly position limit switch 1500 contacts the ramp, mounting surface, or other surface of the host platform 200 anywhere from horizontal to a negative 30 degree depression angle. The tray position limit switch (i.e., the first lever operated limit switch 1500) presents the status signal, CSSM, to the primary module motor controller 2112_PM that the primary module tray assembly 1230 is in the deployment position and primary module lifting linear actuator 1310 stops extending.

Step 3108: The primary module clamping linear actuator 1340 retracts, thereby rotating the rocker cantilever 1380 which essentially simultaneously moves the clamp arm link bars 1436 and the clamp arm link fingers 1440, and, thereby, substantially simultaneously rotates the first and second clamp arms 1232 to unclamp the first and second clamp arms 1232 from the UGV tracks 110 and position the first and second clamp arms 1232 clear of the UGV 100 ingress and egress path, while substantially simultaneously positioning the clamp dog 1350 into a horizontal position. Depending on the depression angle of the primary module support tray 1230, the first and second clamp arms 1232 may reach the limits of an unclamped position before the clamp dog 1350 is horizontal. When the first and second clamp arms 1232 reach the limits of an unclamped position before the clamp dog 1350 is horizontal, the first and second clamp arms 1232 generally stop moving while the torsion springs 1404 that couple the rotation of the intermediate shaft 1330 to the cantilever rockers 1380 will begin loading (e.g., torsional force on the torsion springs 1404 may increase) until the clamp dog 1350 reaches the horizontal position. The clamp dog (first) limit switch 1514 presents the status signal, CSSM, to the primary module individual motor controller 2112_PM indicating that the clamp dog 1350 is in the open position.

Step 3110: The tray 1230 position limit switch (i.e., the first lever operated limit switch) 1500 in combination with the clamp dog (first push-button) limit switch 1514 present status signals, CS SM, to the primary module individual motor controller 2112_PM indicating that the tray assembly 1230 is in the horizontal (or otherwise deployed) position and that the clamp dog 1350 is in the fully open position.

Step 3112: The UGV 100 is driven out of the primary container 1102. Control of the vehicle 100 is typically performed through remote control by the UGV operator, User, via the system control apparatus 2000.

In accordance with the description of the operation and processes that are generally implemented in connection with the primary module 1102, the following signals (e.g., the signal Control/Status Msg or CSSM) may be presented to/from the system control apparatus 2000:

a primary extract signal (e.g., command) that is presented via the OCU 2012 when extraction of the vehicle 100 and stowage within the primary module 1102 is desired;

a primary deploy signal that is presented via the OCU 2012 when deployment of the vehicle 100 from the primary module 1102 is desired;

a primary tray deployed position (e.g., status) signal presented via the primary tray lever operated limit switch 1500 indicating that the primary module support tray 1230 is in the deployed position;

a primary nose position signal that is presented via the primary nose position limit switch 1510 when the nose 120 reaches the clamping position;

a primary clamp dog horizontal position signal that is presented via the primary clamp dog limit switch 1514 indicating that the primary clamp dog 1350 is fully open;

a primary over-run position signal that is presented via the primary optical nose position sensor 1294 when the nose 120 of the vehicle 100 exceeds the clamping position;

a clamping linear actuator position feedback signal that is presented by the clamping linear actuator 1340 when the primary clamp dog 1350 rests against the nose 120;

a primary clamp dog off-horizontal position signal that is presented via the primary clamp dog limit switch 1514 indicating that the primary clamp dog 1350 has moved from the horizontal position;

a primary tray off-deployed position signal that is presented via the primary tray lever operated limit switch 1500 indicating that the primary module support tray 1230 has moved from the deployed position;

a vehicle primary stored status signal that is presented via the primary individual module motor controller 2112_PM when (i) the primary tray lever operated limit switch 1500 indicates that the primary module support tray 1230 has moved from the deployed position and (ii) the primary clamp dog limit switch 1514 indicates that the primary clamp dog 1350 has moved from the horizontal position, thereby indicating that the vehicle 100 is stored in the primary module 1102; and a primary power control (e.g., command) signal that is presented via the OCU 2012 when the primary shuttle switching assembly 1530 is actuated thereby toggle switching the vehicle 100 battery power on and off.

Secondary Module 1104

Elements of the secondary module 1104 are generally implemented similarly to the like numbered elements of the primary module 1102. For clarity, the similarly implemented elements may be referred to by a preceeding "primary" or "secondary" indicator adjective, as would understood by one of skill in the art. As would be appreciated by one of skill in the art, differences between the primary module 1102 and the secondary module 1104 are described in detail below in connection with the referenced Figures.

Figure 27:
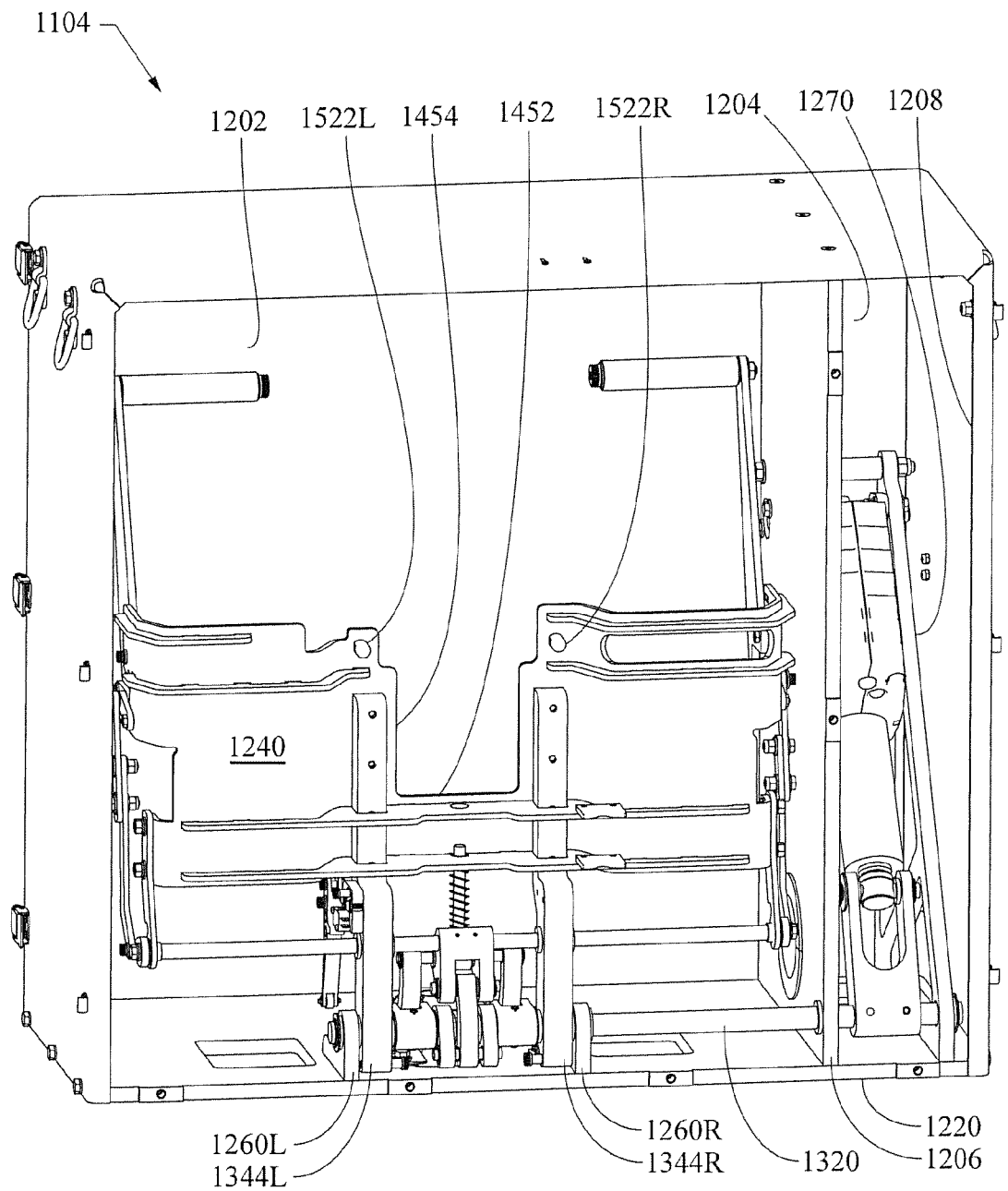
FIG. 27 is an isometric view from the lower, left, rear of one of the secondary modules of the system of FIG. 1.

Referring to FIG. 27 an isometric view from the lower, left, rear of one of the secondary modules 1104 of the modular handling and stowage system 1000 is shown. The secondary module 1104 comprises the base plate 1220, the shroud cover 1208, the wall partition 1206, the left and right bearing support flanges 1260L and 1260 R, respectively, the actuator plate 1270, and the secondary module UGV support tray assembly 1240.

In contrast to the primary module support tray 1230 of the primary module 1102 which generally may be lowered to about 30 degrees below the horizontal plane, the secondary module support tray 1240 is sized to grasp (clamp) and rotate a selected UGV 100 from a essentially horizontal to vertical position for stowage and from a vertical to horizontal position for deployment. In further contrast to the primary module support tray 1230, the secondary module support tray 1240 does not include the left and right ramp extensions 1236.

However, the secondary module support tray 1240 further comprises support leg stops (e.g., net pads, rests, bumpers, checks, etc.) 1522 (e.g., left and right support leg stops 1522L and 1522R, respectively), and the top of the support tray center hump 1452 includes a tray relief (e.g., cutout, notch, etc.) 1454 at the edge of the secondary module support tray 1240 that is distal to the main drive shaft 1320. The support leg stops 1522 are located at the inner edges of the tray relief 1454 at the edge of the secondary module support tray 1240 that is distal to the main drive shaft 1320. The support leg stops 1522 are mounted on the bottom of the secondary module support tray 1240, and are generally aligned with the module tray support arms 1344. Referring back to FIG. 9, the stops 1522 generally rest atop the aligned, adjacent module tray support arms 1344 when the primary support tray 1230 and the one or more secondary support trays 1240 are in a deployed mode.

The secondary module 1104 is generally shaped, sized, and otherwise configured to matingly connect to the primary module 1102 and another secondary module 1104 via the draw latch clasp 1280 and hook 1282 assemblies. As such, in one example, a typical secondary module 1104 for the selected UGV 100 may have an overall size envelope of 29" tall by 32" wide by 13" deep.

Figure 28:
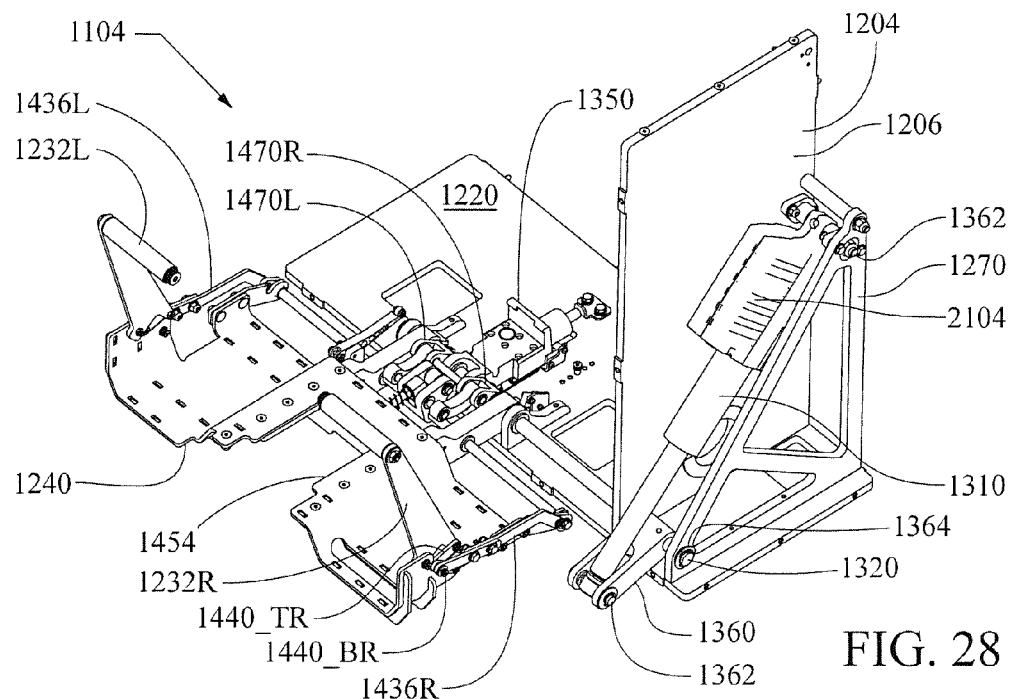
FIG. 28 is an isometric view from the rear, upper right of the secondary module of the system of FIG. 1.

Referring to FIG. 28, an isometric view from the rear, upper right of the secondary module 1104 is shown. Note that the shroud 1208 is shown removed for clarity. The secondary module 1104 implements the components within the operation mechanism compartment 1204 similarly to the implementation of the primary module 1102; however, the secondary sub-system controller 2104 is implemented in connection with the single lifting linear actuator 1310.

As described in more detail below, the secondary module 1104 further comprises two lug arms 1470 (e.g., left and right lug arms 1470L and 1470R, respectively) that are rigidly linked (fixed) to the main drive shaft 1320, and generally maintain (hold, constrain) the positions of the clamping dog 1350 and UGV support tray 1240 axially along the main drive shaft 1320 (i.e., laterally in the secondary module 1104).

Figure 29:
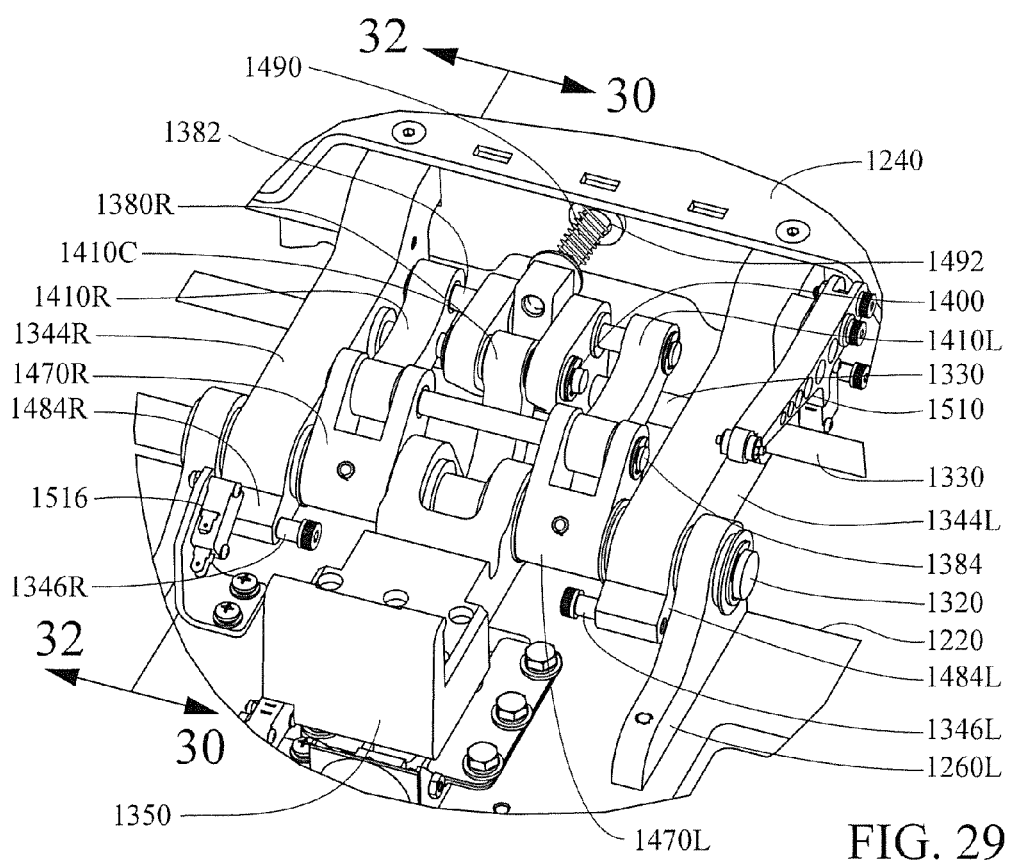
FIG. 29 an isometric view from the left, upper, front of a broken out portion from FIG. 28 of the secondary module of the system of FIG. 1.
Figure 30A:
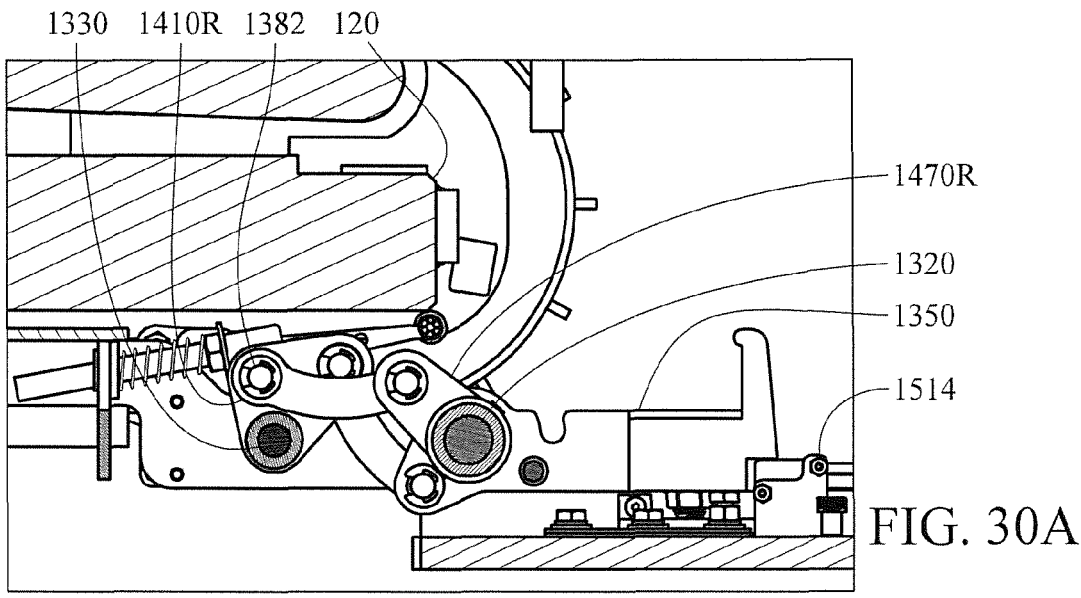
FIGS. 30(A-C) are sectional side views of the secondary module of the system of FIG. 1, taken at line 30-30 of FIG. 29.
Figure 30B:
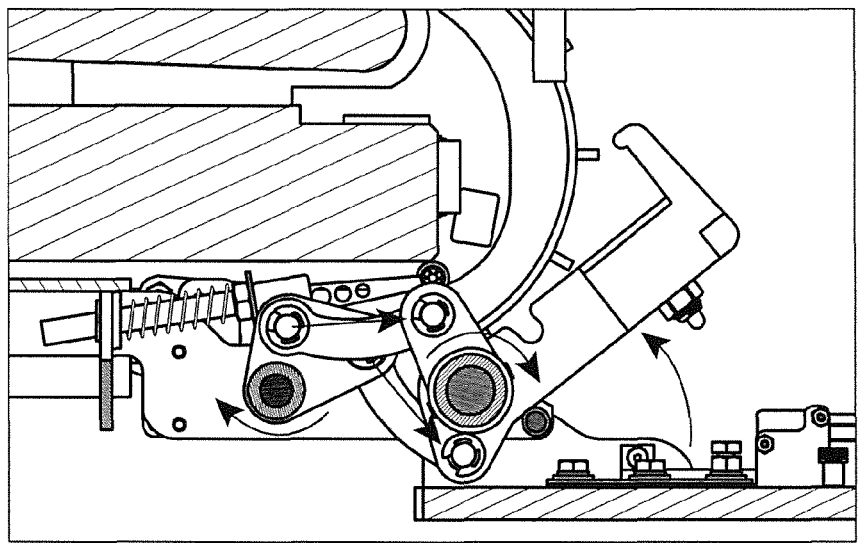
Figure 30C:
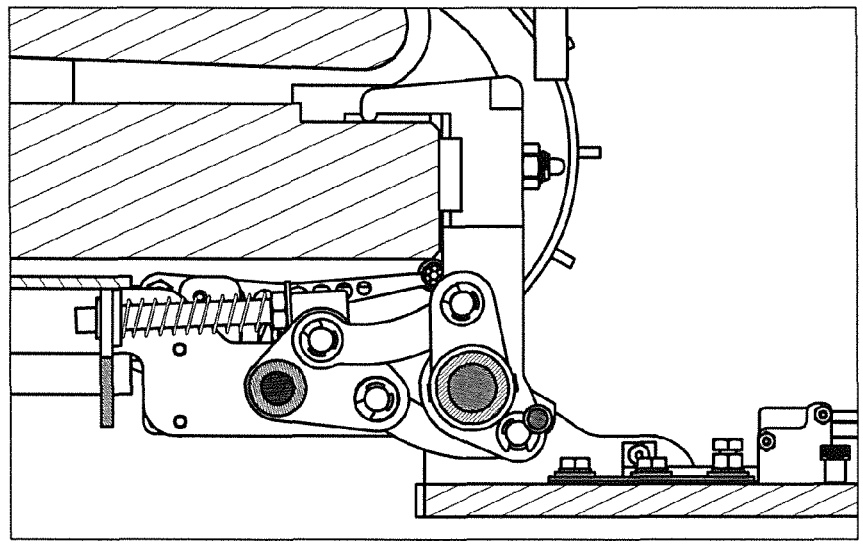

Referring to FIG. 29, an isometric view from the left, upper, front of a broken out portion of the secondary module 1104 illustrated on FIG. 28 is shown; and also referring to FIGS. 30(A-C), whereon sectional side views of the secondary module 1104 taken at line 30-30 of FIG. 29 with the vehicle 100 included on the secondary module support tray 1240 with the secondary module support tray 1240 is at a substantially horizontal position are shown. FIGS. 30(A-C) illustrate operation of the clamp dog 1350 and associated elements during a closing/opening (i.e., clamping/unclamping) operation on the front of the vehicle 100 (i.e., the nose 120) in response to an appropriate control signal. In particular, FIG. 30A illustrates the clamp dog 1350 in a fully open (i.e., raised, up, etc.) position; FIG. 30B illustrates the clamp dog 1350 in a partially open/partially closed (i.e., intermediate) position; and FIG. 30C illustrates the clamp dog 1350 in a fully closed/clamped position (i.e., the clamp dog 1350 clamped on the UGV nose 120).

The clamping and lifting mechanisms that are implemented on the secondary support tray 1240 in connection with the base 1220 generally comprise the main drive shaft 1320, the intermediate drive shaft 1330, the support tray lift arms 1344, the clamp dog 1350 (including the clamp dog lugs 1406), the cantilever rockers 1380, a secondary cantilever rocker pin 1382, the rocker cross pin 1400, three of the arc-shaped clamp links 1410 (e.g., left, center, and right clamp links 1410L, 1410C, and 1410R, respective), and the lug arms 1470.

The clamping and lifting mechanisms that are implemented on the secondary support tray 1240 in connection with the base 1220 further comprise arm spring retention posts 1346 (e.g., left and right spring retention posts 1346L and 1346R, respectively), base spring retention posts 1348 (e.g., left and right spring retention posts 1348L and 1348R, respectively), a tray rod compression spring 1480, tray arm extension springs 1482 (e.g., left and right tray arm extension springs 1482L and 1482R, respectively), a lug arm to link pin 1384, a guide rod 1490, a support tray clearance hole 1492, and a second push-button limit switch 1516.

The lug arms 1470 are laterally located between the clamp dog lugs 1406 and the support tray lift arms 1344. The cantilever rockers 1380 are fixed, non-rotatably to the intermediate shaft 1330 at the first hole. The rocker cross pin 1400 extends laterally through the second hole in the cantilever rockers 1380. The secondary cantilever rocker pin 1382 extends laterally through the third hole in the secondary cantilever rockers 1380.

The clamp link 1410C is generally pivotably (rotatably) pinned at a first end by the rocker cross pin 1400 between the cantilever rockers 1380, and is generally rotatably pinned through the holes in the clamp dog legs 1406 at the second end. The clamp links 1410L and 1410 R are generally pivotably (rotatably) pinned at a first end by the secondary cantilever rocker pin 1382 outboard of the cantilever rockers 1380, and are generally rotatably pinned through holes in the lug arms 1470 at the second end via the lug arm to link pin 1384.

The guide rod 1490 is generally (rotatably) pinned at a first end by the cantilever rocker pin 1382 inboard of the cantilever rockers 1380, and the second end of the guide rod 1490 generally extends freely, slidably in through the clearance hole 1492 in the secondary UGV support tray 1240. The clearance hole 1492 is substantially centrally located in a vertical, laterally oriented flange on the bottom of the secondary UGV support tray 1240.

As illustrated on FIGS. 30B and 30C, when, in response to an appropriate clamping control signal, CSSM, the lifting linear actuator 1310 extends and the combination of the clamp links 1410, the cantilever rockers 1380, and the intermediate shaft 1330 convert (translate) rotary motion of the main drive shaft 1320 to opposite rotary motion of the clamping dog 1350, such that when viewed along the axis of the main drive shaft 1320 (i.e., laterally, right-to-left); clockwise rotation of the main drive shaft 1320 is converted to counter-clockwise rotation of the clamping dog 1350 about the main drive shaft 1320. Conversely, when the lifting linear actuator 1310 retracts, counter-clockwise rotation of the main drive shaft 1320 is converted to clockwise rotation of the clamping dog 1350 about the main drive shaft 1320.

The clamping operation to clamp the tracks 110 via the clamp arms 1232 is implemented in connection with the secondary module 1104 similarly to the clamping operation as shown, for example, on FIGS. 14 and 15(A-C) and described above in connection with the primary module 1102.

Through the coupling described above in connection with FIGS. 28, 29, and 30(A-C), motion of the clamp arms 1232 and the clamping dog 1350 are directly controlled by extension and retraction of the lifting linear actuator 1310 that is implemented in connection with the secondary module 1104.

Figure 31:
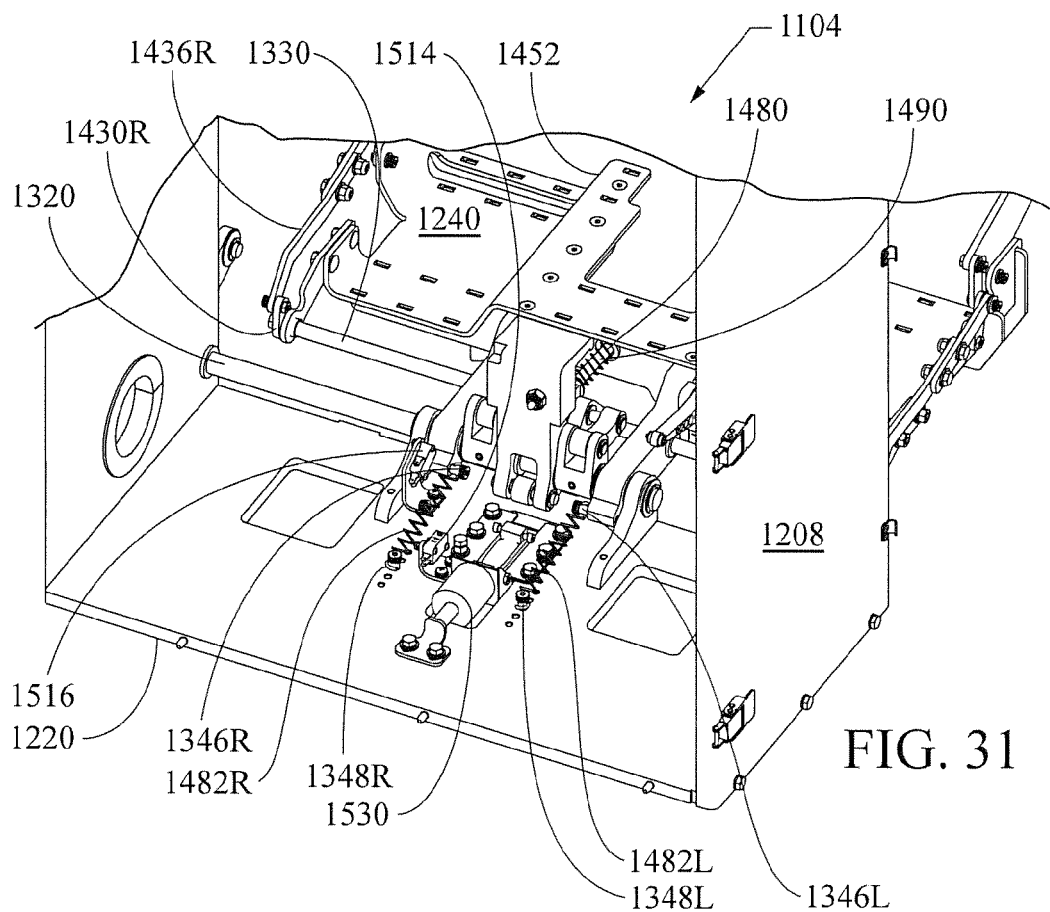
FIG. 31 is a left, upper, rearward isometric view of a broken portion of the secondary module of the system of FIG. 1.

Referring to FIG. 31, a left, upper, rearward isometric view of a broken portion of the secondary module 1104 is illustrated without a vehicle 100 and with the secondary module support tray 1240 in the horizontal position is shown. Also referring back to FIG. 29, the tray rod compression spring 1480 is installed coaxially over the guide rod 1490, and is captured between the cantilever rockers 1380 and the secondary module UGV support tray 1240 at the clearance hole 1492. When viewed from right-to-left, clockwise rotation of the intermediate drive shaft 1330 generally compresses the tray rod compression spring 1480, and likewise, counter-clockwise rotation of the intermediate drive shaft 1330 generally relieves compression of the tray rod compression spring 1480.

The arm spring retention posts 1346 are mounted on the inboard sides of the lift arms 1344 on the extension legs 1484 that extend beyond the holes for the main drive shaft 1320, opposite the tray portion of the secondary support tray 1240. The base spring retention posts 1348 are mounted vertically to the base 1220 outboard of and near the shuttle assembly 1530. The tray arm extension springs 1482 are attached (hooked) at first and second ends between the arm spring retention posts 1346 and the base spring retention posts 1348.

When viewed from right-to-left, clockwise rotation of the secondary UGV support tray 1240 from horizontal to vertical about the main drive shaft 1320 produces extension of the tray arm extension springs 1482. The tray rod compression spring 1480 and the tray arm extension springs 1482 are generally selected and sized to act in unison and provide counterbalancing to prevent the clamping arms 1232 and the clamp dog 1350 from opening (e.g., unclamping) until the secondary UGV support tray 1240 is in a substantially horizontal position and the support leg stops 1522 contact the UGV support tray lift arms 1344 of the adjacent module 1102 or 1104 at a so-called "hard stop". See also, FIG. 9.

The first and second visual indicators 1290 and 1292, and the distance sensor 1294 are generally implemented similarly in connection with the secondary module 1104 as implemented in connection with the primary module 1102. See, for example, FIGS. 18 and 20 and the related descriptions above.

The secondary module 1104 (e.g., the secondary module support tray 1240) does not implement a first lever operated limit switch 1500. The second lever operated limit switch 1510 is generally implemented similarly in connection with the secondary module 1104 as implemented in connection with the primary module 1102. See, for example, FIG. 20 and the related description above.

The clamping dog 1350 and associated position related circuitry are generally implemented similarly in connection with the secondary module 1104 as implemented in connection with the primary module 1102. Likewise, the shuttle assembly 1530 is generally implemented similarly in connection with the secondary module 1104 as implemented in connection with the primary module 1102. See, for example, FIGS. 22-25 and the related description above.

Figure 32:
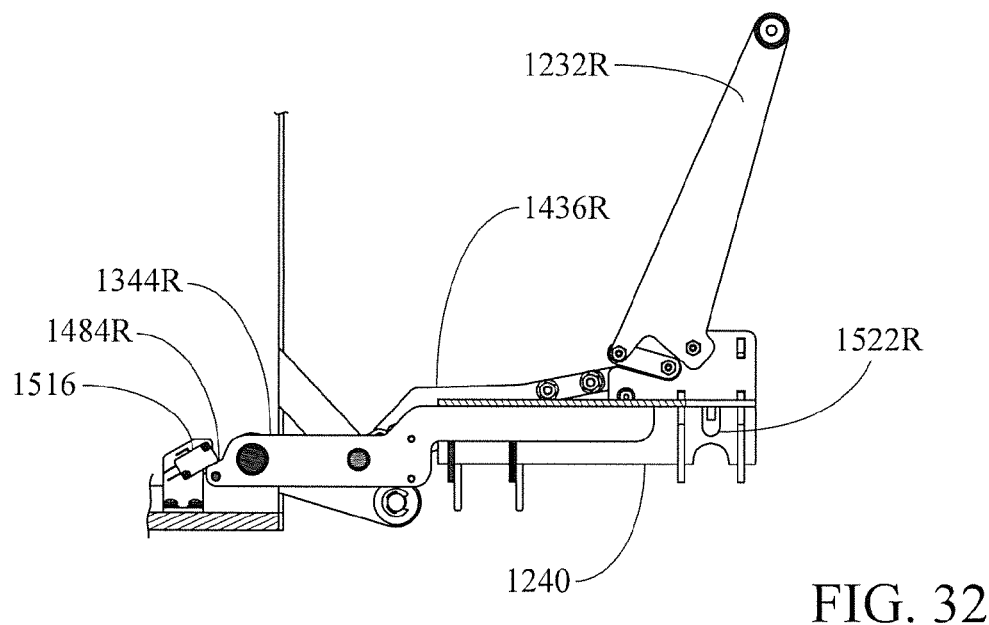
FIG. 32 is a side elevation sectional view taken at line 32-32 on FIG. 29.

Referring to FIG. 32, a side elevation sectional view taken at line 32-32 on FIG. 29 is shown; and also referring back to FIG. 29, the second push-button limit switch 1516 is generally mounted to the module base plate 1220. The second push-button limit switch 1516 is generally connected (coupled) electrically to the secondary sub-system controller 2104 to provide positional feedback with respect to the secondary module support tray 1240. The second push-button limit switch 1516 is generally aligned at an angle and position such that the second push-button limit switch 1516 is activated by contact of the leg extension 1484R on the UGV support tray lift arm 1344R when the UGV support tray 1240 is in a substantially horizontal (e.g., deployed) position.

Referring to FIGS. 33(A-E), isometric views from the upper rear, left of the secondary module 1104 in connection with the UGV 100 and having the cover 1208 removed for clarity are shown. FIGS. 33(A-E) illustrate the vehicle 100 at various stages of clamping and deployment/extraction on the secondary module 1104. The mechanical coupling of the main drive shaft 1320 to the intermediate drive shaft 1330, subsequent coupling of the clamp arms 1232 and the clamping dog 1350 to the intermediate drive shaft 1330, built in hard stops, and the counterbalancing performed by the tray rod compression spring 1480 and the tray arm extension springs 1482 allow the secondary module 1104 to clamp, lift, stow, deploy, unclamp, and clear the UGV 100 for travel through the secondary modules 1104 using the lift linear actuator 1310 (i.e., without the clamping linear actuator 1340 that is implemented in the primary module 1102).

Figure 33A:
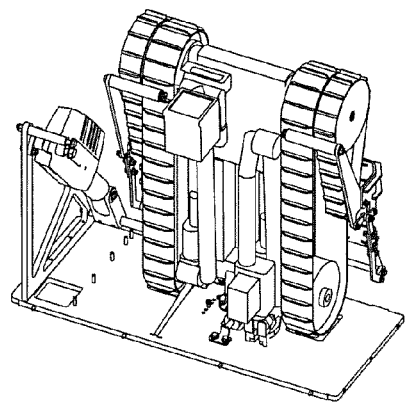
FIGS. 33(A-E) are isometric views from the upper rear, left of the secondary module of the system of FIG. 1 in connection with the vehicle and having the cover removed for clarity.

FIG. 33A illustrates the vehicle 100 clamped by the clamp arms 1232 and the clamp dog 1350 and stowed in an upright (i.e., substantially vertical) position in the secondary module 1104.

Figure 33B:
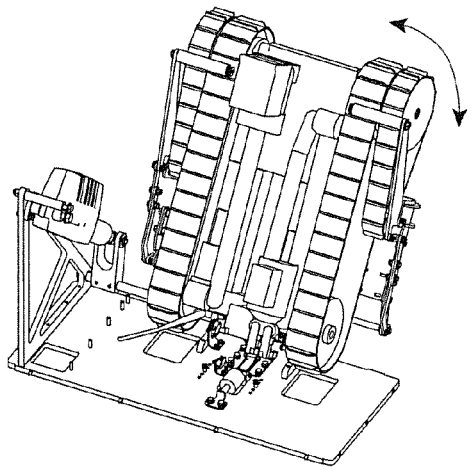
Figure 33C:
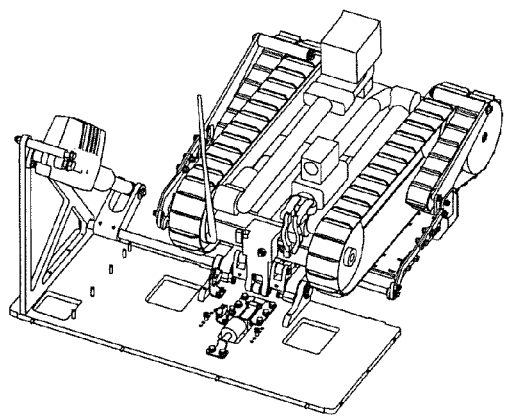

FIG. 33B illustrates the vehicle 100 clamped by the clamp arms 1232 and the clamp dog 1350. The secondary module support tray 1240 is at an intermediate (i.e., a partially lower/raised) position. FIG. 33C illustrates the vehicle 100 clamped by the clamp arms 1232 and the clamp dog 1350. The secondary module support tray 1240 is at a deployed (e.g., substantially horizontal) position.

Figure 33D:
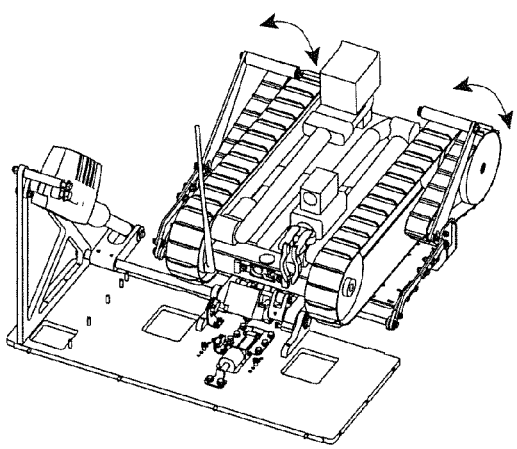
Figure 33E:
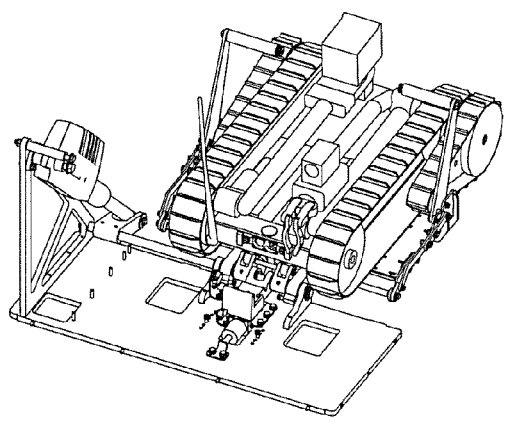

FIG. 33D illustrates the vehicle 100 an intermediate position of clamping/unclamping by the clamp arms 1232 and the clamp dog 1350. The secondary module support tray 1240 is at a deployed position. FIG. 33E illustrates the vehicle 100 fully unclamped by the clamp arms 1232 and the clamp dog 1350. The secondary module support tray 1240 is at a deployed position.

Figure 34:
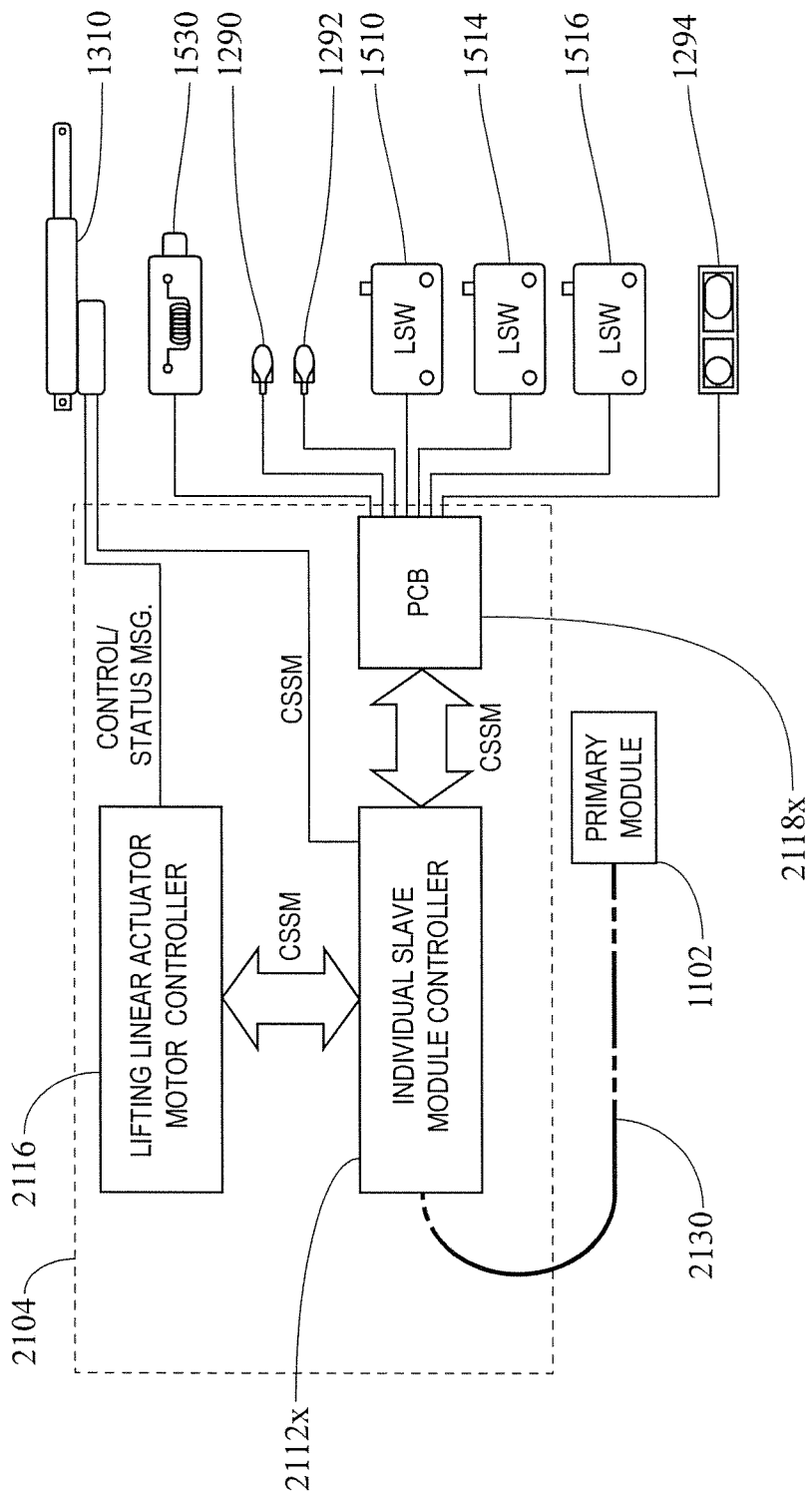
FIG. 34 is a block electrical schematic diagram of a secondary module controller related to control of the secondary module of the system of FIG. 1.

Referring to FIG. 34, a block electrical schematic diagram of the control circuitry (i.e., a section of the system control apparatus 2000) related to control of the secondary module 1104 is shown. The secondary module control sub-system 2104 comprises the individual slave (secondary) module controller 2112x, the lifting linear actuator motor controller 2116, and a secondary module controller printed circuit board (PCB) 2118x.

The secondary module controller 2112 generally comprises unique programming (that is, software and/or firmware that may be different that the software that is implemented in connection with the primary module controller 2112_PM). The secondary module controller 2112 further comprises electrical coupling (e.g., connections, links, communication, etc.) to the lifting linear actuator 1310, the lifting linear actuator motor controller 2116, and the secondary module controller printed circuit board 2118x. The secondary module controller 2112 further comprises electrical coupling to the primary module 1102 (i.e., the primary individual motor controller 2112_PM) via the serial communications link 2130.

The secondary module controller 2112 is generally electrically coupled to the first visual indicator 1290, the second visual indicator 1292, the IR distance sensor 1294, the second lever operated limit switch 1510, the clamp dog position push-button limit switch (i.e., the first push-button limit switch 1514), the second push-button limit switch 1516, and the push-solenoid assembly 1530 via the secondary module controller printed circuit board 2118x.

3200: Method for UGV 100 Stowage within One of the Secondary Modules 1104

Step 3202: The UGV 100 is driven into the secondary module 1104. (This is typically done through remote control operation of the system control apparatus 2000 by the UGV operator, User.)

Step 3204: The UGV 100 activates the second lever operated limit switch 1510, signaling the operator, User, via the first visual indicator 1290 (e.g., red LED) that the vehicle 100 is in position for stowage, and, when the over-run signal is absent, initiating the UGV 100 stowage operation.

Step 3206: The secondary module controller 2112 powers on the lift linear drive actuator 1310.

Step 3208: The lift linear drive actuator 1310 retracts and thereby rotates the main drive shaft 1320, and the main drive shaft 1320 substantially simultaneously rotates the rocker cantilever 1380 and the intermediate shaft 1330. Rotation of the intermediate shaft 1330 essentially simultaneously moves the linkages 1410L and 1410R, and 1410C and thereby decompresses the tray rod compression spring 1480 which is positioned on the guide rod 1490 between rocker cantilever 1380 and secondary tray assembly 1240. Rotation of the intermediate shaft 1330 also essentially simultaneously rotates the left and right secondary clamping arms 1232 to clamp the UGV tracks 110 into place against the module tray assembly 1240, and substantially simultaneously positions the clamping dog 1350 into place against the UGV body nose 120 via a cantilever motion that is reverse to and opposite the rotation of the main drive shaft 1320. That is, the rotations of the clamp dog 1350 and the cantilever rocker assembly 1380 are generally in opposite directions to each other. The clamp dog limit switch 1514 provides a signal, CSS, that generally indicates the clamp dog 1350 has moved from the horizontal position.

Step 3210: The clamp dog 1350 and the cantilever rocker assembly 1380 continue to rotate in opposite directions to each other until the rotational extension limit of the interconnecting linkages 1410 between the clamp dog 1350 and the (counter-rotating) cantilever rocker assembly 1380 is reached (e.g., a mechanical "bind" results). The entire UGV secondary support tray assembly 1240, including the clamp arms 1232, the clamp dog 1350, and the included UGV 100, rotate from a horizontal to vertical position around the main drive shaft 1320. The first and second counterbalance extension springs (i.e., the left and right tray arm extension springs 1482L and 1482R), that are connected between the module base plate 1220 and the secondary tray assembly 1240 are extended until the clamp dog (i.e., the first push-button) limit switch 1514 is closed. When the first push-button limit switch 1514 is closed, a control signal, CSSM, is presented to the secondary module controller 2112x. In response to the control signal, CSSM, from the clamp dog limit switch 1514, retraction of the lifting linear actuator 1310 is stopped; thereby, rotation of the module main drive shaft 1320 is also stopped. The tray position limit switch (i.e., the second push-button limit switch 1516) presents a status signal, CSSM, to the secondary module controller 2112x that indicates the secondary module tray 1240 has moved from the horizontal position.

Step 3212: When the clamp dog limit switch 1514 closes, the status signal, CSSM, is also presented via the system control apparatus 2000 indicating to the operator that the UGV 100 is stowed.

3300: Method for UGV 100 Deployment from One of the Secondary Modules 1104

Step 3302: The secondary module individual motor controller 2112x receives the command signal, CSSM, to deploy the UGV 100 that is stowed within the secondary module 1104x from the User via the system control apparatus 2000.

Step 3304: In response to the control signal, CSSM, the module lifting linear actuator 1310 extends, thereby pushing the lift arm 1360 and rotating the main drive shaft 1320 which substantially simultaneously causes the entire secondary module tray system 1240 including the UGV 100 which is stowed thereon, to rotate as a unit from a vertical to deployed (e.g., horizontal) position around the main shaft 1320. Substantially simultaneously, the left and right tray arm extension springs 1482L and 1482R retract.

Step 3306: The coupled rotational motion of the secondary module tray assembly 1240, the first and second clamp arms 1232, and the clamp dog 1350, and the UGV 100 loaded thereon, around the main shaft 1320, is maintained until the secondary module tray assembly 1240 reaches a substantially horizontal position and contacts the tray position (i.e. the second push-button) limit switch 1516. Substantially simultaneously, the mechanical stops 1522 rest against the adjacent module 1102 or 1104 module support tray 1230 and/or 1240 (i.e., the leg extensions 1484), respectively. Rotational motion of the secondary module tray 1240 and the UGV 100 stored thereon is stopped. The tray position limit switch 1516 presents a status signal, CSSM, to the module motor controller 2112x that indicates the secondary tray assembly 1240 is in the horizontal position.

Step 3308: The module linear drive actuator 1310 continues to extend, thereby rotating the main drive shaft 1320 which substantially simultaneously rotates the rocker cantilever 1380. The rocker cantilever 1380, in turn, essentially simultaneously moves the linkage 1410L, 1410R, and 1410C thereby compressing the tray rod compression spring 1480. The rotating main drive shaft 1320 also substantially simultaneously rotates the first and second clamp arms 1232 to an unclamped position away from the UGV tracks 100, and clear of the UGV 100 ingress and egress path on the secondary tray 1240. Further, the rotating main drive shaft 1320 also substantially simultaneously positions the clamp dog 1350 into a substantially horizontal position via a cantilever motion that is reverse to and opposite the rotation of the main drive shaft 1320. The clamp dog limit switch 1514 presents a signal, CSS, to the module motor controller 2112x that generally indicates that the clamp dog 1350 has moved to the open position.

Stated alternatively, the module linear drive actuator 1310 continues to extend and thereby continues to rotate the module main drive shaft 1320. The clamp dog 1350 and the cantilever rocker 1380 to rotate in opposite directions to each other and compress the tray rod compression spring 1380, until the tray position limit switch 1516 closes. The closed tray position limit switch 1516 command signal, CSSM, in combination with the clamp dog limit switch 1514 signal, CSSM, that are presented to the secondary module motor controller 2112x produces a command signal, CSSM, from the secondary module motor controller 2112x to stop the lift linear drive actuator 1310, thereby stopping the motion of the first and second clamp arms 1232, the clamp dog 1350, the rocker cantilever 1380, and the main drive shaft 1320.

Step 3310: The tray position limit switch 1516, in combination with the clamp dog limit switch 1514, presents a status signal, CSSM, to the secondary module motor controller 2112x that the secondary tray assembly 1240 is in the horizontal position and that the clamp dog 1350 is in the fully open position.

Step 3314: The UGV 100 is driven out of the secondary container 1104. Control of the vehicle 100 is typically performed through remote control by the UGV operator, User, via the system control apparatus 2000.

In accordance with the description of the operation and processes that are generally implemented in connection with the secondary module 1104, the following signals (e.g., the signal Control/Status Msg or CSSM) may be presented to/from the system control apparatus 2000:

a secondary extract signal that is presented via the OCU 2012 when extraction of the vehicle 100 and stowage within the secondary module 1104 is desired;

a secondary deploy signal that is presented via the OCU 2012 when deployment of the vehicle 100 from the secondary module 1104 is desired;

a secondary tray deployed position signal that is presented via the secondary tray limit switch 1516 when the secondary module support tray 1240 reaches the deployed position;

a secondary nose position signal that is presented via the secondary nose position limit switch 1510 when the nose 120 reaches the clamping position;

a secondary clamp dog horizontal position signal that is presented via the secondary clamp dog limit switch 1514 when the secondary clamp dog 1350 reaches the horizontal position;

a secondary over-run position signal that is presented via the secondary optical nose position sensor 1294 when the nose 120 of the vehicle 100 exceeds the clamping position;

a secondary clamp dog off-horizontal position signal that is presented via the secondary clamp dog limit switch 1514 indicating that the secondary clamp dog 1350 has moved from the horizontal position;

a secondary tray off-deployed position signal presented via the secondary tray limit switch 1516 indicating that the secondary module support tray 1240 has moved from the horizontal position;

a vehicle secondary stored status signal that is presented via the secondary module motor controller 2112 when (i) the secondary tray limit switch 1516 indicates that the secondary module support tray 1240 has moved from the deployed position and (ii) the secondary clamp dog limit switch 1514 indicates that the secondary clamp dog 1350 has moved from the horizontal position, thereby indicating that the vehicle 100 is stored in the secondary module 1104; and a secondary power control signal that is presented via the OCU 2012 to actuate the secondary shuttle switching assembly 1530 thereby toggle switching the vehicle 100 battery power on and off.

As is apparent then from the above detailed description, the present invention may provide an improved system (e.g., the modular handling and stowage system 1000 and the system control apparatus 2000) and an improved method 3000 (e.g., the combined methods (steps, processes, procedures, and the like) 3000, 3100, 3200, and 3300) for deploying, extracting, and storing vehicles.

Various alterations and modifications will become apparent to those skilled in the art without departing from the scope and spirit of this invention and it is understood this invention is limited only by the following claims.

What is claimed is:

1. A system (1000) for performing extract and store, and deploy operations of at least one vehicle (100), the system comprising:

a primary module (1102), wherein the primary module comprises a primary base (1220), a primary cover (1208), and a primary module support tray (1230), wherein, the primary module support tray is tiltably mounted to the primary base, and the primary module support tray is tiltable from a vertical position that is under the primary cover to a deployed position where the primary module support tray is outside of the primary cover and is at an angular range that extends to sub-horizontal; and a system control apparatus (2000) that is electrically coupled to the primary module, wherein the control sub-system comprises an operator control unit (2012) that is operated by a user, wherein, when the primary module is empty and the primary module support tray is at the deployed position, in response to a primary extract signal presented from the system control apparatus to the vehicle and the primary module, the vehicle is driven on to the primary module support tray by the user, and the primary module support tray is tilted to the vertical position to store the vehicle; and when the primary module contains the vehicle and the primary module support tray is at the vertical position, in response to a primary deploy signal presented from the system control apparatus to the vehicle and the primary module, the primary module support tray is tilted to the deployed position, and the vehicle is driven off the primary module support tray by the user.

2. The system of claim 1, the system further comprising at least one secondary module (1104), wherein the secondary module comprises a secondary base (1222), a secondary cover (1208), and a secondary module support tray (1240), wherein, the secondary module support tray is tiltably mounted to the secondary base, and the secondary module support tray is tiltable from the vertical position that is under the secondary cover to a deployed position where the secondary module support tray is outside of the secondary cover and is at the horizontal position;

the secondary module is serially, mechanically coupled to the primary module via (a) alignment pins (1286) and mating holes (1288), and (b) draw latches (1280) and clasps (1282), the secondary module is serially, electrically coupled to the primary module and thereby electrically coupled to the system control apparatus, and, when deployed, the secondary module support tray overlaps into the adjacent primary or secondary module;

when the primary module is empty and the primary module support tray is deployed and the secondary module is empty and the secondary module support tray is deployed, in response to a secondary extract signal presented by the system control apparatus to the vehicle, the primary module, and the secondary module, the vehicle is driven on to the primary module support tray, through the primary module and on to the secondary module support tray by the user, and the secondary module support tray is tilted to the vertical position to store the vehicle; and
when the secondary module contains the vehicle and the secondary module support tray is at the substantially vertical position and the primary module is empty and the primary module support tray is deployed, in response to a secondary deploy signal presented by the system control apparatus to the vehicle, the primary module and the secondary module, the secondary module support tray is tilted to the deployed position, and the vehicle is driven off the secondary module support tray, through the primary module and off the primary module support tray by the user.

3. The system of claim 2, wherein the primary module further comprises a primary clamp dog (1350) that is mounted to the primary base, the primary module support tray further comprises left and right primary clamping arms (1232), and the vehicle further comprises a nose (120) and left and right tracks (110);
during the tilting of the extract and the deploy operations and during storage of the vehicle in the primary module, the primary clamp dog holds the vehicle at the nose and the left and right primary clamping arms hold the vehicle at the tracks against the primary module support tray;
the secondary module further comprises a secondary clamp dog that is mounted to the secondary base, the secondary module support tray further comprises left and right secondary clamping arms; and
during the tilting of the extract and the deploy operations and during storage of the vehicle in the secondary module, the secondary clamp dog holds the vehicle at the nose and the left and right secondary clamping arms hold the vehicle at the tracks against the secondary module support tray.

4. The system of claim 3, wherein the primary module further comprises a primary tray lever operated limit switch (1500) that is mounted to the edge of the primary module support tray distal to the primary base, a primary nose position limit switch (1510) that is mounted to the inner edge of the primary module support tray, a primary clamp dog limit switch (1514) that is mounted to the primary base, and a primary optical nose position sensor (1294) that is mounted inside of the primary cover;
the primary tray lever operated limit switch (1500) is electrically coupled to the control apparatus and presents a primary tray deployed position signal to the system control apparatus when the primary support tray reaches the deployed position, the primary nose position limit switch (1510) is electrically coupled to the system control apparatus and presents a primary nose position signal to the system control apparatus when the nose reaches a clamping position, the primary clamp dog limit switch (1514) is electrically coupled to the system control apparatus and presents a primary clamp dog horizontal position signal when the primary clamp dog reaches a horizontal position, and the primary optical nose position sensor is electrically coupled to the system control apparatus and presents a primary over-run position signal when the nose of the vehicle exceeds the clamping position;
the secondary module further comprises a secondary tray limit switch (1516) that is mounted to the secondary base, a secondary nose position limit switch (1510) that is mounted to the inner edge of the secondary module support tray, a secondary clamp dog limit switch (1514) that is mounted to the secondary base, and a secondary optical nose position sensor (1294) that is mounted inside of the secondary cover; and
the secondary tray limit switch (1516) is electrically coupled to the system control apparatus and presents a secondary tray deployed position signal to the system control apparatus when the secondary support tray reaches the deployed position, the secondary nose position limit switch is electrically coupled to the system control apparatus and presents a secondary nose position signal to the system control apparatus when the nose reaches the clamping position, the secondary clamp dog limit switch is electrically coupled to the system control apparatus and presents a secondary clamp dog horizontal position signal when the secondary clamp dog reaches the horizontal position, and the secondary optical nose position sensor is electrically coupled to the system control apparatus and presents a secondary over-run position signal when the nose of the vehicle exceeds the clamping position.

5. The system of claim 4, wherein,
the primary module further comprises a first primary visual indicator (1290) and a second primary visual indicator (1292) that are positioned on the inside upper edge of the primary cover for viewing by the user, wherein the first primary visual indicator and the second primary visual indicator are electrically coupled to the system control apparatus and are visible to the user; and
the secondary module further comprises a first secondary visual indicator (1290) and a second secondary visual indicator (1292) that are positioned on the inside upper edge of the second cover for viewing by the user, wherein the first secondary visual indicator and the second secondary visual indicator are electrically coupled to the system control apparatus and are visible to the user, wherein,
when illuminated, the first primary visual indicator, the second primary visual indicator, the first secondary visual indicator, and the second secondary visual indicator provide information visually to the user.

6. The system of claim 5, wherein the primary module further comprises a primary lifting linear actuator (1310) having a primary module controller (2112_PM) that is electrically coupled to the system control apparatus via a modules supervisory controller (2110), a primary main drive shaft (1320) having a primary lift arm (1360) affixed thereto, a primary intermediate shaft (1330), a clamping linear actuator (1340) that is electrically coupled to the system control apparatus, left and right primary rocker cantilevers (1380), a primary rocker cantilever pin (1382), left and right slider plates (1390), a primary rocker cross pin (1400), left and right rocker torsion springs (1404), a primary clamp linkage (1410), left and right primary clamp lugs (1430), left and right primary clamp link bars (1436) and left and right primary link fingers (1440), and
the primary clamp dog (1350) further comprises left and right primary clamp dog lugs (1406), the primary base (1220) further comprises a primary partition (1206) and a primary actuator truss (1270) that are fixed thereto in the vertical direction, and
the primary module support tray further comprises left and right primary module tray support arms (1344) that are secured to the bottom of the primary module support tray and fixed to the primary main drive shaft, and the primary lifting linear actuator is mechanically rotatably coupled at a first end between the primary partition (1206) and the primary actuator truss (1270) and rotatably coupled at a second end to the second end of the primary lift arm to provide rotation of the primary main drive shaft and thereby rotation of the primary module support tray when the primary lifting linear actuator extends in response to the primary deploy signal and retracts in response to the primary extract signal received by the primary module controller from the system control apparatus; wherein, the clamping linear actuator (1340) is coupled at a first end to the primary module support tray (1230) and at a second end between the left and right primary rocker cantilevers (1380) via the primary rocker cantilever pin (1382), the primary rocker cantilevers (1380) are coupled to the primary intermediate shaft (1330) via the primary rocker cross pin (1400) through the slider plates (1390), the primary clamp dog is rotatable about the primary main drive shaft, the primary clamp linkage (1410) is coupled between the primary cantilever rockers (1380) and the primary clamp dog at the primary clamp dog lugs (1406), the left and right primary clamp lugs (1430) are fixed to the primary intermediate shaft, the primary rocker cross pin is mounted laterally through holes in the left and right primary rocker cantilevers, the left and right rocker torsion springs are mounted around the primary intermediate shaft and are positioned to provide angular force between the left and right slider plates and the primary rocker cross pin and, thereby to the left and right primary rocker cantilevers, the left and right primary clamp arm link bars (1436) and the left and right primary clamp arm link fingers (1440) are coupled together and between the left and right primary clamp lugs (1430) and the left and right primary clamping arms (1232); and the user drives the vehicle on to the primary module support tray;

the nose (120) activates the primary nose position limit switch (1510) which presents the primary nose position signal to the system control apparatus, and the second primary visual indicator is illuminated;

when the primary over-run position signal is absent, the user activates the operator control unit to generate the primary extract signal and, in response to the primary extract signal;

the clamping linear actuator (1340) extends and thereby rotates the primary rocker cantilevers (1380) thereby rotating the primary intermediate shaft (1330) which simultaneously moves the primary clamp arm link bars and the primary clamp arm link fingers which in turn simultaneously rotates the first and second primary clamping arms to clamp the tracks (110) against the primary module support tray (1230), and also simultaneously positions the primary clamp dog (1350) against the nose (120);

when the primary clamp dog rests against the nose, the clamping linear actuator (1340) presents a clamping linear actuator position feedback signal to the system control apparatus and the primary clamp dog limit switch (1514) presents a primary clamp dog off-horizontal position signal to the system control apparatus indicating that the primary clamp dog (1350) has moved from the horizontal position, and the primary module controller stops extending the clamping linear actuator (1340); and the system control apparatus powers off the clamping linear actuator, and powers on the primary lifting linear actuator;

the primary lifting linear actuator (1310) retracts, thereby pulling the primary lift arm (1360) thus rotating the primary main drive shaft (1320), thereby rotating the primary module support tray (1230) from the deployed position to the vertical position;

the primary clamp dog limit switch (1514) presents the primary clamp dog horizontal position signal to the system control apparatus indicating that the primary clamp dog (1350) has returned to the horizontal position, and the primary tray lever operated limit switch (1500) presents a primary tray off-deployed position signal to the system control apparatus indicating that the primary module support tray (1230) has moved from the deployed position; and in response to the primary clamp dog horizontal position signal and the primary tray off-deployed position signal, the system control apparatus (2000) stops the primary lifting linear actuator (1310) from rotating the primary main drive shaft (1320) and the system control apparatus (2000) presents a vehicle primary stored status signal to the user indicating that the vehicle (100) is stored.

7. The system of claim 6, wherein, in response to the primary deploy signal:

the primary lifting linear actuator (1310) extends, pushing the primary lift arm (1360) and, thereby, rotating the primary main drive shaft (1320) which rotates the primary module tray (1230) from the vertical position to the deployed position;

the primary tray lever operated limit switch (1500) presents the primary tray deployed position signal to the primary module controller (2112_PM) indicating that the primary module tray (1230) is in the deployed position and primary lifting linear actuator (1310) stops extending;

the clamping linear actuator (1340) retracts, thereby rotating the primary rocker cantilevers (1380) which simultaneously moves the primary clamp arm link bars (1436) and the primary clamp arm link fingers (1440), and, thereby, simultaneously rotates the left and right primary clamp arms (1232) to unclamp the tracks (110), while simultaneously positioning the primary clamp dog (1350) into the horizontal position; and when the left and right primary clamp arms (1232) reach a fully unclamped position before the primary clamp dog (1350) reaches the horizontal position, the left and right primary clamp arms (1232) stop rotation, and the torsion springs (1404) are subjected to added torsional force;

when the primary clamp dog (1350) reaches the horizontal position, the primary clamp dog limit switch (1514) presents the primary clamp dog horizontal position signal to the system control apparatus indicating that the primary clamp dog (1350) is fully open, and the tray lever operated limit switch presents the primary tray deployed position signal to the system control apparatus indicating that the primary module support tray (1230) is in the deployed position; and when the primary module has the vehicle thereon, the vehicle is driven out of the primary module by the user.

8. The system of claim 7, wherein, the secondary module further comprises:

a secondary lifting linear actuator (1310) having a secondary module controller (2112) that is electrically coupled to the system control apparatus (2000), a secondary main drive shaft (1320) having a secondary lift arm (1360) affixed thereto, a secondary intermediate drive shaft (1330), left and right secondary cantilever rockers (1380), a secondary cantilever rocker pin (1382), a secondary rocker cross pin (1400), left, center, and right secondary clamp linkages (1410L, 1410C, 1410R), left and right lug arms (1470);

the secondary clamp dog (1350) further comprises left and right secondary clamp dog lugs (1406); the secondary base (1222) further comprises a secondary partition (1206) and a secondary actuator truss (1270) that are fixed thereto in the vertical direction;

the secondary module support tray (1240) further comprises left and right secondary clamping arms (1232), left and right secondary support tray lift arms (1344), that are secured to the bottom of the secondary module support tray and fixed to the secondary main drive shaft (1320), a tray rod compression spring (1480), left and right tray arm extension springs (1482), a lug arm to link pin (1384), a guide rod (1490), a support tray clearance hole (1492) that is located in a lateral flange on the bottom of the secondary module support tray (1240), and left and right mechanical stops (1522) that are mounted on the bottom of the secondary module support tray at the edge distal to the secondary base (1222); wherein, the secondary lifting linear actuator is mechanically rotatably coupled at a first end between the secondary partition (1206) and the secondary actuator truss (1270) and rotatably coupled at a second end to the second end of the secondary lift arm to provide rotation of the secondary main drive shaft (1320) and thereby rotation of the secondary module support tray when the secondary lifting linear actuator (1310) extends in response to the secondary deploy signal and retracts in response to the secondary extract signal received by the secondary module controller from the control-sub-system;

the lug arms (1470) are laterally fixed to the secondary main drive shaft (1320) between the secondary clamp dog lugs (1406) and the secondary support tray lift arms (1344), the secondary cantilever rockers (1380) include three holes and are fixed to the secondary intermediate shaft (1330) at the first hole, the secondary rocker cross pin (1400) extends laterally through the second hole in the secondary cantilever rockers (1380), the secondary cantilever rocker pin (1382) extends laterally through the third hole in the secondary cantilever rockers (1380);

the center secondary clamp linkage (1410C) is rotatably pinned at a first end by the secondary rocker cross pin (1400) between the secondary cantilever rockers (1380), and is rotatable pinned through the holes in the secondary clamp dog lugs (1406) at a second end, the left and right secondary clamp linkages (1410L, 1410R) are rotatably pinned at a first end by the secondary cantilever rocker pin (1382) outboard of the secondary cantilever rockers (1380), and are rotatably pinned through holes in the lug arms (1470) at a second end via the lug arm to link pin (1384);

the guide rod (1490) is rotatably pinned at a first end by the secondary cantilever rocker pin (1382) inboard of the secondary cantilever rockers (1380), and a second end of the guide rod (1490) extends slidably through the clearance hole (1492), the tray rod compression spring (1480) is coaxially mounted over the guide rod (1490) and is captured between the secondary cantilever rockers (1380) and the secondary module support tray (1240) at the clearance hole (1492), and the tray arm extension springs (1482) are attached at first and second ends between the inboard sides of the secondary support tray lift arms (1344) and the secondary base (1222); and the user drives the vehicle on to the secondary module support tray;

the nose (120) activates the secondary nose position limit switch (1510) which presents the secondary nose position signal to the system control apparatus, and the second secondary visual indicator is illuminated;

when the secondary over-run position signal is absent, the user activates the operator control unit to generate the secondary extract signal and, in response to the secondary extract signal;

the secondary module controller (2112) powers on the secondary lifting linear actuator (1310);

the secondary lifting linear actuator (1310) retracts and thereby rotates the secondary main drive shaft (1320), and the secondary main drive shaft (1320) simultaneously rotates the secondary rocker cantilevers (1380) and the secondary intermediate shaft (1330), wherein, rotation of the secondary intermediate shaft (1330) simultaneously moves the left, center and right secondary clamp linkages (1410L, 1410R, 1410C) and thereby decompresses the tray rod compression spring (1480);

rotation of the intermediate shaft (1330) also simultaneously rotates the left and right secondary clamping arms (1232) to clamp the tracks (110) into place against the secondary module support tray (1240), and simultaneously positions the secondary clamp dog (1350) into place against the nose (120) via a cantilever motion that is reverse to and opposite the rotation of the secondary main drive shaft (1320);

the secondary clamp dog limit switch (1514) presents a secondary clamp dog off-horizontal position signal indicating that the secondary clamp dog (1350) has moved from the horizontal position;

the secondary clamp dog (1350) and the secondary cantilever rockers (1380) continue to rotate in opposite directions to each other until the rotational extension limit of the secondary clamp linkages (1410) between the secondary clamp dog (1350) and the secondary cantilever rockers (1380) is reached;

the secondary module support tray (1240) rotates from a horizontal to vertical position around the secondary main drive shaft (1320), the left and right tray arm extension springs (1482L and 1482R), are extended until the secondary clamp dog limit switch (1514) is closed and presents the secondary clamp dog horizontal position signal to the secondary module controller (2112);

in response to the secondary clamp dog horizontal position signal, retraction of the secondary lifting linear actuator (1310) is stopped, thus, rotation of the secondary main drive shaft (1320) is also stopped, the secondary tray limit switch (1516) presents a secondary tray off-deployed position signal to the system control apparatus that indicates the secondary module support tray (1240) has moved from the horizontal position; and in response to the secondary clamp dog horizontal position signal and the secondary tray off-deployed position signal, the system control apparatus presents a vehicle secondary stored status signal to the user indicating that the vehicle (100) is stored.

9. The system of claim 8, wherein, in response to the secondary deploy signal:

the secondary lifting linear actuator (1310) extends, thus pushing the secondary lift arm (1360) and, thereby, rotating the secondary main drive shaft (1320) which rotates the secondary module support tray (1240) from the vertical position to the deployed position, simultaneously, the left and right tray arm extension springs (1482L and 1482R) retract;

the coupled rotational motion of the secondary module support tray (1240), the left and right secondary clamp arms (1232), and the secondary clamp dog (1350)

around the secondary main shaft (1320), is maintained until the secondary module support tray (1240) reaches the horizontal position and contacts the secondary tray limit switch (1516) which presents the secondary tray deployed position signal to the system control apparatus, and the mechanical stops (1522) rest against an adjacent primary or secondary module thereby stopping rotational motion of the secondary module support tray (1240);

the secondary lifting linear actuator (1310) continues to extend, thereby rotating the main drive shaft (1320) which simultaneously rotates the secondary rocker cantilevers (1380), the secondary rocker cantilevers (1380), in turn, simultaneously move the secondary clamp linkages (1410L, 1410R, 1410C) thereby compressing the tray rod compression spring (1480), the rotation of the secondary main drive shaft (1320) also simultaneously rotates the left and right secondary clamp arms (1232) to an unclamped position away from the tracks (110), and the rotation of the secondary main drive shaft (1320) also simultaneously rotates the secondary clamp dog (1350) into the horizontal position via a cantilever motion that is reverse to and opposite the rotation of the secondary main drive shaft (1320), and the secondary clamp dog limit switch (1514) presents the secondary clamp dog horizontal position signal to the secondary module controller (2112) indicating that the secondary clamp dog (1350) has moved to the open position;

the secondary lifting linear actuator (1310) continues to extend and thereby continues to rotate the secondary main drive shaft (1320), the secondary clamp dog (1350) and the secondary cantilever rockers (1380) continue to rotate in opposite directions to each other and compress the tray rod compression spring (1380);

when the secondary module controller (2112) receives both of the secondary tray deployed position signal and the secondary clamp dog horizontal position signal, the secondary module controller (2112) stops the secondary lifting actuator (1310), thereby stopping the motion of the left and right secondary clamp arms (1232), the secondary clamp dog (1350), the secondary rocker cantilevers (1380), and the secondary main drive shaft (1320); and when the secondary module has the vehicle thereon, the vehicle is driven out of the secondary module by the user.

10. The system of claim 9, wherein the nose (120) further comprises a push-button toggle power switch (140) that alternately turns vehicle battery power on and off;

the primary clamp dog (1350) further comprises a primary switch plunger (1370) that is aligned with the toggle power switch (140) when the nose is clamped;

the primary module (1102) further comprises a primary shuttle switching assembly (1530) that is mounted within a primary recess (1222) in the primary base (1220) and is aligned with the primary switch plunger (1370) when the vehicle (100) is in the vertical position; and the primary shuttle switching assembly (1370) is electrically coupled to the system control apparatus; and when the vehicle (100) is in the vertical position, in response to a primary power control signal from the system control apparatus, the primary shuttle switching assembly is actuated thereby toggle switching the vehicle battery power on and off; and the secondary clamp dog further comprises a secondary switch plunger (1370) that is aligned with the toggle power switch (140) when the nose is clamped;

the secondary module further comprises a secondary shuttle switching assembly (1530) that is mounted within a secondary recess (1222) in the secondary base (1222) and is aligned with the secondary switch plunger when the vehicle (100) is in the vertical position; and the secondary shuttle switching assembly is electrically coupled to the system control apparatus; and when the vehicle (100) is in the vertical position, in response to a secondary power control signal from the system control apparatus, the secondary shuttle switching assembly is actuated thereby toggle switching the vehicle battery power on and off.

11. A method (3000) for a user to manage extracting and storing, and deploying operations of at least one vehicle (100) from a modular handling and stowage system (1000) having (i) a primary module (1102), wherein the primary module comprises a primary base (1220), a primary cover (1208), and a primary module support tray (1230), wherein, the primary module support tray is tiltably mounted to the primary base, and the primary module support tray is tiltable from a vertical position that is under the primary cover to a deployed position where the primary module support tray is outside of the primary cover and is at an angular range that extends to sub-horizontal; and (ii) a system control apparatus (2000) that is electrically coupled to the primary module, wherein the system control apparatus comprises an operator control unit (2012) that is operated by the user, wherein, the method comprises:
when the primary module is empty and the primary module support tray is at the deployed position, in response to a primary extract signal presented from the system control apparatus to the vehicle and the primary module;

driving the vehicle on to the primary module support tray by the user, and tilting the primary module support tray to the vertical position to store the vehicle; and when the primary module contains the vehicle and the primary module support tray is at the vertical position, in response to a first deploy signal presented from the system control apparatus to the vehicle and the primary module;

tilting the primary module support tray to the deployed position; and driving the vehicle off the primary module support tray by the user.

12. The method of claim 11, wherein, the system further comprises at least one secondary module (1104), wherein the secondary module comprises a secondary base (1222), a secondary cover (1208), and a secondary module support tray (1240), wherein, the secondary module support tray is tiltably mounted to the secondary base, and the secondary module support tray is tiltable from the vertical position that is under the secondary cover to a deployed position where the secondary module support tray is outside of the secondary cover and is at the horizontal position;

the secondary module is serially, mechanically coupled to the primary module via (a) alignment pins (1286) and mating holes (1288), and (b) draw latches (1280) and clasps (1282), the secondary module is serially, electrically coupled to the primary module and thereby electrically coupled to the system control apparatus, and, when deployed, the secondary module support tray overlaps into the adjacent primary or secondary module; and, the method further comprises:

when the primary module is empty and the primary module support tray is deployed and the secondary module is empty and the secondary module support tray is deployed, in response to a secondary extract signal presented by the system control apparatus to the vehicle, the primary module, and the secondary module;

driving the vehicle on to the primary module support tray, through the primary module and on to the secondary module support tray by the user; and tilting the secondary module support tray to the vertical position to store the vehicle; and when the secondary module contains the vehicle and the secondary module support tray is at the substantially vertical position and the primary module is empty and the primary module support tray is deployed, in response to a secondary deploy signal presented from the system control apparatus to the vehicle, the primary module and the secondary module;

tilting the secondary module support tray to the deployed position; and driving the vehicle off the secondary module support tray, through the primary module and off the primary module support tray by the user.

* * * * *